United States Patent
Byers et al.

(10) Patent No.: US 8,003,748 B2
(45) Date of Patent: Aug. 23, 2011

(54) POLYTHIOURETHANE COMPOSITIONS AND PROCESSES FOR MAKING AND USING SAME

(75) Inventors: Jim D. Byers, Bartlesville, OK (US); Mitchell D. Refvik, Bartlesville, OK (US); Chad W. Brown, Bartlesville, OK (US); Michael S. Matson, Bartlesville, OK (US); Michael S. Hankinson, Borger, TX (US)

(73) Assignee: Chevron Phillips Chemical Company, LP, The Woodlands, TX (US)

(*) Notice: Subject to any disclaimer, the term of this patent is extended or adjusted under 35 U.S.C. 154(b) by 1156 days.

(21) Appl. No.: 11/204,728

(22) Filed: Aug. 16, 2005

(65) Prior Publication Data
US 2006/0111520 A1   May 25, 2006

Related U.S. Application Data

(63) Continuation-in-part of application No. 11/060,675, filed on Feb. 17, 2005, and a continuation-in-part of application No. 11/060,696, filed on Feb. 17, 2005, now Pat. No. 7,557,236, and a continuation-in-part of application No. 11/059,792, filed on Feb. 17, 2005, now Pat. No. 7,781,484, and a continuation-in-part of application No. 11/059,647, filed on Feb. 17, 2005, now Pat. No. 7,713,326.

(60) Provisional application No. 60/545,260, filed on Feb. 17, 2004, provisional application No. 60/561,614, filed on Apr. 13, 2004, provisional application No. 60/561,685, filed on Apr. 13, 2004, provisional application No. 60/561,855, filed on Apr. 13, 2004.

(51) Int. Cl.
   *C08G 18/00* (2006.01)

(52) U.S. Cl. .......................................................... 528/84
(58) Field of Classification Search .................. None
   See application file for complete search history.

(56) References Cited

U.S. PATENT DOCUMENTS

| 2,411,954 A | 12/1946 | Burke |
| 2,476,891 A | 7/1949 | Mortenson |
| 3,028,417 A | 4/1962 | Elsenmann |
| 3,041,284 A | 6/1962 | Calhoun et al. |
| 3,114,734 A | 12/1963 | Gobran et al. |
| 3,211,674 A | 10/1965 | Sandridge |

(Continued)

FOREIGN PATENT DOCUMENTS

DE    300174 A7   5/1992

(Continued)

OTHER PUBLICATIONS

Kanemura, Y, et al. "Dithiols as Improvers for Polyurethanes," Chemical Abstracts, American Chemical Society, vol. 11, No. 22, Nov. 27, 1989 (XP000251903).

(Continued)

*Primary Examiner* — Karl J Puttlitz
(74) *Attorney, Agent, or Firm* — Merchant & Gould, P.C.

(57) ABSTRACT

Polythiourethane polymer compositions, methods of making the polythiourethane polymer compositions, and methods of using the polythiourethane polymer compositions are provided. The polythiourethane can be produced by contacting a thiol ester composition and an isocyanate to produce a mixture and then heating the mixture to produce the polythiourethane polymer. In some embodiments, the thiol ester compositions include thiol esters, hydroxy thiol esters, and crosslinked thiol esters.

53 Claims, 33 Drawing Sheets

U.S. PATENT DOCUMENTS

| | | | |
|---|---|---|---|
| 3,278,496 A | 10/1966 | LeFave et al. |
| 3,352,810 A | 11/1967 | McLay |
| 3,446,780 A | 5/1969 | Bertozzi |
| 3,465,057 A | 9/1969 | Cameron et al. |
| 3,686,326 A | 8/1972 | Oswald et al. |
| 3,707,552 A | 12/1972 | Dobinson et al. |
| 3,742,006 A | 6/1973 | Doss |
| 3,746,685 A | 7/1973 | Dobinson et at. |
| 3,832,328 A | 8/1974 | Eggensperger |
| 3,853,959 A | 12/1974 | Dobinson et al. |
| 3,884,951 A | 5/1975 | Oswald |
| 3,914,288 A | 10/1975 | Garnish et al. |
| 3,916,067 A | 10/1975 | Jones et al. |
| 3,926,822 A | 12/1975 | Habiby |
| 3,953,347 A | 4/1976 | Habiby |
| 3,981,901 A | 9/1976 | Guthrie et al. |
| 3,986,966 A | 10/1976 | Wakim |
| 3,991,089 A | 11/1976 | Schwab et al. |
| 4,045,472 A | 8/1977 | Guthrie et al. |
| 4,119,640 A | 10/1978 | Hodakowski et al. |
| 4,218,332 A | 8/1980 | Schwab et al. |
| 4,231,956 A | 11/1980 | Sullivan et al. |
| 4,254,185 A | 3/1981 | Buter |
| 4,340,707 A | 7/1982 | Quels et al. |
| 4,504,651 A | 3/1985 | Yamaguchi et al. |
| 4,521,320 A | 6/1985 | Spivack et al. |
| 4,566,878 A | 1/1986 | Karol et al. |
| 4,594,193 A | 6/1986 | Regen |
| 4,626,562 A | 12/1986 | Motomura et al. |
| 4,636,242 A | 1/1987 | Timmons |
| 4,788,083 A | 11/1988 | Dammann et al. |
| 5,126,425 A | 6/1992 | Sasagawa et al. |
| 5,154,950 A | 10/1992 | Rosthauser et al. |
| 5,405,426 A | 4/1995 | Timmons et al. |
| 5,411,776 A | 5/1995 | Schmidt et al. |
| 5,422,422 A | 6/1995 | Bader et al. |
| 5,454,851 A | 10/1995 | Zlotnikov et al. |
| 5,538,531 A | 7/1996 | Hudson et al. |
| 5,925,726 A | 7/1999 | Seppala et al. |
| 5,932,681 A * | 8/1999 | Herold et al. ............ 528/81 |
| 6,039,781 A | 3/2000 | Goertz et al. |
| 6,221,994 B1 | 4/2001 | Galbiati et al. |
| 6,231,633 B1 | 5/2001 | Hirano et al. |
| 6,358,296 B1 | 3/2002 | Markusch et al. |
| 6,583,302 B1 | 6/2003 | Erhan et al. |
| 7,153,917 B2 | 12/2006 | Rink et al. |
| 7,169,737 B2 | 1/2007 | Hidaka et al. |
| 7,557,236 B2 | 7/2009 | Brown et al. |
| 7,585,932 B2 | 9/2009 | Byers et al. |
| 7,713,326 B2 | 5/2010 | Carstens et al. |
| 7,781,484 B2 | 8/2010 | Byers et al. |
| 2003/0204030 A1 | 10/2003 | Higuchi et al. |
| 2005/0096222 A1 | 5/2005 | Hidaka et al. |
| 2005/0176902 A1 | 8/2005 | Rink et al. |
| 2005/0197390 A1 | 9/2005 | Byers et al. |
| 2005/0197391 A1* | 9/2005 | Refvik et al. ............ 514/513 |
| 2006/0000252 A1 | 1/2006 | Carstens et al. |
| 2006/0009365 A1 | 1/2006 | Erhan et al. |
| 2006/0036110 A1 | 2/2006 | Brown et al. |
| 2006/0111520 A1 | 5/2006 | Byers et al. |
| 2007/0055033 A1 | 3/2007 | Byers et al. |
| 2007/0088146 A1 | 4/2007 | Nakamura et al. |
| 2007/0112100 A1 | 5/2007 | Byers et al. |
| 2008/0214774 A1 | 9/2008 | Brown et al. |
| 2009/0124762 A1 | 5/2009 | Brown et al. |
| 2009/0124784 A1 | 5/2009 | Brown et al. |

FOREIGN PATENT DOCUMENTS

| | | |
|---|---|---|
| EP | 0 308 664 | 8/1988 |
| EP | 0 716 057 | 6/1996 |
| EP | 0716057 | 6/1996 |
| FR | 1 194 553 | 11/1959 |
| FR | 1194553 | 11/1959 |
| GB | 908986 | 10/1962 |
| GB | 1 292 214 | 10/1972 |
| GB | 1 312 821 | 4/1973 |
| GB | 1 312 822 | 4/1973 |
| GB | 1 484 062 | 8/1977 |
| GB | 1484062 | 8/1977 |
| GB | 2188327 | 9/1987 |
| JP | 60123506 | 7/1985 |
| JP | 1 090169 | 4/1989 |
| JP | 1090167 | 6/1989 |
| JP | 1090168 | 6/1989 |
| JP | 1090170 | 6/1989 |
| JP | 2003-252956 | 9/2003 |
| WO | WO 86/06371 | 11/1986 |
| WO | WO2002053672 A1 | 7/2002 |
| WO | WO2003006569 A1 | 1/2003 |
| WO | WO 03/082958 | 10/2003 |
| WO | WO 2005/080325 | 1/2005 |
| WO | WO 2005/014564 | 2/2005 |
| WO | WO2005/123862 | 12/2005 |
| WO | WO2005022217 A1 | 2/2007 |
| WO | WO2007021960 A2 | 2/2007 |
| WO | WO2007035215 A2 | 3/2007 |
| WO | WO2008/106637 | 9/2008 |

OTHER PUBLICATIONS

Search Report from International Patent Application No. PCT/US2006/031393, dated Jan. 1, 2007.

Search Report from International Patent Application No. PCT/US2006/031901 dated Nov. 11, 2006.

Search Report for International Patent Application No. PCT/US2005/005110 dated Jan. 24, 2006.

Elchueva, A.D., et al., "Influence of the Type of Oligoisocyanate on the Properties of Thiourethane Compounds," Russian J of Applied Chem, vol. 74 (2001) pp. 1040-1043.

Fitt, Peter S., et al., "Dithiols. Part XIX. Further Studies on the Deacetylation of Acetylated Dithiols," J of the Chem Society No. 5 (1957) pp. 2240-2249.

Derkach, N. Ya, et al., "Mercapto Derivatives of Alkylmalonic Esters," Chemical Abstracts, vol. 54, No. 22, (1960), Abstract No. 24386a.

Blackman L.C.F., et al. "Promoters for the Dropwise Condensation of Steam. Part II . . . ," J of the Chem Society, No. 1 (1957) pp. 165-169.

Mazaev, V.E., et al., "Preparation Reflux Mercaptoethanol Appropriate Acid," Derwent Publications, Week 197442, Abstract No. SU410010 (1974).

Demchuk, Dmitry V., et al. "Synthesis of 12- and 13-Membered Sulfur-Containing Lactones by Homolytic Macrocyclization . . . ," Synthesis, (1995) pp. 307-311.

Sudmeier, James L., et al. "Fast Kinetics by Stopped-Flow Chlorine-35 Nuclear Magnetic Resonance . . . " Inorganic Chem vol. 10 No. 4 (1971) pp. 860-863.

Tanaka, Kiyoshi, et al., "Oxidation of Thiol by 5-Arylidene, 1,3-Dimethylbarbituric Acid and Its Application . . . ," Tetrahedron Letters, vol. 28, No. 36 (1987) pp. 4173-4176.

Troyansky, Emmanuil I., et al. "Stereoselective Free Radical Cycloaddition-Macrocyclization in Facile Synthesis . . . ," Tetrahedron, vol. 51, No. 42 (1995) pp. 11431-11444.

Chavdarian, Charles G., et al. "Synthesis, Redox Characteristics, and in Vitro Norepinephrine Uptake . . . " J of Medicinal Chem, vol. 22, No. 11 (1979) pp. 1317-1322.

Sjoberg, Bertil, "Uber Thioglycerine und einige verwandte Schwefelverbindungen," Berichte der Deutschen Chemischen Gesellschaft, vol. 75, No. 1 (1942) pp. 13-29.

Mayadunne, Roshan T.A., et al. "Multiarm organic compounds for use as reversible chain-transfer agents . . . ," Tetrahedron Letters, vol. 43, No. 38 (2002) pp. 6811-6814.

Miyake, Y., et al., "Enantioselective conversion of meso-cyclic disulfides to chiral cyclic sulfides . . . " J of the Chem Society, Perkin Trans 1, No. 10 (2000) pp. 1595-1599.

Bhattacharya, S., et al., "Synthesis of Macrocyclic Diacy/Dialkyl Glycerols Containing Disulfide Tether and Studies . . . " J Org Chem vol. 63, No. 25 (1998) pp. 9232-9242.

Apitzsch, et al. "Uber Sulfide aus alfa,alfa1-Disulfhydryl-thiogamma-pyron-beta, beta1-. . . ," Berichte der Deutschen Chemischen Gesellschaft, vol. 42 (1909) pp. 2940-2943.

Teplenicheva, Y.L., et al., "Ethyl 2-(alpha-hydroxyhexafluoroisopropyl)acrylate as a potential . . . " Russian Chemical Bulletin, vol. 46, No. 4 (1997) pp. 755-758.
Gala, D., et al., "A Practical Conversion of a Azetidinone to Penem: Synthesis of Sch 34343," Tetrahedron, vol. 48, No. 7, (1992) pp. 1175-1182.
Schonberg, A., et al., "Konstitution und Umsetzungen des Produktes aus Aceton-dicarbonsaure-diathylester . . . ," Chemische Berichte, vol. 99, No. 10 (1966) pp. 3327-3330.
Apitzsch, H., "Uber die Einwirkungvon Schwefelkohlenstoff und Atzkali auf Ketone," Berichte der Deutschen Chemischen Gesellschaft, vol. 41 (1908) pp. 4028-4039.
Fischer, G.C., et al., "Irreducible Analogues of Mevaldic Acid Coenzyme a Hemithioacetal as Potential Inhibitors, . . . " J Org Chem, vol. 50 No. 12 (1985) pp. 2011-2019.
Ferres, H., et al., "A diastereoselective sysnthesis of 4(RS), 6(SR)-mercaptomethylmevalonolactone, . . . " Tetrahedron Letters, vol. 24, No. 35 (1983) pp. 3769-3772.
Schwab, A.W., et al., "Hydrogen Sulfide Adducts of Methyl Oleate and Linoleate," J of the America Oil Chemists' Society, vol. 50 (1973) pp. 364-366.
Schwab, A.W., et al. "Free Radical Addition of Hydrogen Sulfide to Conjugated . . . ," J of the American Oil Chemists' Society, vol. 47 (1970) pp. 371-373.
International Application No. PCT/US2006/031419 Search Report, Mar. 8, 2007.
Stokes, Archives of Biochemistry and Biophysics (1974), 162(2), 638-48.
Olsen, Scand. Symp. Lipids, [Proc.], 11$^{th}$ (1982), Meeting Date 1981, 173-8.
Peppard, Proceedings of the Congress—European Brewery Conventions (1979), 17$^{th}$, 91-104.
Stokes et al., Fat metabolism in higher Plants, Archives of Biochemistry and Biophysics (1974), 162(2), 638-48.
http://www.brunobock.org/modules.php?name=Content&pa=showpage&pid=49.
Elizabeth Dyer, et al., The Kinetics of the Reactions of Phenyl Isocyanate with Thiols, J. Org. Chem., 26, Aug. 1961, 2919-2925.
Elizabeth Dyer, et al., The Kinetics of the Reactions of Phenyl Isocyanate with Certain Thiols, J. Am. Chem. Soc., 79, Aug. 13, 1957, 366-369.
Janis Robins, Metal Ion Catalysis in Mercaptan Isocyanate Reactions, Adv. in Urethane Science and Tech., 12, 1993, 25-58.
Ana L. Silva, et al., Recent Developments in Polyurethane Catalysis: Catalytic Mechanisms Review, Catalysis Reviews, 46, 2004, 31-51.
http://www.cognis.com/NR/rdonlyres/FDE0E9E1-DAE2-4950-B7FA-5EAF67B40C18/0/Folder_26.pdf.
Office Action dated Jun. 18, 2008, 8 pages, U.S. Appl. No. 11/060,696, filed Feb. 17, 2005.
Office Action dated Jun. 27, 2008, 8 pages, U.S. Appl. No. 11/059,792, filed Feb. 17, 2005.
Office Action dated Sep. 24, 2008, 8 pages, U.S. Appl. No. 11/464,318, filed Aug. 14, 2008.
Office Action dated Jun. 24, 2008, 5 pages, U.S. Appl. No. 11/060,675, filed Feb. 17, 2005.
Office Action dated Dec. 21, 2007, 5 pages, U.S. Appl. No. 11/060,675, filed Feb. 17, 2005.
Office Action dated Jul. 16, 2007, 7 pages, U.S. Appl. No. 11/060,675, filed Feb. 17, 2005.
Office Action dated Dec. 19, 2006, 7 pages, U.S. Appl. No. 11/060,675, filed Feb. 17, 2005.
Blackman et al., "Promoters for the Dropwise Condensation of Steam. Part I. Preparation of Compounds Containing Monofunctional Sulphur Groups," J chem. Soc, 1957, pp. 162-165.
Blackman et al., "Promoters for the Dropwise Condensation of Steam. Part III. Preparation of Silicon and Phosphorus Compounds," J chem. Soc, 1957, pp. 169-171.
Blackman et al., "Promoters for the Dropwise Condensation of Steam. Part IV. Discussion of Dropwise Condensation and Testing of Compounds," J chem. Soc, 1957, pp. 171-176.
Dalton Jr., et al., "Syntheses of some thiol esters for acylation of proteins," Australian Journal of Chemistry, 1981, vol. 34, pp. 759-764.
Database CAS citation 1947:9074 [retrieved Aug. 17, 2009] from STN; Columbus, OH, USA, 1 page.
Database CAS citation 1957:51648 [retrieved Aug. 17, 2009] from STN; Columbus, OH, USA, 1 page.
Hanefeld et al., "Bis-thiolurethane aus Isocyanaten und substituierten Alkan-sowie Benzoldithiolen," Archiv der Pharmazie, 1986, vol. 319, pp. 310-317.
Johnson, "A novel rearrangement of N-bromosuccinimide," Journal of the American Chemical Society, 1957, 79, 753-754.
Smith et al., "Urethans of 2-Mercaptoethanol," Journal of the American Chemical Society, 1959, vol. 81, No. 1, pp. 161-163.
Yamaguchi et al., "Synthesis of taxoids 4. Novel and versatile methods for preparation of new taxoids by employing cis- or trans-phenyl glycidic acid," Tetrahedron, 1999, vol. 55, pp. 1005-1016.
PCT International Search Report and Written Opinion for PCT/US2008/082843 mailed Mar. 13, 2009, 16 pages.
PCT International Search Report and Written Opinion for PCT/US2008/082841, mailed Feb. 18, 2009, 14 pages.
PCT International Search Report and Written Opinion for PCT/US2008/055455, mailed Jul. 29, 2008, 12 pages.
Final Office Action in U.S. Appl. No. 11/059,792 dated Jan. 7, 2010, 9 pages.
Non-final Office Action in U.S. Appl. No. 11/059,792 dated Mar. 19, 2009, 7 pages.
Final Office Action in U.S. Appl. No. 11/060,675 dated Jun. 9, 2009, 6 pages.
Final Office Action in U.S. Appl. No. 11/060,675 dated Mar. 3, 2009, 9 pages.
Non-final Office Action in U.S. Appl. No. 11/060,675 dated Aug. 21, 2009, 8 pages.
Final Office Action in U.S. Appl. No. 11/060,675 dated Apr. 9, 2010, 5 pages.
Non-final Office Action in U.S. Appl. No. 11/465,013 dated Apr. 8, 2010, 37 pages.
Non-final Office Action in U.S. Appl. No. 11/465,013 dated Jul. 17, 2009, 20 pages.
Non-final Office Action in U.S. Appl. No. 11/680,842 dated Sep. 22, 2010, 12 pages.
Non-final Office Action in U.S. Appl. No. 11/680,842 dated Mar. 5, 2010, 21 pages.
Final Office Action in U.S. Appl. No. 11/983,387 dated Mar. 1, 2010, 9 pages.
Non-final Office Action in U.S. Appl. No. 11/983,387 dated Aug. 20, 2009, 18 pages.
Non-final Office Action in U.S. Appl. No. 11/983,388 dated Oct. 26, 2010, 25 pages.

* cited by examiner

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 791-008-15 | MHSO | Lupranate | DBTDL | 0.92 | 0.16 | B | D68 | 49.00 | 85.09 | 147.00 | Hard | Amber | Tough |
| 798-008-15 | CMSO | TDI | BDMA | 0.94 | 0.12 | B | A58 | -8.00 | 139.80 | 235.30 | Flexible | Dark Yellow | Tough |
| 791-030-1 | CO | IPDI | BDMA | 1.15 | 0.44 | B | A43 | -7.00 | 110.70 | 225.30 | Flexible | Light Yellow | Tough |
| 797-042-15 | MSO | Lupranate | DBTDL | 0.90 | 1.27 | B | 43D | 46.84 | 112.70 | 212.71 | Flexible | Amber | Tough |
| 788-059-15 | MHSO | HMDI | BDMA | 1.15 | 0.02 | B | D58 | 57.00 | 101.10 | 376.20 | Hard | Water White | Tough |
| 779-100-1 | MSO | TDI | BDMA | 0.62 | 0.27 | B | A87 | 47.00 | 159.60 | 261.90 | | No | |
| 421-036-15 | MHSO | TDI | A-480 | 0.86 | 0.08 | A | D71 | 61.00 | 106.70 | 224.70 | Hard | Water White | Tough |
| 733-078-1 | CMSO | HMDI | DBTDL | 0.90 | 0.79 | B | 58A | 18.16 | 99.19 | 256.05 | | | |
| 791-072-15 | MHSO | TDI | BDMA | 0.88 | 0.01 | B | D72 | 56.00 | 113.80 | 215.90 | Hard | Water White | Tough |
| 557-030-1 | CO | HMDI | DBTDL | 1.09 | 0.76 | B | 67A | -4.48 | 91.15 | 244.86 | Flexible | Light Yellow | Tough |
| 779-082-1 | MSO | TDI | DBTDL | 1.05 | 0.46 | B | A51 | -24.00 | 133.00 | 198.30 | | | |
| 421-083-1 | MHSO | IPDI | A-480 | 0.88 | 0.09 | A | D53 | 69.00 | 121.90 | 278.90 | Hard | Water White | Tough |
| 790-090-15 | CMSO | IPDI | A-480 | 0.95 | 1.97 | B | A50 | -21.00 | 127.60 | 218.40 | | | |
| 779-014-15 | CMSO | TDI | A-480 | 1.05 | 0.95 | A | 8D | -26.42 | 96.74 | 225.57 | | Light Yellow | |
| 756-016-15 | CMSO | TDI | A-480 | 1.00 | 1.96 | A | 46A | 16.84 | 199.28 | 241.53 | | Light Yellow | |
| 421-079-1 | MHSO | IPDI | A-480 | 0.92 | 0.03 | A | 74D | 62.22 | 114.84 | 221.59 | Hard | Water White | Tough |
| 798-072-15 | MSO | TDI | DBTDL | 0.95 | 1.16 | B | A77 | 6.00 | 130.70 | 236.80 | Flexible | Amber | Tough |
| 812-038-15 | MSO | IPDI | A-480 | 0.96 | 1.95 | A | 75A | -3.15 | 113.30 | 207.98 | Flexible | Light Yellow | Tough |
| 788-040-15 | MHSO | Lupranate | DABCO | 0.96 | 0.00 | A | D62 | 67.00 | 78.91 | 186.80 | Hard | Amber | Tough |
| 791-001-1 | MHSO | IPDI | DBTDL | 0.97 | 0.07 | B | 76D | 62.26 | 103.85 | 273.94 | Hard | Water White | Tough |
| 788-077-1 | MHSO | IPDI | A-480 | 1.09 | 0.04 | A | 78D | 79.16 | 92.47 | 204.05 | Hard | Water White | Tough |
| 797-026-1 | MSO | HMDI | DBTDL | 1.05 | 0.42 | B | 28A | -18.18 | 174.34 | 292.76 | Soft | Light Yellow | Semi-Tough |
| 790-095-15 | CMSO | IPDI | DBTDL | 1.04 | 0.45 | B | A46 | -19.00 | 142.50 | 220.20 | | | |
| 812-043-15 | MSO | HMDI | DBTDL | 0.94 | 0.79 | B | 80A | -7.86 | 129.01 | 205.40 | Flexible | Light Yellow | Tough |

FIG. 1A

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 797-013-1 | MSO | IPDI | A-480 | 1.00 | 1.98 | A | 33A | -20.10 | 191.16 | 295.71 | Flexible | Light Yellow | Semi-Tough |
| 791-014-1 | CO | HMDI | A-480 | 1.15 | 2.93 | A | A46 | -4.00 | 68.25 | 239.70 | Flexible | Light Yellow | Tough |
| 779-100-1 | MSO | TDI | BDMA | 0.62 | 0.27 | B | A87 | 47.00 | 159.60 | 261.90 | Hard | No | |
| 791-003-1 | MHSO | IPDI | DBTDL | 0.92 | 0.10 | B | 78D | 65.59 | 117.20 | 290.09 | Hard | Water White | Tough |
| 790-005-1 | CMSO | Lupranate | BDMA | 0.90 | 0.40 | A | A81 | -3.00 | 143.00 | 228.80 | | | |
| 788-031-15 | MHSO | HDI | DBTDL | 0.92 | 0.15 | B | D68 | 63.00 | 111.70 | 279.20 | Hard | Water White | Tough |
| 791-061-15 | CO | TDI | A-480 | 1.15 | 1.95 | C | 55A | 2.76 | 41.25 | 226.96 | Flexible | Light Yellow | Tough |
| 797-020-1 | MSO | IPDI | DBTDL | 1.05 | 0.80 | B | 31A | -20.60 | 158.58 | 263.86 | Flexible | Light Yellow | Semi-Tough |
| 798-068-1 | MSO | TDI | DBTDL | 0.90 | 0.37 | B | 25D | 51.64 | 183.99 | 272.35 | Flexible | Amber | Tough |
| 797-032-15 | MSO | Lupranate | A-480 | 0.68 | 6.51 | B | 70D | 50.00 | 123.18 | 317.33 | Hard | Amber | Tough |
| 557-028-15 | CO | HMDI | DBTDL | 1.08 | 0.44 | B | 68A | -3.16 | 113.50 | 224.43 | Flexible | Light Yellow | Tough |
| 421-008-1 | MHSO | Lupranate | A-480 | 0.88 | 0.04 | A | 81D | 38.48 | 73.29 | 121.61 | Hard | Amber | Tough |
| 421-029-15 | MHSO | HMDI | DBTDL | 0.97 | 0.11 | B | D68 | 67.00 | 126.30 | 391.70 | Hard | Water White | Tough |
| 778-090-15 | MSO | IPDI | BDMA | 1.00 | 1.15 | B | A56 | 3.00 | 123.00 | 219.80 | | Light Yellow | |
| 778-071-15 | MSO | HMDI | A-480 | 0.94 | 1.11 | A | A55 | -3.00 | 114.50 | 206.00 | | Light Yellow | |
| 779-100-1 | MSO | TDI | BDMA | 0.62 | 0.27 | B | A87 | 50.00 | 148.90 | 239.60 | | No | |
| 732-086-15 | MSO | HMDI | A-480 | 0.91 | 2.15 | A | 44A | -15.52 | 192.47 | 274.97 | Flexible | Light Yellow | Semi-Tough |
| 791-019-15 | CO | HDI | DBTDL | 1.15 | 0.12 | B | A53 | -25.00 | 95.11 | 247.50 | Flexible | Light Yellow | Tough |
| 557-051-1 | CO | HDI | DBTDL | 1.09 | 0.16 | B | A49 | -26.00 | 97.47 | 243.80 | Flexible | Light Yellow | Tough |
| 790-085-1 | CMSO | IPDI | BDMA | 0.98 | 0.92 | B | 52A | 11.82 | 132.04 | 242.72 | | | |
| 755-068-1 | MSO | TDI | DABCO | 0.72 | 0.00 | A | A86 | 24.00 | 120.90 | 275.00 | Hard | Light Yellow | |
| 798-028-1 | CMSO | TDI | DBTDL | 0.81 | 0.80 | B | A74 | 24.00 | 156.10 | 256.40 | | | |
| 791-024-15 | CO | IPDI | A-480 | 1.09 | 1.87 | A | 50A | -11.65 | 110.61 | 228.58 | Flexible | Light Yellow | Tough |
| 755-097-1 | MSO | Lupranate | DBTDL | 0.72 | 0.44 | B | A72 | 66.00 | 144.30 | 285.40 | Hard | Light Yellow | |

FIG. 1B

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 798-029-15 | CMSO | IPDI | DBTDL | 1.00 | 1.27 | B | A46 | -13.00 | 142.90 | 225.50 | Flexible | Dark Yellow | Tough |
| 779-040-1 | CMSO | HMDI | DBTDL | 1.00 | 1.19 | B | A54 | -15.00 | 125.50 | 219.80 | Flexible | | |
| 798-028-1 | CMSO | TDI | DBTDL | 0.81 | 0.80 | B | A74 | 24.00 | 156.10 | 256.40 | | | |
| 778-089-15 | MSO | IPDI | BDMA | 1.00 | 0.74 | B | 57A | -6.62 | 124.43 | 217.72 | | Light Yellow | |
| 791-028-15 | MSO/MHSO | TDI | A-480 | 0.95 | 0.04 | C | 81D | 52.97 | 100.29 | 213.33 | Flexible | Light Yellow | |
| 778-098-1 | MSO | TDI | BDMA | 1.00 | 0.12 | B | 27D | 25.72 | 101.15 | 216.72 | | Light Yellow | |
| 421-086-15 | MHSO | Lupranate | A-480 | 0.91 | 0.06 | A | D68 | 60.00 | 93.12 | 177.10 | Hard | Amber | Tough |
| 779-095-1 | MSO | IPDI | BDMA | 0.90 | 0.90 | B | A58 | -7.00 | 110.70 | 217.20 | | | |
| 421-061-1 | MHSO | Lupranate | BDMA | 0.91 | 0.00 | B | D65 | 58.00 | 87.15 | 165.30 | Hard | Amber | Tough |
| 790-084-15 | CMSO | IPDI | BDMA | 0.95 | 0.95 | B | 49A | 10.35 | 124.11 | 234.43 | | | |
| 797-014-15 | MSO | IPDI | A-480 | 0.95 | 2.94 | B | A28 | -19.00 | 121.10 | 214.20 | Flexible | Light Yellow | |
| 798-097-15 | MSO | Lupranate | DBTDL | 0.90 | 0.74 | A | 43D | 51.69 | 138.31 | 251.51 | Flexible | Amber | Tough |
| 788-068-1 | MHSO | Lupranate | DBTDL | 1.01 | 0.04 | B | 83D | 109.41 | 81.95 | 195.93 | Hard | Amber | Tough |
| 788-051-1 | MHSO | HMDI | DBTDL | 1.01 | 0.16 | C | D59 | 60.00 | 82.92 | 319.70 | Hard | Water White | Tough |
| 812-039-15 | MSO | IPDI | A-480 | 0.96 | 1.92 | A | 74A | -2.66 | 120.53 | 212.98 | Flexible | Light Yellow | Tough |
| 421-098-15 | CO | IPDI | DBTDL | 1.09 | 0.13 | B | A52 | -6.00 | 111.10 | 231.50 | Flexible | Light Yellow | Tough |
| 791-036-1 | CO | Lupranate | BDMA | 1.16 | 0.87 | B | 73A | 17.39 | 106.02 | 221.48 | Flexible | Amber | Tough |
| 779-100-1 | MSO | TDI | BDMA | 0.62 | 0.27 | B | A87 | 47.00 | 139.70 | 238.70 | | No | |
| 791-031-15 | CO | IPDI | BDMA | 1.14 | 0.60 | B | 54A | -12.19 | 85.18 | 236.08 | Flexible | Light Yellow | Tough |
| 797-039-15 | MSO | Lupranate | A-480 | 0.66 | 1.11 | B | 48D | 54.42 | 131.69 | 224.23 | Hard | Amber | Semi-Tough |
| 419-014-1 | MSO | IPDI | DBTDL | 0.91 | 0.80 | C | 77A | 50.14 | 191.47 | 235.48 | Flexible | Light Yellow | Semi-Tough |
| 798-020-15 | MSO | Lupranate | A-480 | 0.70 | 0.47 | B | 58D | 55.41 | 125.93 | 226.44 | | | |
| 755-007-15 | MSO | TDI | A-480 | 0.96 | 2.92 | A | A72 | -2.00 | 119.50 | 203.10 | | No | |
| 779-100-1 | MSO | TDI | BDMA | 0.62 | 0.27 | B | A87 | 49.00 | 170.50 | 233.40 | | | |

FIG. 1C

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 798-097-1 | MSO | Lupranate | DBTDL | 1.05 | 0.79 | A | | 38.75 | 130.81 | 231.70 | Flexible | Amber | Tough |
| 788-090-15 | MHSO | IPDI | BDMA | 1.14 | 0.02 | B | D66 | 66.00 | 104.80 | 315.40 | Hard | Water White | Tough |
| 812-015-15 | MSO | HMDI | A-480 | 1.00 | 3.01 | A | A62 | -3.00 | 138.90 | 219.80 | Flexible | Light Yellow | Tough |
| 791-013-1 | CO | HMDI | A-480 | 1.15 | 1.00 | A | A48 | -6.00 | 136.60 | 238.50 | Flexible | Light Yellow | Tough |
| 790-089-1 | CMSO | IPDI | A-480 | 1.00 | 1.07 | B | 48A | -25.83 | 119.14 | 240.88 | | | |
| 756-027-1 | CMSO | Lupranate | A-480 | 1.01 | 2.84 | A | A60 | -15.00 | 132.90 | 219.20 | | Light Yellow | |
| 790-055-1 | MSO | Lupranate | DBTDL | 0.79 | 0.37 | B | 52D | 51.46 | 125.58 | 232.49 | | | |
| 755-027-15 | MSO | Lupranate | DBTDL | 1.47 | 0.40 | B | 20D | -22.57 | 77.05 | 212.60 | | Light Yellow | |
| 797-027-1 | MSO | HMDI | DBTDL | 1.05 | 0.79 | B | A20 | -18.00 | 109.80 | 213.20 | Flexible | Light Yellow | Semi-Tough |
| 779-100-1 | MSO | TDI | BDMA | 0.62 | 0.27 | B | A87 | 49.00 | 170.50 | 233.40 | | No | |
| 779-100-1 | MSO | TDI | BDMA | 0.62 | 0.27 | B | A87 | 49.00 | 170.50 | 233.40 | | No | |
| 732-078-15 | MSO | Lupranate | A-480 | 0.67 | 2.02 | A | 28D | 53.66 | 167.44 | 266.58 | | | |
| 421-025-15 | MHSO | Lupranate | DBTDL | 0.87 | 1.04 | B | 80D | 49.92 | 87.61 | 141.54 | Hard | Amber | Tough |
| 421-034-15 | MHSO | TDI | A-480 | 0.89 | 0.05 | A | 78D | 53.88 | 84.68 | 174.17 | Hard | Water White | Tough |
| 798-092-1 | MSO | Lupranate | DBTDL | 1.05 | 0.41 | A | 65D | 45.02 | 132.22 | 225.54 | Flexible | Amber | Tough |
| 790-096-1 | CMSO | IPDI | DBTDL | 0.90 | 0.83 | B | 60A | -21.41 | 106.82 | 221.15 | | | |
| 797-054-1 | MSO | Lupranate | BDMA | 0.95 | 0.19 | A | 38D | 48.83 | 127.76 | 217.67 | Flexible | Amber | Tough |
| 797-040-15 | MSO | Lupranate | A-480 | 0.65 | 3.14 | B | 52D | 54.65 | 145.13 | 253.50 | Hard | Amber | Semi-Tough |
| 421-043-15 | MHSO | IPDI | DBTDL | 1.19 | 0.10 | B | 76D | 44.44 | 107.42 | 146.00 | Hard | Water White | Tough |
| 798-020-1 | MSO | Lupranate | A-480 | 0.52 | 0.41 | B | 69D | 61.90 | 136.70 | 245.32 | | | |
| 797-012-15 | MSO | IPDI | A-480 | 0.96 | 1.96 | A | 36A | -23.20 | 108.24 | 234.90 | Flexible | Light Yellow | Semi-Tough |
| 756-040-15 | CMSO | HMDI | A-480 | 1.00 | 2.91 | B | A38 | -10.00 | 144.40 | 233.10 | Flexible | Light Yellow | |
| 790-041-15 | MSO | Lupranate | A-480 | 0.79 | 1.16 | A | A85 | 56.00 | 157.30 | 309.00 | | | |
| 756-070-15 | MSO | TDI | A-480 | 0.94 | 1.95 | A | 74A | 24.74 | 119.58 | 227.15 | | Light Yellow | |

FIG. 1D

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 756-031-15 | CMSO | Lupranate | DABCO | 1.00 | 0.01 | A | A51 | -15.00 | 122.40 | 210.20 | Flexible | | |
| 779-100-1 | MSO | TDI | BDMA | 0.62 | 0.27 | B | A87 | 49.00 | 170.50 | 233.40 | | No | |
| 778-075-1 | MSO | IPDI | A-480 | 0.96 | 1.94 | A | 23D | 28.13 | 119.76 | 224.12 | | Light Yellow | |
| 779-039-15 | CMSO | HMDI | DBTDL | 1.04 | 0.74 | B | 45A | -19.67 | 128.68 | 250.49 | | | |
| 733-027-1 | CMSO | Lupranate | A-480 | 0.91 | 2.24 | A | 83A | 30.83 | 117.36 | 201.24 | | | |
| 797-040-1 | MSO | Lupranate | A-480 | 0.66 | 3.20 | B | 58D | 85.44 | 134.11 | 191.17 | Hard | Amber | Tough |
| 788-047-1 | MHSO | HMDI | A-480 | 1.01 | 0.02 | A | 78D | 51.08 | 99.11 | 200.81 | Hard | Water White | Tough |
| 797-010-15 | MSO | IPDI | A-480 | 0.95 | 1.04 | A | A16 | -19.00 | 120.90 | 209.90 | Flexible | Light Yellow | Semi-Tough |
| 778-039-1 | MSO | Lupranate | BDMA | 0.94 | 0.26 | B | 37D | -15.85 | 197.83 | | | Light Yellow | |
| 778-075-15 | MSO | IPDI | A-480 | 0.90 | 1.99 | A | 56A | -7.36 | 110.62 | 228.12 | | Light Yellow | |
| 733-076-15 | CMSO | HMDI | DBTDL | 0.88 | 0.37 | B | 48A | -8.51 | 162.42 | 232.96 | | | |
| 733-077-15 | CMSO | HMDI | DBTDL | 0.65 | 0.40 | B | A82 | 50.00 | 158.80 | 242.30 | Flexible | Dark Yellow | Tough |
| 790-037-15 | MSO | Lupranate | BDMA | 0.88 | 0.27 | A | 39D | 51.12 | 143.20 | 227.48 | | Light Yellow | |
| 421-009-15 | MHSO | Lupranate | A-480 | 0.77 | 0.10 | A | D74 | 57.00 | 88.14 | 159.60 | Hard | Amber | Tough |
| 790-033-1 | MSO | TDI | BDMA | 0.87 | 0.24 | A | 76A | 26.68 | 158.43 | 222.16 | | | |
| 788-008-15 | MHSO | HMDI | A-480 | 1.44 | 0.08 | B | D75 | 48.00 | 98.53 | 363.40 | Hard | Water White | Tough |
| 779-083-1 | MSO | TDI | DBTDL | 1.01 | 1.14 | B | A69 | -3.00 | 126.30 | 224.20 | | | |
| 798-001-15 | CMSO | TDI | DBTDL | 1.06 | 0.83 | B | 55A | 7.14 | 148.64 | 244.16 | | No | |
| 779-100-1 | MSO | TDI | BDMA | 0.62 | 0.27 | B | A87 | 47.00 | 159.60 | 261.90 | | | |
| 778-056-15 | MSO | Lupranate | A-480 | 0.90 | 1.94 | A | A76 | 32.00 | 145.20 | 270.10 | | | |
| 798-072-1 | MSO | TDI | DBTDL | 0.90 | 1.22 | B | 24D | 30.05 | 126.88 | 235.99 | Flexible | Amber | Tough |
| 755-026-1 | MSO | Lupranate | DBTDL | 0.96 | 1.27 | B | A82 | 16.00 | 101.20 | 183.60 | | Amber | |
| 755-035-1 | MSO | HMDI | A-480 | 0.96 | 2.82 | B | A74 | 4.00 | 35.70 | 182.20 | | Light Yellow | |
| 797-021-1 | MSO | IPDI | DBTDL | 1.00 | 1.18 | B | A32 | -16.00 | 142.60 | 226.80 | Flexible | Dark Yellow | Tough |

FIG. 1E

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 779-062-1 | MSO | TDI | DBTDL | 1.00 | 0.79 | B | 58A | -23.45 | 98.04 | 236.56 | | | |
| 797-035-15 | MSO | Lupranate | A-480 | 0.74 | 8.53 | B | 62D | 52.19 | 99.85 | 245.20 | Hard | Amber | Tough |
| 791-011-15 | CO | Lupranate | A-480 | 1.15 | 1.01 | A | 70A | -14.20 | 85.22 | 223.08 | Flexible | Light Yellow | Tough |
| 798-095-1 | MSO | Lupranate | A-480 | 0.57 | 7.36 | A | 70D | 58.84 | 64.42 | 308.36 | Hard | Amber | Tough |
| 755-031-1 | MSO | TDI | DBTDL | 0.86 | 1.17 | B | A67 | -4.00 | 89.82 | 170.50 | | Light Yellow | |
| 733-082-15 | CMSO | Lupranate | DBTDL | 0.90 | 0.89 | B | 86A | 18.07 | 65.23 | 208.95 | | | |
| 778-073-1 | MSO | IPDI | A-480 | 1.00 | 0.92 | A | 18D | -8.85 | 108.25 | 231.38 | | Light Yellow | |
| 791-026-1 | CO | IPDI | A-480 | 1.10 | 2.83 | A | A45 | -2.00 | 130.20 | 244.50 | Flexible | Light Yellow | Tough |
| 790-007-1 | CMSO | Lupranate | BDMA | 0.81 | 0.27 | A | 34D | 47.27 | 146.92 | 226.64 | | | |
| 421-025-1 | MHSO | Lupranate | DBTDL | 0.97 | 0.10 | B | D74 | 55.00 | 81.05 | 168.90 | Hard | Amber | Tough |
| 797-031-15 | MSO | Lupranate | A-480 | 0.79 | 6.70 | B | 61D | 49.04 | 135.84 | 257.58 | Hard | Amber | Tough |
| 778-076-1 | MSO | IPDI | A-480 | 1.00 | 2.95 | A | A75 | 8.00 | 119.60 | 226.90 | Flexible | Light Yellow | |
| 756-094-15 | MSO | Lupranate | DABCO | 0.93 | 0.01 | A | A85 | -3.00 | 147.40 | 198.90 | Hard | Light Yellow | |
| 797-013-15 | MSO | IPDI | A-480 | 1.05 | 1.99 | B | 31A | -20.86 | 171.99 | 277.87 | Flexible | Light Yellow | Semi-Tough |
| 779-098-1 | MSO | IPDI | BDMA | 0.99 | 1.22 | A | A70 | 27.00 | 97.89 | 257.90 | | | |
| 778-063-15 | MSO | IPDI | A-480 | 0.85 | 1.92 | A | 45A | -6.33 | 217.13 | | | Light Yellow | |
| 791-040-1 | CO | HMDI | BDMA | 1.09 | 0.40 | B | 60A | 11.88 | 64.72 | 236.19 | Flexible | Light Yellow | Tough |
| 756-066-1 | CMSO | Lupranate | DBTDL | 1.01 | 0.83 | B | 67A | 3.95 | 104.23 | 214.02 | | Light Yellow | |
| 421-085-15 | MHSO | HDI | A-480 | 0.92 | 0.10 | A | D57 | 61.00 | 141.80 | 325.20 | Hard | Water White | Tough |
| 756-026-1 | CMSO | Lupranate | A-480 | 0.91 | 2.15 | A | 74A | 15.73 | 114.59 | 213.85 | | Light Yellow | |
| 756-049-15 | CMSO | HMDI | DBTDL | 1.02 | 1.26 | B | A39 | -15.00 | 119.90 | 226.70 | Flexible | Light Yellow | |
| 788-096-15 | MHSO | IPDI | DBTDL | 1.15 | 0.14 | B | D71 | 63.00 | 102.20 | 258.00 | Hard | Water White | Tough |
| 421-050-1 | MHSO | HMDI | BDMA | 0.97 | 0.00 | B | 68D | 55.46 | 119.20 | 231.96 | Hard | Water White | Tough |
| 790-025-1 | MSO | TDI | A-480 | 0.83 | 3.22 | C | A78 | 1.00 | 128.90 | 235.80 | Flexible | Light Yellow | Tough |

FIG. 1F

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 788-034-15 | MHSO | Lupranate | A-480 | 0.96 | 0.04 | A | 80D | 100.94 | 98.13 | 183.15 | Hard | Amber | Tough |
| 779-037-1 | CMSO | TDI | BDMA | 1.01 | 1.11 | B | A49 | -19.00 | 121.70 | 227.20 | Flexible | Light Yellow | Tough |
| 791-052-1 | CO | HDI | BDMA | 1.09 | 1.19 | B | A48 | -26.00 | 104.90 | 241.90 | Flexible | Water White | Tough |
| 557-100-15 | MHSO | HDI | DABCO | 0.86 | 0.01 | B | D70 | 61.00 | 133.80 | 279.70 | Tough | Amber | Tough |
| 797-031-1 | MSO | Lupranate | A-480 | 0.70 | 5.70 | B | 69D | 51.04 | 121.12 | 306.30 | Hard | Water White | Tough |
| 421-059-15 | MHSO | HDI | BDMA | 0.92 | 0.02 | B | D58 | 62.00 | 132.80 | 279.00 | Hard | Water White | Tough |
| 421-034-1 | MHSO | TDI | A-480 | 0.97 | 0.05 | A | 79D | 58.55 | 99.15 | 190.22 | Hard | Amber | |
| 755-017-1 | MSO | Lupranate | A-480 | 0.95 | 2.91 | A | A81 | 0.00 | 133.70 | 209.20 | | | |
| 790-079-1 | CMSO | TDI | A-480 | 1.00 | 1.09 | B | A52 | -20.00 | 118.20 | 221.80 | | | |
| 797-052-15 | MSO | Lupranate | BDMA | 0.90 | 0.12 | A | 41D | 41.31 | 123.66 | 230.56 | Flexible | Amber | Tough |
| 778-096-1 | MSO | IPDI | DBTDL | 0.95 | 1.19 | B | A72 | 4.00 | 118.80 | 213.40 | Flexible | Light Yellow | |
| 779-020-15 | CMSO | Lupranate | A-480 | 1.05 | 0.94 | A | A48 | -18.00 | 138.20 | 234.80 | | | |
| 778-021-15 | MSO | Lupranate | DBTDL | 0.84 | 0.78 | B | 57D | 50.94 | 149.14 | 264.54 | | Light Yellow | |
| 557-046-15 | CO | HDI | DABCO | 1.10 | 0.01 | B | A52 | -29.00 | 103.50 | 242.60 | Flexible | Light Yellow | Tough |
| 756-013-1 | MSO | TDI | DBTDL | 1.01 | 1.20 | B | A69 | -8.00 | 106.60 | 208.40 | Flexible | Light Yellow | |
| 733-025-15 | CMSO | Lupranate | A-480 | 0.90 | 1.34 | A | 29D | 51.40 | 125.50 | 238.99 | | | |
| 557-064-15 | CO | Lupranate | DBTDL | 1.10 | 0.00 | B | A82 | 8.00 | 101.70 | 203.10 | Flexible | Amber | Tough |
| 791-072-15 | MHSO | TDI | BDMA | 0.88 | 0.01 | B | D72 | 56.00 | 113.40 | 220.90 | Hard | Water White | Tough |
| 778-089-1 | MSO | IPDI | BDMA | 0.90 | 0.37 | B | A40 | -9.00 | 124.20 | 203.80 | Soft | Light Yellow | |
| 778-064-1 | MSO | IPDI | A-480 | 0.94 | 2.84 | A | A73 | 4.00 | 86.84 | 201.40 | Flexible | Light Yellow | |
| 790-055-15 | MSO | Lupranate | DBTDL | 0.87 | 0.82 | B | 40D | 46.23 | 157.91 | 230.63 | | | |
| 798-028-1 | CMSO | TDI | DBTDL | 0.81 | 0.80 | B | A74 | 24.00 | 156.10 | 256.40 | | | |
| 421-046-1 | MHSO | TDI | BDMA | 0.92 | 0.00 | B | 78D | 65.07 | 110.16 | 149.39 | Hard | Water White | Tough |
| 791-087-15 | MHSO | IPDI | BDMA | 1.09 | 0.02 | B | 78D | 63.97 | 100.45 | 269.67 | Hard | Water White | Tough |

FIG. 1G

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 798-041-15 | MSO | IPDI | BDMA | 1.00 | 1.16 | B | A28 | -17.00 | 142.80 | 250.40 | Flexible | Light Yellow | Tough |
| 732-068-15 | MSO | TDI | A-480 | 0.91 | 1.93 | A | 47A | -23.80 | 143.98 | 225.20 | | | |
| 755-059-15 | MSO | TDI | A-480 | 0.90 | 1.00 | A | A65 | 7.00 | 124.50 | 218.50 | | Light Yellow | |
| 798-004-1 | CMSO | TDI | BDMA | 0.89 | 0.42 | B | 70A | 12.78 | 151.70 | 232.85 | | | |
| 756-098-15 | MSO | Lupranate | A-480 | 0.68 | 2.05 | A | 63D | 54.23 | 124.42 | 283.17 | | Light Yellow | |
| 788-067-15 | MHSO | Lupranate | DABCO | 1.01 | 0.01 | A | D61 | 55.00 | 81.45 | 184.50 | Hard | Amber | Tough |
| 788-001-15 | MHSO | TDI | A-480 | 1.07 | 0.05 | A | 80D | 58.57 | 80.82 | 129.58 | Hard | Water White | Tough |
| 790-054-1 | MSO | Lupranate | DBTDL | 0.88 | 0.46 | B | 40D | 46.76 | 132.36 | 232.53 | | | |
| 788-065-1 | MHSO | Lupranate | A-480 | 1.01 | 0.02 | A | 83D | 59.73 | 79.49 | 165.05 | Hard | Amber | Tough |
| 733-081-1 | CMSO | Lupranate | DBTDL | 0.90 | 0.42 | B | 35D | 47.61 | 111.81 | 219.60 | | | |
| 798-002-15 | CMSO | TDI | DBTDL | 0.95 | 1.22 | B | A54 | -20.00 | 118.20 | 228.20 | Flexible | Dark Yellow | Tough |
| 755-098-1 | MSO | Lupranate | DBTDL | 0.90 | 0.76 | B | A77 | 40.00 | 134.20 | 234.50 | | Light Yellow | |
| 421-028-1 | MHSO | HMDI | DBTDL | 0.96 | 0.05 | B | 74D | 57.25 | 110.29 | 239.76 | Hard | Water White | Tough |
| 791-081-1 | MHSO | TDI | DBTDL | 0.88 | 0.11 | B | 82D | 48.92 | 91.23 | 139.59 | Hard | Water White | Tough |
| 778-072-15 | MSO | HMDI | A-480 | 0.94 | 2.83 | A | A77 | 13.00 | 108.30 | 209.40 | | Light Yellow | |
| 791-072-15 | MHSO | TDI | BDMA | 0.88 | 0.01 | B | D72 | 54.00 | 112.70 | 218.80 | Hard | Water White | Tough |
| 756-004-1 | MSO | HDI | DBTDL | 1.00 | 1.10 | B | A50 | -22.00 | 89.14 | 210.70 | Flexible | Light Yellow | |
| 756-080-1 | MSO | HMDI | A-480 | 0.84 | 1.91 | A | 55A | 22.29 | 111.15 | 235.80 | | Light Yellow | |
| 779-073-15 | MSO | IPDI | DBTDL | 1.04 | 0.77 | B | A38 | -11.00 | 120.00 | 215.80 | | | |
| 755-033-15 | MSO | HMDI | A-480 | 0.96 | 1.99 | B | 68A | 26.63 | 92.45 | 225.36 | | Light Yellow | |
| 756-069-1 | MSO | TDI | A-480 | 0.94 | 0.98 | A | A65 | -4.00 | 148.80 | 226.00 | | Light Yellow | |
| 797-023-1 | MSO | Lupranate | DBTDL | 1.00 | 0.90 | B | 65A | 36.31 | 138.71 | 242.40 | Flexible | Amber | Semi-Tough |
| 797-030-1 | MSO | Lupranate | A-480 | 0.81 | 6.04 | B | 56D | 50.67 | 112.41 | 248.80 | Hard | Amber | Tough |
| 755-029-1 | MSO | TDI | DBTDL | 0.96 | 0.86 | B | 77A | 16.62 | 207.90 | | | Light Yellow | |

FIG. 1H

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 557-024-1 | CO | HMDI | A-480 | 1.10 | 1.10 | A | A53 | -6.00 | 78.64 | 198.60 | Flexible | Light Yellow | Tough |
| 421-081-15 | MHSO | IPDI | A-480 | 0.87 | 0.05 | A | 68D | 55.60 | 106.92 | 489.63 | Flexible | Water White | Tough |
| 421-073-15 | MHSO | HDI | DABCO | 0.97 | 0.01 | A | D59 | 61.00 | 138.50 | 267.70 | Hard | Water White | Tough |
| 790-087-1 | CMSO | IPDI | BDMA | 1.00 | 1.35 | B | A47 | -11.00 | 122.90 | 229.70 | Flexible | Light Yellow | Tough |
| 419-001-15 | MSO | HMDI | A-480 | 0.90 | 1.96 | A | 61A | -10.01 | 107.18 | 217.72 |  | Light Yellow |  |
| 756-072-1 | MSO | TDI | A-480 | 0.94 | 2.90 | A | A73 | -1.00 | 121.20 | 221.20 | Flexible | Light Yellow |  |
| 791-072-15 | MHSO | TDI | BDMA | 0.88 | 0.01 | B | D72 | 56.00 | 113.80 | 215.90 | Hard | Water White | Tough |
| 732-085-1 | MSO | HMDI | A-480 | 0.91 | 1.10 | A | 40A | 7.14 | 76.53 | 285.50 |  |  |  |
| 791-072-15 | MHSO | TDI | BDMA | 0.88 | 0.01 | B | D72 | 54.00 | 112.70 | 218.80 | Hard | Water White | Tough |
| 779-009-15 | MSO | Lupranate | BDMA | 1.00 | 0.24 | B | D48 | 47.00 | 106.80 | 241.90 |  | Light Yellow |  |
| 798-011-1 | CMSO | Lupranate | DBTDL | 0.99 | 0.84 | B | 24D | 38.52 | 152.02 | 251.83 |  |  |  |
| 791-088-15 | MHSO | IPDI | DBTDL | 0.87 | 0.10 | A | 78D | 61.09 | 100.49 | 182.13 | Hard | Water White | Tough |
| 421-065-1 | MHSO | IPDI | BDMA | 0.97 | 0.00 | B | 75D | 62.40 | 101.89 | 233.94 | Hard | Water White | Tough |
| 779-076-15 | MSO | TDI | BDMA | 1.00 | 0.01 | B | 24D | 37.52 | 172.20 | 244.59 |  |  |  |
| 755-053-1 | MSO | HDI | DABCO | 0.95 | 0.01 | B | A45 | -18.00 | 124.90 | 235.50 |  | Light Yellow |  |
| 788-022-15 | MHSO | HDI | A-480 | 0.93 | 0.08 | B | D66 | 65.00 | 124.60 | 401.90 | Hard | Water White | Tough |
| 812-042-15 | MSO | HMDI | DBTDL | 0.92 | 0.76 | B | 25D | -9.75 | 124.56 | 207.41 |  |  |  |
| 790-021-15 | CMSO | TDI | DBTDL | 0.84 | 0.90 | B | A69 | -18.00 | 134.70 | 222.60 | Flexible | Dark Yellow | Tough |
| 733-068-15 | CMSO | TDI | DBTDL | 0.63 | 0.44 | A | A78 | 23.00 | 150.20 | 254.70 | Flexible | Dark Yellow | Tough |
| 421-049-1 | MHSO | TDI | BDMA | 0.91 | 0.02 | B | D68 | 56.00 | 95.34 | 158.20 | Hard | Water White | Tough |
| 756-096-15 | MSO | Lupranate | A-480 | 0.84 | 1.00 | A | 52D | 51.79 | 141.78 | 255.42 |  | Light Yellow |  |
| 797-034-15 | MSO | Lupranate | A-480 | 0.72 | 7.58 | B | 67D | 50.25 | 132.49 | 277.10 | Hard | Amber | Tough |
| 421-065-15 | MHSO | IPDI | BDMA | 0.91 | 0.01 | B | 78D | 61.55 | 116.34 | 228.25 | Hard | Water White | Tough |
| 791-059-1 | CO | IPDI | DABCO | 1.10 | 0.00 | A | A51 | -2.00 | 98.32 | 249.00 | Flexible | Light Yellow | Tough |

FIG. 11

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 733-019-1 | MSO | Lupranate | DBTDL | 0.66 | 0.80 | A | 34D | 52.03 | 164.62 | 244.33 | | | |
| 791-042-15 | CO | HMDI | BDMA | 1.15 | 1.19 | B | A56 | -3.00 | 117.20 | 243.40 | Flexible | Light Yellow | Tough |
| 798-093-1 | MSO | Lupranate | A-480 | 0.54 | 7.76 | A | 71D | 56.05 | 110.65 | 307.49 | Hard | Amber | Tough |
| 791-048-1 | CO | HDI | BDMA | 1.21 | 0.40 | B | A41 | -29.00 | 88.50 | 248.50 | Flexible | Light Yellow | Tough |
| 779-100-1 | MSO | TDI | BDMA | 0.62 | 0.27 | B | A87 | 47.00 | 159.60 | 261.90 | | No | |
| 756-022-15 | CMSO | TDI | DABCO | 1.00 | 0.01 | A | A43 | -18.00 | 141.90 | 225.20 | Flexible | Light Yellow | |
| 779-100-1 | MSO | TDI | BDMA | 0.62 | 0.27 | B | A87 | 47.00 | 139.70 | 238.70 | | No | |
| 419-008-15 | MSO | IPDI | A-480 | 0.96 | 1.96 | A | 42A | 14.28 | 146.03 | 222.05 | Flexible | Light Yellow | |
| 792-003-15 | CO | Lupranate | DBTDL | 1.15 | 0.00 | B | A70 | -3.00 | 95.52 | 215.10 | Flexible | Amber | Tough |
| 798-009-1 | CMSO | TDI | BDMA | 1.00 | 0.12 | B | A54 | -12.00 | 134.50 | 210.30 | Flexible | Dark Yellow | Tough |
| 798-028-1 | CMSO | TDI | DBTDL | 0.81 | 0.80 | B | A74 | 22.00 | 143.20 | 265.20 | | | |
| 791-028-1 | MSO/MHSO | TDI | A-480 | 0.96 | 0.06 | C | 76D | 54.05 | 106.92 | 201.45 | Flexible | Light Yellow | |
| 791-089-1 | MHSO | IPDI | DBTDL | 0.87 | 0.10 | A | 79D | 61.25 | 97.68 | 208.56 | Hard | Water White | Tough |
| 790-030-1 | MSO | TDI | A-480 | 0.79 | 2.29 | A | 81A | 29.97 | 133.24 | 221.53 | | | |
| 798-091-15 | MSO | Lupranate | DBTDL | 1.00 | 0.40 | A | 34D | 44.65 | 116.12 | 214.65 | Flexible | Amber | Tough |
| 421-093-1 | MSO | IPDI | DABCO | 0.49 | 0.00 | B | D69 | 40.00 | 88.44 | 212.30 | Hard | Water White | Tough |
| 557-016-15 | CO | Lupranate | A-480 | 1.09 | 2.07 | A | 81A | -8.00 | 80.93 | 205.28 | Flexible | Amber | Tough |
| 733-022-15 | CMSO | TDI | A-480 | 0.89 | 1.90 | A | 67A | 16.73 | 124.66 | 225.64 | | | |
| 791-043-1 | CO | HMDI | BDMA | 1.09 | 1.14 | B | A52 | 1.00 | 109.60 | 231.40 | Flexible | Light Yellow | Tough |
| 419-008-15 | MSO | IPDI | A-480 | 0.96 | 1.96 | A | | 14.28 | 146.03 | 222.05 | Flexible | Light Yellow | |
| 421-062-1 | MHSO | Lupranate | BDMA | 0.99 | 0.01 | B | D69 | 56.00 | 94.74 | 183.50 | Hard | Amber | Tough |
| 778-061-1 | MSO | IPDI | A-480 | 0.93 | 1.05 | A | 15D | -5.40 | 144.36 | 221.48 | | Light Yellow | |
| 778-040-1 | MSO | Lupranate | BDMA | 0.85 | 0.27 | B | 51D | 49.98 | 106.74 | 253.48 | | Light Yellow | |
| 756-036-1 | CMSO | TDI | DBTDL | 1.01 | 1.25 | B | A37 | -20.00 | 151.90 | 227.30 | Flexible | Light Yellow | |

FIG. 1J

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 791-081-15 | MHSO | TDI | DBTDL | 0.88 | 0.10 | B | 80D | 40.17 | 93.81 | 135.76 | Hard | Water White | Tough |
| 733-071-15 | CMSO | TDI | DBTDL | 0.65 | 1.27 | A | A87 | 45.00 | 149.20 | 280.20 | Flexible | Dark Yellow | Tough |
| 421-047-15 | MHSO | TDI | BDMA | 0.91 | 0.01 | B | D64 | 55.00 | 108.90 | 193.40 | Hard | Water White | Tough |
| 812-018-15 | MSO | IPDI | A-480 | 1.00 | 2.89 | A | A52 | -3.00 | 154.90 | 241.60 | Flexible | Light Yellow | Semi-Tough |
| 791-017-1 | CO | TDI | DABCO | 1.14 | 0.00 | A | A53 | -8.00 | 116.20 | 237.30 | Flexible | Light Yellow | Tough |
| 798-028-1 | CMSO | TDI | DBTDL | 0.81 | 0.80 | B | A74 | 22.00 | 143.20 | 265.20 | | | |
| 779-012-15 | MSO | Lupranate | DBTDL | 0.95 | 1.18 | B | A79 | 34.00 | 114.50 | 196.00 | | | |
| 733-009-15 | MSO | TDI | DBTDL | 0.83 | 0.88 | B | 54A | 6.72 | 207.15 | 302.37 | | | |
| 756-025-15 | CMSO | Lupranate | A-480 | 1.01 | 1.92 | A | 69A | 14.43 | 138.52 | 222.45 | | Light Yellow | |
| 421-063-1 | MHSO | Lupranate | BDMA | 0.88 | 0.01 | B | 82D | 52.42 | 91.68 | 146.02 | Hard | Amber | Tough |
| 790-029-15 | MSO | TDI | A-480 | 0.87 | 2.12 | A | 72A | 33.31 | 208.24 | 291.72 | | | |
| 791-072-15 | MHSO | TDI | BDMA | 0.88 | 0.01 | B | D72 | 54.00 | 112.70 | 218.80 | Hard | Water White | Tough |
| 756-081-1 | MSO | HMDI | A-480 | 0.94 | 2.92 | A | A68 | 6.00 | 141.10 | 228.00 | Flexible | Light Yellow | |
| 791-072-15 | MHSO | TDI | BDMA | 0.88 | 0.01 | B | D72 | 56.00 | 113.40 | 220.90 | Hard | Water White | Tough |
| 419-006-1 | MSO | TDI | A-480 | 0.90 | 1.99 | C | 80A | 29.65 | 143.16 | 224.58 | Hard | Light Yellow | Semi-Tough |
| 755-044-1 | MSO | HMDI | DBTDL | 0.96 | 1.26 | B | A82 | 1.00 | 125.60 | 197.10 | | Light Yellow | |
| 790-098-15 | CMSO | TDI | DBTDL | 0.94 | 0.40 | B | 65A | 1.12 | 99.43 | 234.12 | | | |
| 788-055-1 | MHSO | HDI | DBTDL | 1.01 | 0.10 | B | 76D | 52.97 | 110.86 | 202.45 | Hard | Water White | Tough |
| 779-025-1 | CMSO | IPDI | A-480 | 0.90 | 1.84 | A | 13D | -18.73 | 141.17 | 239.33 | | Light Yellow | |
| 756-064-15 | CMSO | Lupranate | DBTDL | 0.99 | 0.43 | B | 15D | 20.77 | 154.71 | 246.67 | | Light Yellow | |
| 421-070-15 | MHSO | HMDI | DABCO | 0.92 | 0.00 | A | D67 | 66.00 | 114.30 | 237.80 | Hard | Water White | Tough |
| 557-001-15 | CO | TDI | A-480 | 1.10 | 1.06 | A | 61A | 2.26 | 170.82 | 352.26 | Flexible | Light Yellow | Tough |
| 421-013-15 | MHSO | TDI | DBTDL | 0.88 | 0.10 | B | 79D | 53.99 | 95.51 | 164.04 | Hard | Water White | Tough |
| 788-014-1 | MHSO | HMDI | DBTDL | 1.62 | 0.05 | B | 77D | 47.90 | 105.38 | 199.69 | Hard | Water White | Tough |

FIG. 1K

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 797-026-15 | MSO | HMDI | DBTDL | 1.00 | 0.79 | B | 39A | -19.60 | 152.69 | 269.27 | Flexible | Light Yellow | Semi-Tough |
| 798-059-15 | MSO | HMDI | A-480 | 1.00 | 2.86 | B | A70 | 9.00 | 112.60 | 232.40 | Flexible | Light Yellow | Tough |
| 779-086-1 | MSO | HMDI | DBTDL | 1.00 | 1.14 | B | A61 | 4.00 | 125.40 | 214.30 | | | |
| 791-072-15 | MHSO | TDI | BDMA | 0.88 | 0.01 | B | D72 | 54.00 | 112.70 | 218.80 | Hard | Water White | Tough |
| 790-074-15 | CMSO | Lupranate | DBTDL | 0.90 | 0.82 | B | A70 | -10.00 | 126.50 | 210.20 | | | |
| 791-082-15 | MHSO | TDI | BDMA | 0.88 | 0.01 | B | 81D | 117.39 | 105.50 | 118.09 | Hard | Water White | Tough |
| 732-078-1 | MSO | Lupranate | A-480 | 0.84 | 1.89 | A | 77A | 11.87 | 112.82 | 220.63 | | | |
| 798-012-15 | CMSO | Lupranate | DBTDL | 0.60 | 1.16 | B | A86 | 28.00 | 137.90 | 299.80 | Hard | Amber | Tough |
| 756-065-1 | CMSO | Lupranate | DBTDL | 0.90 | 0.45 | B | A65 | -4.00 | 116.90 | 203.90 | | Light Yellow | |
| 791-051-15 | CO | HDI | BDMA | 1.15 | 1.19 | B | A44 | -27.00 | 100.80 | 242.50 | Flexible | Light Yellow | Tough |
| 791-087-1 | MHSO | IPDI | BDMA | 1.09 | 0.01 | B | 80D | 68.56 | 97.95 | 191.15 | Hard | Water White | Tough |
| 790-066-15 | MSO | IPDI | A-480 | 0.77 | 2.02 | B | 46A | 5.27 | 160.37 | 223.79 | | | |
| 421-026-15 | MHSO | Lupranate | DBTDL | 0.87 | 0.20 | B | D68 | 58.00 | 90.30 | 170.10 | Hard | Amber | Tough |
| 812-012-15 | MSO | HMDI | DBTDL | 1.00 | 1.14 | B | A53 | -5.00 | 125.60 | 213.80 | Flexible | Light Yellow | Tough |
| 797-032-1 | MSO | Lupranate | A-480 | 0.75 | 6.63 | B | 65D | 50.44 | 128.04 | 279.29 | Hard | Amber | Semi-Tough |
| 798-011-15 | CMSO | Lupranate | DBTDL | 1.04 | 0.79 | B | 20D | 23.48 | 107.14 | 221.61 | | | |
| 788-036-1 | MHSO | Lupranate | A-480 | 0.96 | 0.06 | A | D64 | 60.00 | 84.69 | 171.70 | Hard | Amber | Tough |
| 790-042-15 | MSO | Lupranate | A-480 | 0.83 | 2.02 | A | 43D | 50.61 | 96.91 | 257.30 | | | |
| 798-016-1 | CMSO | Lupranate | BDMA | 1.00 | 0.37 | B | 23D | 23.00 | 129.03 | 217.64 | | | |
| 779-010-15 | MSO | Lupranate | BDMA | 0.99 | 0.14 | B | 40D | 44.12 | 114.85 | 209.26 | Hard | Amber | Tough |
| 733-073-15 | CMSO | HMDI | A-480 | 0.89 | 1.90 | B | 51A | 16.94 | 123.58 | 250.05 | | | |
| 791-084-1 | MHSO | Lupranate | DBTDL | 0.96 | 0.10 | B | 83D | 122.10 | 99.33 | 137.27 | Hard | Amber | Tough |
| 798-028-1 | CMSO | TDI | DBTDL | 0.81 | 0.80 | B | A74 | 24.00 | 153.60 | 253.50 | | | |
| 756-018-1 | CMSO | TDI | A-480 | 1.00 | 2.87 | A | A42 | -16.00 | 144.60 | 226.80 | Flexible | Light Yellow | |

FIG. 1L

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 779-032-15 | CMSO | TDI | BDMA | 0.95 | 0.41 | B | 55A | 5.26 | 161.35 | 238.74 | | | |
| 419-016-1 | MSO | IPDI | DBTDL | 0.95 | 0.79 | B | 71A | 21.37 | 119.59 | 222.74 | Flexible | Light Yellow | |
| 790-097-15 | CMSO | IPDI | DBTDL | 1.04 | 0.84 | B | 53A | 6.19 | 111.55 | 232.75 | | | |
| 798-019-15 | MSO | Lupranate | A-480 | 0.40 | 0.42 | B | 75D | 63.90 | 109.19 | 251.13 | | | |
| 778-041-15 | MSO | Lupranate | BDMA | 0.83 | 0.14 | B | A88 | 47.00 | 123.50 | 238.00 | | Light Yellow | |
| 778-004-1 | MSO | HDI | A-480 | 0.93 | 2.86 | A | A49 | -19.00 | 124.70 | 230.20 | Flexible | Light Yellow | |
| 778-094-1 | MSO | IPDI | DBTDL | 1.00 | 1.22 | B | A71 | -7.00 | 119.40 | 212.10 | | Light Yellow | |
| 733-023-15 | MSO | TDI | A-480 | 0.54 | 2.05 | A | A86 | 23.00 | 141.00 | 243.30 | Flexible | Light Yellow | Tough |
| 788-027-1 | MHSO | HDI | DABCO | 0.93 | 0.01 | B | D65 | 66.00 | 117.80 | 337.60 | Hard | Water White | Tough |
| 791-026-15 | MHSO/CMSO | TDI | A-480 | 0.92 | 0.05 | C | 34D | 50.31 | 148.81 | 215.35 | Flexible | Light Yellow | |
| 733-017-1 | MSO | Lupranate | DBTDL | 0.82 | 0.45 | A | 18D | 18.61 | 135.08 | 211.63 | | | |
| 779-100-1 | MSO | TDI | BDMA | 0.62 | 0.27 | B | A87 | 49.00 | 170.50 | 233.40 | | No | |
| 756-017-1 | CMSO | TDI | A-480 | 0.91 | 1.93 | A | 55A | 7.95 | 75.50 | 222.02 | | Light Yellow | |
| 779-031-1 | CMSO | TDI | DBTDL | 1.01 | 1.13 | B | A40 | -21.00 | 120.90 | 200.90 | Flexible | | |
| 755-015-15 | MSO | Lupranate | A-480 | 0.95 | 2.04 | A | 42D | 53.07 | 121.12 | 239.90 | | Amber | |
| 778-019-15 | MSO | Lupranate | DBTDL | 0.94 | 0.42 | B | 48D | 41.77 | 144.37 | 254.61 | | Light Yellow | |
| 421-040-1 | MHSO | HMDI | A-480 | 0.92 | 0.04 | A | D67 | 52.00 | 86.85 | 208.00 | Hard | Water White | Tough |
| 788-013-1 | MHSO | HMDI | DABCO | 1.45 | 0.00 | B | D73 | 67.00 | 113.50 | 414.50 | Hard | Water White | Tough |
| 419-004-1 | MSO | Lupranate | A-480 | 0.91 | 0.99 | A | 42D | 51.22 | 163.67 | 229.61 | Hard | Amber | Tough |
| 791-062-1 | CO | TDI | A-480 | 1.13 | 2.87 | C | A46 | -7.00 | 114.00 | 240.80 | Flexible | Light Yellow | Tough |
| 791-038-15 | CO | Lupranate | BDMA | 1.10 | 1.14 | B | A78 | 28.00 | 117.70 | 253.10 | Flexible | Amber | Tough |
| 812-043-1 | MSO | HMDI | DBTDL | 0.94 | 0.81 | B | 84A | -7.20 | 118.78 | 272.25 | Flexible | Light Yellow | Tough |
| 791-046-1 | CO | TDI | BDMA | 1.09 | 0.80 | B | 57A | -13.98 | 133.59 | 238.42 | Flexible | Light Yellow | Tough |
| 798-028-1 | CMSO | TDI | DBTDL | 0.81 | 0.80 | B | A74 | 24.00 | 153.60 | 253.50 | | | |

FIG. 1M

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 779-028-1 | CMSO | IPDI | A-480 | 1.00 | 2.90 | A | A40 | -17.00 | 139.40 | 232.50 | Flexible | Light Yellow | |
| 779-100-1 | MSO | TDI | BDMA | 0.62 | 0.27 | B | A87 | 49.00 | 170.50 | 233.40 | | No | |
| 779-008-1 | MSO | HDI | BDMA | 1.00 | 1.15 | B | A52 | -20.00 | 103.00 | 209.50 | Flexible | Light Yellow | |
| 733-078-15 | CMSO | HMDI | DBTDL | 0.80 | 0.95 | B | 84A | 50.66 | 179.55 | 255.23 | | | |
| 779-034-1 | CMSO | TDI | BDMA | 0.90 | 0.76 | B | 62A | -23.00 | 104.09 | 230.70 | | | |
| 798-090-15 | MSO | Lupranate | DBTDL | 0.90 | 0.40 | A | 43D | 50.89 | 119.48 | 227.14 | Flexible | Amber | Tough |
| 755-068-15 | MSO | HMDI | A-480 | 1.01 | 1.04 | A | 21D | 27.21 | 100.86 | 223.01 | Flexible | Light Yellow | |
| 779-026-1 | CMSO | IPDI | A-480 | 1.00 | 1.95 | A | 43A | -24.81 | 94.71 | 218.04 | | | |
| 798-028-1 | CMSO | TDI | DBTDL | 0.81 | 0.80 | B | A74 | 22.00 | 143.20 | 265.20 | | | |
| 421-081-1 | MHSO | IPDI | A-480 | 0.92 | 0.05 | A | 75D | 60.75 | 110.40 | 213.57 | Hard | Water White | Tough |
| 798-082-1 | CMSO | Lupranate | A-480 | 0.90 | 2.12 | A | 30D | -13.93 | 122.28 | 188.20 | Flexible | Amber | Tough |
| 421-040-15 | MHSO | HMDI | A-480 | 0.92 | 0.10 | A | D62 | 54.00 | 101.60 | 166.10 | Hard | Water White | Tough |
| 790-066-1 | MSO | IPDI | DBTDL | 0.77 | 0.88 | B | 73A | 28.45 | 147.84 | 235.65 | | | |
| 812-010-15 | McCaO | Lupranate | DBTDL | 0.94 | 0.12 | B | 80D | 74.32 | 89.95 | 220.24 | Hard | Amber | Tough |
| 788-079-1 | MHSO | IPDI | A-480 | 1.09 | 0.07 | A | D63 | 59.00 | 101.10 | 289.20 | Hard | Water White | Tough |
| 798-100-15 | MSO | Lupranate | A-480 | 0.72 | 5.10 | B | 67D | 52.65 | 125.26 | 287.22 | Hard | Amber | Tough |
| 733-006-1 | MSO | HDI | DBTDL | 0.92 | 1.16 | B | A29 | -27.00 | 143.10 | 232.50 | Flexible | Light Yellow | Semi-Tough |
| 792-001-15 | CO | Lupranate | DBTDL | 1.15 | 0.01 | B | 74A | 16.51 | 111.95 | 241.18 | Flexible | Amber | Tough |
| 557-027-1 | CO | HMDI | A-480 | 1.10 | 2.90 | A | A50 | -8.00 | 63.64 | 215.80 | Flexible | Light Yellow | Tough |
| 790-026-15 | MSO | HMDI | DBTDL | 0.86 | 0.87 | B | 28D | 54.18 | 172.80 | 227.62 | | | |
| 756-024-15 | CMSO | Lupranate | A-480 | 0.91 | 0.92 | A | 19D | 21.17 | 136.54 | 228.51 | | Light Yellow | |
| 791-015-15 | CO | HMDI | DABCO | 1.15 | 0.00 | A | A52 | -1.00 | 120.10 | 237.80 | Flexible | Light Yellow | |
| 755-048-15 | MSO | HDI | A-480 | 0.96 | 2.92 | B | A51 | -17.00 | 148.50 | 236.00 | | Light Yellow | Tough |
| 790-031-15 | MSO | TDI | BDMA | 0.87 | 0.37 | A | 24D | 20.54 | 74.29 | 216.19 | | | |

FIG. 1N

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 791-047-1 | CO | TDI | BDMA | 1.14 | 1.19 | B | A54 | -8.00 | 97.43 | 231.00 | Flexible | Light Yellow | Tough |
| 557-063-1 | CO | Lupranate | DBTDL | 1.10 | 0.01 | B | 82A | -2.37 | 80.69 | 201.27 | Flexible | Amber | Tough |
| 798-019-1 | MSO | Lupranate | A-480 | 0.31 | 0.42 | B | 77D | 60.64 | 114.08 | 261.59 | | | |
| 798-028-1 | CMSO | TDI | DBTDL | 0.81 | 0.80 | B | A74 | 24.00 | 153.60 | 253.50 | | | |
| 798-099-1 | MSO | Lupranate | A-480 | 0.84 | 5.76 | B | 53D | 54.88 | 117.15 | 244.79 | Flexible | Amber | Tough |
| 792-005-15 | CO | TDI | DBTDL | 1.15 | 0.13 | B | A51 | -14.00 | 80.30 | 227.10 | Flexible | Light Yellow | Tough |
| 790-063-1 | MSO | HDI | DBTDL | 0.85 | 0.41 | B | 58A | -26.55 | 139.08 | 254.30 | | | |
| 778-081-15 | MSO | IPDI | DBTDL | 0.90 | 0.72 | B | 80A | 2.88 | 119.69 | 228.02 | | Light Yellow | |
| 733-084-15 | CMSO | Lupranate | DBTDL | 0.81 | 1.24 | B | A85 | 34.00 | 143.00 | 276.70 | Flexible | Dark Yellow | Tough |
| 755-024-15 | MSO | Lupranate | DBTDL | 0.95 | 0.86 | B | 43D | 49.20 | 97.07 | 229.89 | | Amber | |
| 792-004-1 | CO | Lupranate | DBTDL | 1.15 | 0.04 | B | 27D | -4.66 | 98.87 | 204.77 | Flexible | Amber | Tough |
| 797-029-1 | MSO | TDI | DBTDL | 1.04 | 0.41 | B | A27 | -22.00 | 159.80 | 248.50 | Flexible | Light Yellow | Semi-Tough |
| 812-022-15 | MCaO | HMDI | DBTDL | 1.02 | 0.10 | B | 60A | 8.41 | 89.47 | 272.71 | Flexible | Water White | Tough |
| 778-036-1 | MSO | HDI | BDMA | 0.94 | 1.15 | B | A80 | -25.00 | 146.70 | 228.40 | Flexible | Light Yellow | |
| 798-066-15 | MSO | TDI | A-480 | 0.90 | 2.94 | A | 78A | 33.16 | 148.66 | 252.13 | Flexible | Light Yellow | Tough |
| 733-009-1 | MSO | TDI | DBTDL | 0.93 | 0.88 | B | 45A | -34.41 | 126.48 | 284.15 | | | |
| 788-045-1 | MHSO | Lupranate | DBTDL | 0.96 | 0.16 | B | D62 | 59.00 | 78.14 | 169.00 | Hard | Amber | Tough |
| 788-084-15 | MHSO | IPDI | DABCO | 1.14 | 0.00 | A | D65 | 71.00 | 107.00 | 364.60 | Hard | Water White | Tough |
| 790-018-1 | CMSO | TDI | BDMA | 0.90 | 0.29 | B | 67A | 14.85 | 148.73 | 239.75 | | | |
| 798-041-1 | MSO | IPDI | BDMA | 0.94 | 1.16 | B | A31 | -15.00 | 141.70 | 225.40 | Flexible | Light Yellow | Tough |
| 798-097-1 | MSO | Lupranate | DBTDL | 1.05 | 0.79 | A | 30D | 38.75 | 130.81 | 231.70 | Flexible | Amber | Tough |
| 798-034-1 | CMSO | HMDI | BDMA | 1.05 | 1.22 | B | A42 | -13.00 | 143.40 | 227.60 | Flexible | Light Yellow | Semi-Tough |
| 421-088-15 | MHSO | TDI | A-480 | 0.92 | 0.10 | C | D60 | 64.00 | 115.10 | 357.90 | Hard | Water White | Tough |
| 797-043-15 | MSO | Lupranate | DBTDL | 1.00 | 1.19 | B | 34D | 38.74 | 69.67 | 208.01 | Flexible | Amber | Tough |

FIG. 10

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 779-095-15 | MSO | IPDI | BDMA | 0.95 | 0.73 | B | 20D | 22.81 | 128.33 | 244.70 | | | |
| 798-033-15 | CMSO | HMDI | BDMA | 0.99 | 1.25 | B | A41 | -8.00 | 135.60 | 223.20 | Flexible | Light Yellow | Semi-Tough |
| 791-027-1 | MSO/MHSO | TDI | A-480 | 0.93 | 0.05 | C | 40D | 52.14 | 88.00 | 181.33 | Flexible | Light Yellow | |
| 791-001-15 | MHSO | IPDI | DBTDL | 0.92 | 0.05 | B | D70 | 62.00 | 121.70 | 312.60 | Hard | Water White | Tough |
| 791-085-15 | MHSO | Lupranate | A-480 | 0.96 | 0.05 | A | 82D | 46.90 | 85.72 | 122.71 | Hard | Amber | Tough |
| 797-018-15 | MSO | IPDI | DBTDL | 0.95 | 1.19 | B | A31 | -17.00 | 140.50 | 207.30 | Flexible | Dark Yellow | Tough |
| 797-034-1 | MSO | Lupranate | | 0.55 | 1.46 | B | 75D | 55.41 | 117.13 | 270.46 | Hard | Amber | Tough |
| 779-069-1 | MSO | TDI | A-480 | 1.00 | 2.89 | A | A51 | -12.00 | 131.00 | 228.40 | | | |
| 797-048-15 | MSO | Lupranate | A-480 | 0.90 | 3.25 | A | 42D | 50.54 | 132.05 | 228.91 | Flexible | Amber | Tough |
| 812-010-1 | MCaO | Lupranate | DBTDL | 0.89 | 0.10 | B | 79D | 68.85 | 97.18 | 222.13 | Hard | Amber | Tough |
| 778-038-1 | MSO | Lupranate | BDMA | 0.89 | 0.41 | B | 45D | 50.76 | 152.74 | 245.52 | | Light Yellow | |
| 790-054-15 | MSO | Lupranate | DBTDL | 0.83 | 0.42 | B | A76 | 55.00 | 123.40 | 283.90 | | | |
| 797-012-1 | MSO | IPDI | A-480 | 0.90 | 2.19 | A | A26 | -17.00 | 109.20 | 198.00 | Flexible | Light Yellow | Semi-Tough |
| 557-025-15 | CO | HMDI | A-480 | 1.09 | 1.92 | A | 60A | -8.06 | 96.95 | 222.01 | Flexible | Light Yellow | Tough |
| 798-059-1 | MSO | HMDI | A-480 | 0.90 | 2.83 | B | 78A | 36.40 | 104.50 | 227.07 | Flexible | Light Yellow | Tough |
| 792-005-1 | CO | TDI | DBTDL | 1.15 | 0.79 | B | 62A | -13.77 | 111.01 | 259.07 | Flexible | Light Yellow | Tough |
| 421-088-1 | MHSO | TDI | A-480 | 0.92 | 0.05 | C | 80D | 45.95 | 101.44 | 253.01 | Hard | Water White | Tough |
| 791-072-15 | MHSO | TDI | BDMA | 0.88 | 0.01 | B | D72 | 54.00 | 112.70 | 218.80 | Hard | Water White | Tough |
| 791-072-15 | MHSO | TDI | BDMA | 0.88 | 0.01 | B | D72 | 56.00 | 113.80 | 215.90 | Hard | Water White | Tough |
| 791-023-1 | CO | IPDI | A-480 | 1.09 | 0.99 | A | 54A | -9.92 | 93.84 | 219.97 | Flexible | Light Yellow | Tough |
| 790-067-15 | MSO | IPDI | DBTDL | 1.13 | 0.82 | B | 40A | -15.62 | 187.65 | 252.67 | | | |
| 791-009-15 | MHSO | Lupranate | DBTDL | 0.91 | 0.10 | B | A84 | 51.00 | 97.44 | 145.60 | Hard | Amber | Tough |
| 778-022-15 | MSO | Lupranate | DBTDL | 0.94 | 1.14 | B | A77 | 9.00 | 140.20 | 276.20 | Hard | Light Yellow | |
| 755-094-1 | MSO | Lupranate | DABCO | 1.00 | 0.01 | A | A87 | -4.00 | 180.70 | 213.80 | | Light Yellow | |

FIG. 1P

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 421-067-1 | MHSO | IPDI | BDMA | 0.93 | 0.01 | B | 76D | 61.33 | 123.62 | 231.35 | Hard | Water White | Tough |
| 421-052-1 | MHSO | HMDI | BDMA | 0.92 | 0.01 | B | 73D | 55.64 | 118.91 | 242.02 | Hard | Water White | Tough |
| 798-067-1 | MSO | TDI | A-480 | 1.00 | 2.99 | A | A72 | 1.00 | 151.80 | 232.00 | Flexible | Light Yellow | Tough |
| 790-045-1 | MSO | HDI | A-480 | 0.85 | 1.14 | B | 57A | -29.84 | 98.41 | 227.23 | | | |
| 790-040-15 | MSO | Lupranate | A-480 | 0.88 | 1.16 | A | 38D | 51.12 | 146.47 | 233.09 | | | |
| 798-100-1 | MSO | Lupranate | A-480 | 0.80 | 5.19 | A | 64D | 52.56 | 129.99 | 262.45 | Hard | Amber | Semi-Tough |
| 732-076-1 | MSO | Lupranate | A-480 | 1.00 | 1.12 | A | A60 | -22.00 | 143.80 | 227.40 | | | |
| 421-011-15 | MHSO | TDI | DBTDL | 0.97 | 0.09 | B | 78D | 43.55 | 110.27 | 171.67 | Hard | Water White | Tough |
| 756-076-15 | MSO | TDI | DABCO | 0.94 | 0.01 | A | A80 | -3.00 | 122.40 | 222.40 | Flexible | Light Yellow | |
| 755-006-1 | MSO | TDI | A-480 | 0.95 | 1.91 | A | 76A | 38.19 | 172.55 | 230.25 | | | |
| 733-016-15 | MSO | Lupranate | DBTDL | 0.91 | 0.38 | A | A60 | -12.00 | 153.60 | 210.10 | | | |
| 791-011-1 | CO | HDI | A-480 | 1.15 | 2.90 | A | A36 | -30.00 | 49.00 | 241.10 | Flexible | Light Yellow | Tough |
| 755-097-15 | MSO | Lupranate | DBTDL | 1.01 | 0.92 | B | 45D | 53.53 | 134.14 | 225.60 | | | |
| 733-033-15 | CMSO | TDI | DABCO | 0.63 | 0.01 | A | A82 | 23.00 | 159.20 | 292.40 | Flexible | Light Yellow | Tough |
| 798-022-1 | CMSO | HMDI | A-480 | 1.00 | 1.97 | B | 49A | 13.81 | 159.75 | 248.56 | | | |
| 557-009-1 | CO | TDI | DABCO | 1.10 | 0.00 | A | A56 | -11.00 | 77.94 | 194.10 | Flexible | Light Yellow | Tough |
| 419-012-15 | MSO | HMDI | DBTDL | 0.90 | 0.79 | C | 85A47 | -13.20 | 95.54 | 224.91 | Flexible | Light Yellow | Semi-Tough |
| 778-095-1 | MSO | IPDI | DBTDL | 0.95 | 0.44 | B | 18D | -5.82 | 105.59 | 206.58 | Flexible | Light Yellow | |
| 790-056-15 | MSO | Lupranate | DBTDL | 0.79 | 0.79 | B | 48D | 38.46 | 152.01 | 233.13 | | | |
| 557-031-15 | CO | HMDI | DBTDL | 1.10 | 1.15 | B | A57 | -6.00 | 85.35 | 232.20 | Flexible | Light Yellow | Tough |
| 779-100-1 | MSO | TDI | BDMA | 0.62 | 0.27 | B | A87 | 47.00 | 139.70 | 238.70 | | No | |
| 790-084-1 | CMSO | IPDI | BDMA | 0.90 | 0.78 | B | 50A | -14.82 | 117.71 | 225.32 | | | |
| 788-034-1 | MHSO | Lupranate | A-480 | 1.07 | 0.04 | A | 81D | 53.89 | 83.05 | 134.78 | Hard | Amber | Tough |
| 779-100-1 | MSO | TDI | BDMA | 0.62 | 0.27 | B | A87 | 47.00 | 139.70 | 238.70 | | No | |

FIG. 1Q

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 788-007-1 | MHSO | HMDI | A-480 | 1.44 | 0.05 | B | 73D | 53.90 | 102.31 | 230.51 | Hard | Water White | Tough |
| 798-057-15 | MSO | HMDI | A-480 | 0.90 | 2.02 | B | 75A | 33.42 | 128.97 | 236.91 | Flexible | Light Yellow | Tough |
| 421-043-1 | MHSO | TDI | DBTDL | 0.91 | 0.05 | B | D68 | 62.00 | 105.90 | 129.40 | Hard | Water White | Tough |
| 755-014-1 | MSO | Lupranate | A-480 | 0.95 | 0.94 | A | A87 | 11.00 | 117.70 | 197.70 | | Amber | |
| 790-100-15 | CMSO | TDI | DBTDL | 0.94 | 0.80 | B | 68A | 11.01 | 142.07 | 246.70 | | No | |
| 798-094-15 | MSO | Lupranate | A-480 | 0.60 | 6.60 | A | 67D | 55.92 | 115.75 | 316.06 | Flexible | Amber | Tough |
| 733-069-15 | CMSO | TDI | DBTDL | 0.82 | 0.88 | A | 75A | -37.33 | 226.23 | | | | |
| 791-072-15 | MHSO | TDI | BDMA | 0.88 | 0.01 | B | D72 | 56.00 | 113.40 | 220.90 | Hard | Water White | Tough |
| 779-100-1 | MSO | TDI | BDMA | 0.62 | 0.27 | B | A87 | 47.00 | 159.60 | 261.90 | | No | |
| 792-004-15 | CO | TDI | DBTDL | 1.15 | 0.41 | B | A53 | -9.00 | 110.50 | 231.40 | Flexible | Light Yellow | Tough |
| 421-096-1 | CO | IPDI | DBTDL | 1.09 | 0.06 | B | 58A | -10.91 | 89.01 | 221.48 | Flexible | Light Yellow | Tough |
| 421-072-1 | MHSO | TDI | DABCO | 0.92 | 0.01 | A | D69 | 51.00 | 105.00 | 176.00 | Hard | Water White | Tough |
| 778-024-1 | MSO | TDI | BDMA | 0.94 | 0.47 | B | 23D | 29.21 | 125.80 | 216.04 | Hard | Light Yellow | Tough |
| 791-041-15 | CO | HMDI | BDMA | 1.09 | 0.75 | B | 55A | -6.46 | 102.29 | 219.90 | Flexible | Light Yellow | Tough |
| 791-024-1 | CO | IPDI | A-480 | 1.16 | 2.36 | A | A40 | -12.00 | 61.36 | 190.00 | Flexible | Light Yellow | Tough |
| 421-087-15 | MHSO | TDI | A-480 | 0.92 | 0.02 | C | D55 | 63.00 | 112.90 | 204.80 | Hard | Water White | Tough |
| 798-078-15 | CMSO | HMDI | DBTDL | 0.90 | 0.77 | B | 76A | -11.30 | 109.73 | 216.55 | Flexible | Light Yellow | Tough |
| 798-028-1 | CMSO | TDI | DBTDL | 0.81 | 0.80 | B | A74 | 22.00 | 143.20 | 265.20 | | | |
| 812-023-1 | MCaO | IPDI | DBTDL | 1.01 | 0.11 | B | 63D | 45.73 | 69.36 | 218.90 | Hard | Light Yellow | Tough |
| 788-021-1 | MHSO | HDI | A-480 | 0.93 | 0.05 | B | 76D | 52.32 | 118.34 | 209.05 | Hard | Water White | Tough |
| 788-029-15 | MHSO | HDI | DBTDL | 1.04 | 0.11 | B | A87 | 59.00 | 121.40 | 359.70 | Hard | Water White | Tough |
| 791-061-1 | CO | TDI | A-480 | 1.15 | 1.11 | C | A47 | -12.00 | 113.80 | 240.40 | Flexible | Light Yellow | Tough |
| 778-042-15 | MSO | Lupranate | DBTDL | 0.89 | 0.74 | B | A86 | 7.00 | 107.10 | 153.40 | | Light Yellow | Tough |
| 421-094-1 | CO | IPDI | DBTDL | 1.15 | 0.04 | B | A45 | -15.00 | 73.69 | 211.80 | Flexible | Light Yellow | Tough |

FIG. 1R

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 791-072-15 | MHSO | TDI | BDMA | 0.88 | 0.01 | B | D72 | 54.00 | 112.70 | 218.80 | Hard | Water White | Tough |
| 791-039-15 | CO | HMDI | BDMA | 1.15 | 0.42 | B | 58A | 7.83 | 86.79 | 250.70 | Flexible | Light Yellow | Tough |
| 779-100-1 | MSO | TDI | BDMA | 0.62 | 0.27 | B | A87 | 49.00 | 170.50 | 233.40 | | No | |
| 421-044-1 | MHSO | TDI | DBTDL | 0.92 | 0.15 | B | D72 | 70.00 | 113.00 | 158.70 | Hard | Water White | Tough |
| 778-056-1 | MSO | Lupranate | A-480 | 0.89 | 1.09 | A | 48D | 52.95 | 141.49 | 243.56 | | | |
| 733-018-15 | MSO | Lupranate | DBTDL | 0.83 | 0.95 | A | A61 | -12.00 | 115.60 | 160.90 | | | |
| 788-095-1 | MHSO | IPDI | DBTDL | 1.09 | 0.11 | B | 82D | 96.05 | 96.41 | 196.47 | Hard | Water White | Tough |
| 755-023-1 | MSO | Lupranate | DBTDL | 0.96 | 0.35 | B | 43D | 49.53 | 132.94 | 233.34 | | Amber | |
| 797-053-15 | MSO | Lupranate | BDMA | 0.90 | 0.17 | A | 45D | 52.13 | 70.81 | 209.54 | Flexible | Amber | Tough |
| 791-013-15 | CO | HMDI | A-480 | 1.15 | 1.97 | A | 55A | -6.15 | 96.34 | 223.08 | Flexible | Light Yellow | Tough |
| 790-075-1 | MSO | IPDI | BDMA | 0.88 | 0.42 | B | 52A | -7.34 | 149.53 | 266.41 | Flexible | Light Yellow | Tough |
| 790-079-15 | CMSO | TDI | A-480 | 1.05 | 1.18 | B | 53A | -22.09 | 106.28 | 229.43 | | Light Yellow | |
| 779-025-15 | CMSO | IPDI | A-480 | 0.95 | 1.97 | A | A39 | -18.00 | 118.20 | 215.60 | | Amber | Tough |
| 788-032-15 | MHSO | Lupranate | A-480 | 1.07 | 0.02 | A | A88 | 56.00 | 85.66 | 192.40 | Hard | | |
| 756-071-15 | MSO | TDI | A-480 | 0.68 | 1.91 | A | 48D | 54.66 | 140.27 | 271.27 | | Light Yellow | Tough |
| 778-007-15 | MSO | TDI | DBTDL | 0.94 | 0.82 | B | 75A | 16.41 | 62.81 | 222.62 | | Light Yellow | Tough |
| 733-092-15 | CMSO | HMDI | A-480 | 0.86 | 3.21 | B | A72 | 0.00 | 143.20 | 213.80 | Flexible | Light Yellow | Tough |
| 733-011-15 | MSO | TDI | DBTDL | 0.66 | 1.12 | B | A65 | -14.00 | 161.00 | 225.60 | Flexible | Dark Yellow | Tough |
| 788-064-15 | MHSO | HDI | BDMA | 1.09 | 0.02 | B | D71 | 64.00 | 130.70 | 381.30 | Hard | Water White | Tough |
| 798-071-1 | MSO | TDI | DBTDL | 0.99 | 0.81 | B | A70 | -6.00 | 129.00 | 231.90 | Flexible | Amber | Semi-Tough |
| 790-091-15 | CMSO | IPDI | A-480 | 1.05 | 1.92 | B | 52A | -22.32 | 89.04 | 240.19 | | | |
| 733-012-1 | MSO | HMDI | DBTDL | 0.92 | 0.45 | B | A41 | -10.00 | 150.50 | 216.90 | | | |
| 812-021-15 | MSO | Lupranate | A-480 | 1.00 | 2.91 | A | A88 | -8.00 | 135.80 | 216.80 | Hard | Amber | Tough |
| 798-084-1 | MSO | IPDI | DBTDL | 1.05 | 0.90 | B | A61 | -6.00 | 114.80 | 226.20 | Flexible | Dark Yellow | Semi-Tough |

FIG. 1S

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 778-037-15 | MSO | Lupranate | BDMA | 0.93 | 0.39 | B | A80 | 11.00 | 139.70 | 223.10 | Hard | Light Yellow | |
| 778-088-15 | MSO | IPDI | BDMA | 0.95 | 0.44 | B | 18D | 17.46 | 121.57 | 229.72 | Hard | Light Yellow | |
| 733-013-15 | MSO | HMDI | DBTDL | 0.92 | 0.65 | B | 50A | -19.62 | 148.50 | 273.57 | Flexible | Light Yellow | |
| 755-062-1 | MSO | TDI | A-480 | 1.00 | 2.95 | A | A74 | 4.00 | 122.70 | 226.70 | Hard | Water White | Tough |
| 788-016-1 | MHSO | HMDI | DBTDL | 1.45 | 0.11 | B | 74D | 52.32 | 109.13 | 241.97 | Hard | Water White | Tough |
| 421-041-1 | MHSO | HMDI | A-480 | 0.92 | 0.11 | A | D65 | 62.00 | 121.10 | 224.80 | Hard | Light Yellow | |
| 755-071-15 | MSO | HMDI | A-480 | 1.01 | 2.99 | A | A85 | 9.00 | 129.90 | 224.30 | Hard | Amber | Tough |
| 421-006-1 | MHSO | Lupranate | A-480 | 0.97 | 0.02 | A | D67 | 49.00 | 79.53 | 153.40 | Hard | Water White | Tough |
| 788-054-1 | MHSO | HDI | DABCO | 1.01 | 0.01 | A | 75D | 50.60 | 109.26 | 224.57 | Hard | Amber | |
| 790-051-1 | MSO | HMDI | A-480 | 0.88 | 1.96 | B | 60A | -1.99 | 127.53 | 243.03 | Flexible | Light Yellow | Tough |
| 798-091-1 | MSO | Lupranate | DBTDL | 0.95 | 0.40 | A | 39D | 54.48 | 133.54 | 222.79 | Flexible | Light Yellow | Semi-Tough |
| 798-028-1 | CMSO | TDI | DBTDL | 0.81 | 0.80 | B | A74 | 22.00 | 143.20 | 265.20 | Flexible | Light Yellow | |
| 778-095-15 | MSO | IPDI | DBTDL | 0.95 | 0.88 | B | A58 | -13.00 | 121.60 | 213.20 | Flexible | | |
| 797-018-1 | MSO | IPDI | DBTDL | 0.95 | 0.76 | C | 35A | -21.46 | 155.47 | 268.17 | | Light Yellow | |
| 778-091-1 | MSO | IPDI | BDMA | 0.95 | 1.11 | B | A66 | 2.00 | 120.90 | 225.80 | | No | |
| 779-100-1 | MSO | TDI | BDMA | 0.62 | 0.27 | B | A87 | 47.00 | 139.70 | 238.70 | Hard | Water White | Tough |
| 790-082-15 | CMSO | IPDI | BDMA | 0.94 | 0.40 | B | A46 | -19.00 | 122.30 | 218.80 | | | |
| 756-007-15 | MSO | HMDI | DBTDL | 0.89 | 0.83 | B | A79 | 5.00 | 128.90 | 214.40 | | Light Yellow | |
| 798-028-1 | CMSO | TDI | DBTDL | 0.81 | 0.80 | B | A74 | 24.00 | 156.10 | 256.40 | Hard | Water White | Tough |
| 421-020-1 | MHSO | HDI | DBTDL | 0.87 | 0.15 | B | D57 | 62.00 | 128.00 | 351.00 | | No | |
| 798-028-1 | CMSO | TDI | DBTDL | 0.81 | 0.80 | B | A74 | 22.00 | 143.20 | 265.20 | | | |
| 779-100-1 | MSO | TDI | BDMA | 0.62 | 0.27 | B | A87 | 47.00 | 139.70 | 238.70 | Hard | Water White | Tough |
| 798-001-1 | CMSO | TDI | DBTDL | 1.00 | 0.78 | B | 60A | 8.17 | 170.00 | 247.01 | | | |
| 791-004-15 | MHSO | IPDI | DBTDL | 0.92 | 0.16 | B | D72 | 69.00 | 120.60 | 330.10 | Hard | Water White | |

FIG. 1T

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 791-008-1 | MHSO | HDI | DBTDL | 0.92 | 0.15 | B | D66 | 60.00 | 131.50 | 285.30 | Hard | Water White | Tough |
| 557-003-1 | CO | TDI | A-480 | 1.10 | 1.94 | A | 60A | -13.37 | 100.93 | 220.34 | Flexible | Light Yellow | Tough |
| 797-017-1 | MSO | IPDI | DBTDL | 1.06 | 0.42 | B | A19 | -20.00 | 100.70 | 218.00 | Flexible | Light Yellow | Semi-Tough |
| 756-048-15 | CMSO | HMDI | DBTDL | 0.91 | 0.96 | B | A62 | -7.00 | 134.50 | 230.30 | Flexible | Light Yellow |  |
| 421-066-15 | MHSO | IPDI | BDMA | 0.97 | 0.01 | B | D62 | 69.00 | 129.80 | 370.50 | Hard | Water White | Tough |
| 778-027-1 | MSO | TDI | BDMA | 0.94 | 1.20 | B | A77 | 2.00 | 140.80 | 222.50 | Flexible | Light Yellow |  |
| 812-041-1 | MSO | Lupranate | A-480 | 0.92 | 1.96 | A | 50D | 65.09 | 117.03 | 201.63 | Hard | Amber | Tough |
| 788-050-15 | MHSO | HMDI | DBTDL | 1.01 | 0.10 | C | D64 | 66.00 | 124.50 | 413.40 | Hard | Water White | Tough |
| 733-018-1 | MSO | Lupranate | DBTDL | 0.93 | 0.89 | A | 64A | -21.08 | 121.06 | 212.23 |  |  |  |
| 756-033-15 | CMSO | TDI | DBTDL | 0.90 | 0.45 | B | 13D | -24.24 | 124.66 | 268.62 | Flexible | Light Yellow |  |
| 797-036-15 | MSO | Lupranate | A-480 | 0.63 | 8.08 | B | 66D | 81.49 | 116.07 | 196.19 | Hard | Amber | Tough |
| 779-100-1 | MSO | TDI | BDMA | 0.62 | 0.27 | B | A87 | 49.00 | 170.50 | 233.40 |  | No |  |
| 778-042-1 | MSO | Lupranate | DBTDL | 0.89 | 0.44 | B | 48D | 45.55 | 149.65 | 277.86 | Flexible | Light Yellow |  |
| 733-001-15 | MSO | HDI | A-480 | 0.92 | 2.91 | B | A35 | -26.00 | 143.60 | 236.80 | Flexible | Light Yellow | Semi-Tough |
| 790-041-1 | MSO | Lupranate | A-480 | 0.83 | 0.93 | A | 41D | 51.99 | 121.53 | 246.31 |  |  |  |
| 421-033-1 | MHSO | TDI | A-480 | 0.97 | 0.03 | A | D65 | 62.00 | 103.30 | 194.70 | Hard | Water White | Tough |
| 798-081-1 | CMSO | TDI | DBTDL | 0.89 | 0.77 | A | 71A | 13.31 | 108.12 | 225.59 | Flexible | Dark Yellow | Tough |
| 797-027-15 | MSO | HMDI | DBTDL | 1.00 | 1.21 | B | A33 | -16.00 | 111.10 | 206.50 | Flexible | Dark Yellow | Tough |
| 790-094-15 | CMSO | IPDI | DBTDL | 0.95 | 0.40 | B | A50 | -26.00 | 105.20 | 208.50 |  |  |  |
| 797-051-15 | MSO | Lupranate | BDMA | 0.95 | 0.12 | A | 39D | 49.27 | 77.78 | 205.35 | Flexible | Amber | Tough |
| 788-097-1 | MHSO | IPDI | DBTDL | 1.09 | 0.15 | B | D70 | 58.00 | 92.84 | 247.00 | Hard | Water White | Tough |
| 778-013-15 | MSO | HMDI | DBTDL | 0.94 | 1.19 | B | A80 | 7.00 | 145.20 | 221.10 | Flexible | Light Yellow |  |
| 557-082-1 | MHSO | TDI | DABCO | 0.87 | 0.00 | A | D71 | 67.00 | 93.90 | 164.20 |  | Water White | Semi-Tough |
| 755-089-15 | MSO | Lupranate | A-480 | 1.00 | 2.89 | A | A86 | 63.00 | 145.50 | 267.50 | Hard | Light Yellow |  |

FIG. 1U

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 421-094-15 | CO | IPDI | DBTDL | 1.09 | 0.04 | B | 58A | -8.43 | 112.49 | 220.11 | Flexible | Light Yellow | Tough |
| 756-010-15 | MSO | TDI | DBTDL | 0.90 | 0.42 | B | A81 | 0.00 | 138.40 | 222.40 | | Light Yellow | |
| 779-010-1 | MSO | Lupranate | BDMA | 0.95 | 0.25 | B | 49D | 47.69 | 141.49 | 234.35 | Hard | Amber | Tough |
| 791-085-1 | MHSO | Lupranate | A-480 | 0.96 | 0.05 | A | 82D | 51.00 | 88.52 | 127.82 | Hard | Amber | Tough |
| 733-014-1 | MSO | HMDI | DBTDL | 0.83 | 0.76 | B | 64A | -13.60 | 155.96 | 273.71 | | | |
| 791-072-15 | MHSO | TDI | BDMA | 0.88 | 0.01 | B | D72 | 56.00 | 113.40 | 220.90 | Hard | Water White | Tough |
| 778-099-15 | MSO | TDI | BDMA | 1.00 | 0.39 | B | A78 | 6.00 | 109.50 | 185.70 | | Light Yellow | |
| 790-027-15 | MHSO | HMDI | DBTDL | 2.20 | 1.17 | B | A76 | 5.00 | 145.00 | 236.20 | Flexible | Light Yellow | Tough |
| 778-020-15 | MSO | Lupranate | DBTDL | 0.68 | 0.46 | B | 66D | 55.68 | 131.20 | 267.53 | | Light Yellow | |
| 557-015-1 | CO | Lupranate | A-480 | 1.10 | 1.05 | A | 23D | -2.70 | 86.69 | 216.07 | Flexible | Amber | Tough |
| 791-044-15 | CO | TDI | BDMA | 1.10 | 0.46 | B | A48 | -9.00 | 116.40 | 224.60 | Flexible | Light Yellow | Tough |
| 421-045-15 | MHSO | TDI | BDMA | 0.96 | 0.00 | B | 79D | 57.13 | 100.38 | 140.53 | Hard | Water White | Tough |
| 798-078-1 | CMSO | HMDI | DBTDL | 0.90 | 0.76 | B | 60A | -13.05 | 115.98 | 217.64 | Flexible | Light Yellow | Tough |
| 798-083-1 | CMSO | Lupranate | A-480 | 0.90 | 1.95 | A | 27D | 38.63 | 131.36 | 226.59 | Flexible | Amber | Semi-Tough |
| 755-096-15 | MSO | Lupranate | DBTDL | 0.90 | 0.44 | B | A80 | 60.00 | 131.90 | 312.80 | | Light Yellow | |
| 791-072-15 | MHSO | TDI | BDMA | 0.88 | 0.01 | B | D72 | 56.00 | 113.80 | 215.90 | Hard | Water White | Tough |
| 778-025-15 | MSO | TDI | BDMA | 0.95 | 0.82 | B | 77A | 20.98 | 119.85 | 224.47 | Hard | Light Yellow | |
| 791-084-15 | MHSO | Lupranate | DBTDL | 0.96 | 0.09 | B | 80D | 117.87 | 103.20 | 148.07 | Hard | Amber | Tough |
| 798-069-1 | MSO | TDI | DBTDL | 1.00 | 0.44 | B | A71 | -8.00 | 140.30 | 231.50 | Flexible | Light Yellow | Tough |
| 790-042-1 | MSO | Lupranate | A-480 | 0.87 | 2.09 | A | 38D | 51.26 | 153.02 | 232.55 | | | |
| 755-099-1 | MSO | Lupranate | DBTDL | 1.00 | 1.27 | B | A87 | 0.00 | 131.30 | 215.00 | | Light Yellow | |
| 792-006-15 | CO | IPDI | DBTDL | 1.15 | 0.06 | B | 58A | -12.82 | 92.60 | 224.10 | Flexible | Light Yellow | Tough |
| 779-100-1 | MSO | TDI | BDMA | 0.62 | 0.27 | B | A87 | 47.00 | 159.60 | 261.90 | | No | |
| 812-023-1 | MCaO | IPDI | DBTDL | 1.01 | 0.11 | B | 63D | 47.44 | 91.90 | 217.67 | Hard | Light Yellow | Tough |

FIG. 1V

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 779-082-15 | MSO | TDI | DBTDL | 1.05 | 0.81 | B | 19D | 12.25 | 150.62 | 228.85 | | | |
| 798-005-1 | CMSO | TDI | BDMA | 0.98 | 0.40 | B | 65A | -23.92 | 72.90 | 219.16 | | | |
| 421-051-15 | MHSO | HDI | BDMA | 0.63 | 0.01 | B | 70D | 55.20 | 128.97 | 228.80 | Hard | Water White | Tough |
| 798-014-1 | CMSO | Lupranate | BDMA | 1.00 | 0.27 | B | 21D | 30.40 | 159.70 | 222.75 | | | |
| 421-048-1 | MHSO | TDI | BDMA | 0.88 | 0.01 | B | 80D | 114.66 | 112.65 | 129.39 | Hard | Water White | Tough |
| 421-087-1 | MHSO | Lupranate | A-480 | 0.91 | 0.10 | A | D69 | 58.00 | 92.11 | 172.40 | Hard | Amber | Tough |
| 791-072-15 | MHSO | TDI | BDMA | 0.88 | 0.01 | B | D72 | 56.00 | 113.80 | 215.90 | Hard | Water White | Tough |
| 791-035-1 | CO | Lupranate | BDMA | 1.10 | 0.48 | B | A63 | 5.00 | 122.20 | 216.60 | Flexible | Amber | Tough |
| 812-045-15 | MSO | IPDI | A-480 | 0.85 | 1.92 | A | 27D | 34.33 | 99.22 | 222.36 | Flexible | Light Yellow | Tough |
| 812-045-1 | MSO | IPDI | A-480 | 0.85 | 1.92 | A | 71A | 3.60 | 100.94 | 213.08 | Flexible | Light Yellow | Tough |
| 791-045-15 | CO | TDI | BDMA | 1.15 | 0.80 | B | 53A | 1.49 | 61.59 | 249.41 | Flexible | Light Yellow | Tough |
| 733-069-1 | CMSO | TDI | DBTDL | 0.90 | 0.77 | A | 70A | 14.46 | 134.54 | 229.86 | | | |
| 798-028-1 | CMSO | TDI | DBTDL | 0.81 | 0.80 | B | A74 | 24.00 | 153.60 | 253.50 | | | |
| 779-034-15 | CMSO | TDI | BDMA | 0.95 | 0.76 | B | A42 | -19.00 | 119.90 | 222.00 | | | |
| 798-026-1 | CMSO | HMDI | DBTDL | 1.03 | 0.79 | B | A45 | -11.00 | 102.90 | 222.50 | | | |
| 779-057-1 | MSO | IPDI | A-480 | 1.00 | 2.90 | A | A58 | 1.00 | 127.60 | 225.60 | | | |
| 788-089-1 | MHSO | IPDI | BDMA | 1.09 | 0.01 | B | 80D | 102.92 | 89.47 | 197.99 | Hard | Water White | Tough |
| 778-021-1 | MSO | Lupranate | DBTDL | 0.94 | 0.81 | B | 42D | 34.57 | 130.63 | 243.09 | | Light Yellow | |
| 791-053-15 | CO | HDI | DABCO | 1.15 | 0.00 | A | A48 | -28.00 | 107.30 | 243.70 | Flexible | Light Yellow | Tough |
| 421-030-1 | MHSO | HMDI | DBTDL | 0.87 | 0.10 | B | 72D | 54.60 | 102.49 | 889.27 | Hard | Water White | Tough |
| 798-006-15 | CMSO | TDI | BDMA | 0.95 | 0.81 | B | 62A | -19.96 | 124.25 | 233.49 | | | |
| 779-100-1 | MSO | TDI | BDMA | 0.62 | 0.27 | B | A87 | 50.00 | 148.90 | 239.60 | | No | |
| 779-097-15 | MSO | IPDI | BDMA | 0.95 | 1.20 | B | A74 | 3.00 | 121.60 | 230.40 | | | |
| 778-088-1 | MSO | IPDI | BDMA | 1.00 | 0.39 | B | 17D | -5.88 | 115.03 | 215.59 | | Light Yellow | |

FIG. 1W

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 779-071-1 | MSO | HMDI | A-480 | 1.00 | 2.89 | A | A53 | 0.00 | 129.20 | 204.30 | | | |
| 778-009-1 | MSO | TDI | DBTDL | 0.95 | 1.27 | B | A75 | -2.00 | 146.50 | 220.40 | Flexible | Light Yellow | |
| 779-030-15 | CMSO | TDI | DBTDL | 1.05 | 0.79 | B | 50A | -24.39 | 145.75 | 228.59 | | | |
| 755-059-1 | MSO | TDI | A-480 | 1.01 | 1.08 | A | 24D | 33.30 | 150.92 | 235.04 | | Light Yellow | |
| 755-070-15 | MSO | HMDI | A-480 | 0.90 | 1.97 | A | A80 | 10.00 | 115.10 | 209.90 | | Light Yellow | |
| 798-051-1 | MSO | TDI | BDMA | 0.98 | 0.36 | A | A34 | -20.00 | 124.50 | 228.60 | Flexible | Light Yellow | Semi-Tough |
| 798-007-15 | CMSO | TDI | BDMA | 1.05 | 0.78 | B | A50 | -20.00 | 102.70 | 202.20 | | | |
| 790-081-1 | CMSO | TDI | A-480 | 0.98 | 3.02 | B | A48 | -16.00 | 117.20 | 221.60 | Flexible | Light Yellow | Tough |
| 755-080-15 | MSO | HDI | A-480 | 1.00 | 2.96 | A | A54 | -15.00 | 129.50 | 231.10 | Flexible | Light Yellow | |
| 790-100-1 | CMSO | TDI | DBTDL | 0.90 | 0.78 | B | A60 | -11.00 | 137.40 | 231.40 | Flexible | Dark Yellow | Tough |
| 788-048-1 | MHSO | HMDI | A-480 | 1.01 | 0.07 | A | D63 | 55.00 | 96.14 | 343.70 | Hard | Water White | Tough |
| 778-018-1 | MSO | HDI | DBTDL | 0.94 | 1.16 | B | A50 | -21.00 | 139.00 | 245.60 | Flexible | Light Yellow | |
| 788-006-15 | MHSO | HMDI | A-480 | 1.62 | 0.05 | B | D71 | 52.00 | 82.62 | 358.10 | Hard | Water White | Tough |
| 421-021-1 | MHSO | TDI | DBTDL | 0.88 | 0.14 | B | D72 | 52.00 | 103.70 | 210.10 | Hard | Water White | Tough |
| 792-007-15 | CO | HMDI | DBTDL | 1.15 | 0.80 | C | A53 | -2.00 | 66.97 | 243.10 | Flexible | Light Yellow | Tough |
| 419-007-1 | MSO | IPDI | A-480 | 0.96 | 0.99 | A | 55A | -11.32 | 138.62 | 237.94 | Flexible | Light Yellow | Semi-Tough |
| 791-002-15 | MHSO | IPDI | DBTDL | 0.97 | 0.09 | B | 76D | 63.75 | 91.89 | 275.13 | Hard | Water White | Tough |
| 791-038-1 | CO | Lupranate | BDMA | 1.16 | 1.15 | B | A74 | -5.00 | 108.20 | 224.60 | Flexible | Amber | Tough |
| 779-033-1 | CMSO | TDI | BDMA | 1.00 | 0.37 | B | 53A | -24.38 | 112.97 | 212.98 | | | |
| 798-023-15 | CMSO | HMDI | A-480 | 1.05 | 2.87 | B | A54 | -10.00 | 113.40 | 214.10 | Flexible | Light Yellow | Tough |
| 779-014-1 | CMSO | TDI | A-480 | 1.01 | 1.20 | A | 10D | 2.16 | 183.57 | 268.48 | | Light Yellow | |
| 812-010-1 | MCaO | Lupranate | DBTDL | 0.89 | 0.10 | B | 79D | 102.83 | 99.04 | 183.52 | Hard | Amber | Tough |
| 421-098-1 | CO | IPDI | DBTDL | 1.15 | 0.12 | B | A47 | -7.00 | 125.40 | 243.90 | Flexible | Light Yellow | Tough |
| 778-082-1 | MSO | TDI | BDMA | 0.86 | 0.25 | B | 34D | 1.23 | 131.66 | 213.96 | | Light Yellow | |

FIG. 1X

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 798-004-15 | CMSO | TDI | BDMA | 0.95 | 0.60 | B | A57 | -12.00 | 138.20 | 234.00 | Flexible | Dark Yellow | Tough |
| 798-029-1 | CMSO | IPDI | DBTDL | 0.94 | 1.20 | B | A54 | -6.00 | 132.10 | 232.10 | | Light Yellow | |
| 756-097-15 | MSO | Lupranate | A-480 | 0.94 | 2.02 | A | 35D | 38.46 | 161.58 | 226.57 | | | |
| 790-006-1 | CMSO | Lupranate | BDMA | 0.90 | 0.25 | A | 28D | 26.53 | 120.69 | 213.14 | | Light Yellow | |
| 778-080-1 | MSO | IPDI | BDMA | 0.89 | 0.76 | B | 49A | -3.98 | 115.80 | 208.39 | Hard | Amber | Tough |
| 788-066-1 | MHSO | Lupranate | A-480 | 1.01 | 0.07 | A | D63 | 54.00 | 83.68 | 180.40 | Flexible | Light Yellow | Tough |
| 557-034-15 | CO | TDI | DBTDL | 1.10 | 0.79 | B | 66A | -9.29 | 114.23 | 225.92 | Flexible | Light Yellow | Tough |
| 790-081-15 | CMSO | TDI | A-480 | 1.05 | 3.10 | B | A43 | -14.00 | 137.40 | 234.70 | | | |
| 733-074-1 | MSO | HMDI | A-480 | 0.95 | 2.14 | B | 55A | 16.12 | 27.08 | 216.22 | | | |
| 790-095-1 | CMSO | IPDI | DBTDL | 1.00 | 0.40 | B | 52A | -20.29 | 126.25 | 266.07 | | Light Yellow | Tough |
| 778-022-1 | MSO | Lupranate | DBTDL | 0.68 | 0.83 | B | A89 | 28.00 | 130.40 | 339.70 | Flexible | Light Yellow | Tough |
| 790-092-15 | CMSO | IPDI | A-480 | 0.95 | 2.92 | B | A53 | -9.00 | 107.20 | 215.00 | Hard | Water White | Tough |
| 788-091-1 | MHSO | IPDI | BDMA | 1.09 | 0.02 | B | D69 | 69.00 | 101.40 | 207.80 | Hard | Water White | Tough |
| 791-072-15 | MHSO | TDI | BDMA | 0.88 | 0.01 | B | D72 | 54.00 | 112.70 | 218.80 | Flexible | Amber | Tough |
| 798-098-15 | MSO | Lupranate | DBTDL | 1.00 | 0.79 | A | 34D | 40.66 | 131.04 | 254.04 | Hard | Water White | Tough |
| 788-058-15 | MHSO | HMDI | BDMA | 1.09 | 0.01 | C | 77D | 76.77 | 108.85 | 211.59 | | | |
| 779-056-15 | MSO | IPDI | A-480 | 1.05 | 1.94 | A | 68A | -26.43 | 96.57 | 210.49 | | Light Yellow | |
| 779-015-15 | CMSO | TDI | A-480 | 1.05 | 1.89 | A | A33 | -18.00 | 97.30 | 201.00 | Hard | Water White | Tough |
| 788-049-15 | MHSO | HMDI | DABCO | 1.01 | 0.00 | A | D59 | 56.00 | 107.50 | 271.60 | Hard | Water White | Tough |
| 421-067-15 | MHSO | IPDI | BDMA | 0.87 | 0.01 | B | 72D | 45.37 | 96.27 | 230.62 | Hard | Water White | Tough |
| 791-072-15 | MHSO | TDI | BDMA | 0.88 | 0.01 | B | D72 | 54.00 | 112.70 | 218.80 | Hard | Water White | Tough |
| 778-062-15 | MSO | IPDI | A-480 | 0.93 | 1.92 | A | 46A | -9.20 | 218.86 | | | Light Yellow | |
| 798-080-1 | CMSO | HMDI | A-480 | 0.81 | 2.03 | B | 57A | -15.13 | 116.98 | 252.16 | Flexible | Light Yellow | Semi-Tough |
| 790-098-1 | CMSO | TDI | DBTDL | 0.90 | 0.40 | B | A61 | -16.00 | 152.30 | 231.80 | | | |

FIG. 1Y

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 755-088-1 | MSO | Lupranate | A-480 | 1.00 | 1.87 | A | 43A | 50.85 | 167.11 | 244.93 | | Light Yellow | |
| 779-100-1 | MSO | TDI | BDMA | 0.62 | 0.27 | B | A87 | 49.00 | 170.50 | 233.40 | | No | |
| 798-092-1 | MSO | Lupranate | DBTDL | 1.05 | 0.41 | A | 30D | 45.02 | 132.22 | 225.54 | Flexible | Amber | Tough |
| 779-008-15 | MSO | HDI | BDMA | 0.96 | 1.21 | B | A48 | -15.00 | 128.60 | 229.40 | | Light Yellow | |
| 790-096-15 | CMSO | IPDI | DBTDL | 0.95 | 0.84 | B | 57A | 10.95 | 110.41 | 250.26 | | | |
| 756-079-15 | MSO | HMDI | A-480 | 0.94 | 1.88 | A | 53A | 15.49 | 226.30 | | | Light Yellow | |
| 419-005-15 | MSO | TDI | A-480 | 0.90 | 0.99 | C | 85A | 40.21 | 142.96 | 232.34 | Hard | Light Yellow | Semi-Tough |
| 790-088-15 | CMSO | IPDI | A-480 | 0.94 | 0.99 | B | A39 | -17.00 | 147.80 | 221.00 | | Dark Yellow | |
| 779-100-1 | MSO | TDI | BDMA | 0.62 | 0.27 | B | A87 | 50.00 | 148.90 | 239.60 | | No | |
| 797-036-1 | MSO | Lupranate | A-480 | 0.70 | 8.33 | B | 64D | 50.29 | 131.03 | 262.41 | Hard | Amber | Tough |
| 791-005-1 | MHSO | IPDI | DBTDL | 0.88 | 0.15 | B | D75 | 71.00 | 121.30 | 261.10 | Hard | Water White | Tough |
| 798-056-1 | MSO | HMDI | A-480 | 0.90 | 1.00 | B | 67A | 26.80 | 73.16 | 224.83 | Flexible | Light Yellow | Semi-Tough |
| 756-063-1 | CMSO | HDI | DBTDL | 1.01 | 1.19 | B | A32 | -27.00 | 94.78 | 222.30 | Flexible | Light Yellow | |
| 756-034-15 | CMSO | TDI | DBTDL | 1.00 | 0.10 | B | 50A | -0.92 | 222.94 | | | | |
| 791-033-15 | CO | IPDI | BDMA | 1.10 | 1.21 | B | A45 | -4.00 | 110.60 | 234.10 | Flexible | Light Yellow | Tough |
| 791-083-1 | MHSO | TDI | BDMA | 0.88 | 0.01 | B | 81D | 37.30 | 88.86 | 122.93 | Hard | Water White | Tough |
| 778-083-15 | MSO | IPDI | BDMA | 0.86 | 0.82 | B | 55A | -11.60 | 132.08 | 228.78 | | Light Yellow | |
| 778-084-15 | MSO | IPDI | DBTDL | 0.86 | 0.87 | B | 80A | 0.70 | 135.78 | 225.11 | | Light Yellow | |
| 778-097-1 | MSO | TDI | BDMA | 1.00 | 0.27 | B | 79A | 28.61 | 134.08 | 212.93 | | Light Yellow | |
| 756-011-15 | MSO | TDI | DBTDL | 1.00 | 0.74 | B | 80A | 26.41 | 106.56 | 213.61 | | Light Yellow | |
| 755-034-1 | MSO | HMDI | A-480 | 0.86 | 1.98 | B | A71 | 11.00 | 103.50 | 215.40 | | Light Yellow | |
| 779-100-1 | MSO | TDI | BDMA | 0.62 | 0.27 | B | A87 | 50.00 | 148.90 | 239.60 | | No | |
| 421-092-15 | MHSO | IPDI | DABCO | 0.92 | 0.00 | A | D58 | 66.00 | 114.90 | 261.30 | Hard | Water White | Tough |
| 788-069-1 | MHSO | Lupranate | DBTDL | 1.02 | 0.15 | B | D62 | 52.00 | 84.47 | 152.00 | Hard | Amber | Tough |

FIG. 1Z

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 755-004-15 | MSO | TDI | A-480 | 0.95 | 1.01 | A | A71 | 2.00 | 113.20 | 227.90 | Flexible | Light Yellow | Tough |
| 790-065-1 | MSO | TDI | DBTDL | 0.79 | 0.88 | B | 26D | 45.71 | 156.21 | 233.01 | | | |
| 791-006-1 | MHSO | HMDI | DBTDL | 0.92 | 0.10 | C | D61 | 65.00 | 124.60 | 444.30 | Hard | Water White | Tough |
| 790-091-1 | CMSO | IPDI | A-480 | 1.00 | 1.92 | B | 53A | 10.58 | 138.97 | 244.29 | | | |
| 557-087-1 | MHSO | HMDI | A-480 | 0.88 | 0.09 | B | D66 | 64.00 | 117.40 | 334.80 | Hard | Water White | Tough |
| 755-070-1 | MSO | HMDI | A-480 | 1.01 | 1.99 | A | 78A | 30.86 | 96.73 | 228.51 | | Light Yellow | |
| 798-079-15 | CMSO | HMDI | A-480 | 0.81 | 2.07 | B | 44A | -11.71 | 129.44 | 264.85 | Flexible | Light Yellow | Semi-Tough |
| 791-033-1 | CO | IPDI | BDMA | 1.15 | 1.14 | B | A46 | -13.00 | 98.13 | 233.60 | Flexible | Light Yellow | Tough |
| 798-098-1 | MSO | Lupranate | DBTDL | 0.95 | 0.82 | A | 39D | 47.37 | 134.44 | 221.07 | Flexible | Amber | Tough |
| 791-032-1 | CO | IPDI | BDMA | 1.10 | 0.77 | B | 55A | -11.10 | 92.75 | 224.24 | Flexible | Light Yellow | Tough |
| 788-017-15 | MHSO | HMDI | DBTDL | 1.45 | 0.15 | B | D67 | 65.00 | 115.70 | 426.90 | Hard | Water White | Tough |
| 557-096-1 | MHSO | HDI | A-480 | 0.85 | 0.10 | B | D68 | 61.00 | 144.80 | 352.10 | Hard | Water White | Tough |
| 733-083-1 | CMSO | Lupranate | DBTDL | 0.81 | 0.82 | B | 33D | 51.67 | 167.57 | 251.00 | | | |
| 755-057-15 | MSO | HDI | DBTDL | 0.95 | 1.24 | B | A45 | -23.00 | 102.80 | 223.20 | | Light Yellow | |
| 778-084-1 | MSO | IPDI | A-480 | 0.86 | 1.93 | A | 49A | -24.63 | 194.71 | | | Light Yellow | |
| 788-065-15 | MHSO | Lupranate | A-480 | 1.01 | 0.04 | A | A83 | 58.00 | 89.80 | 179.50 | Hard | Amber | Tough |
| 756-096-1 | MSO | Lupranate | A-480 | 0.94 | 1.11 | A | A81 | 2.00 | 139.60 | 249.90 | | Light Yellow | |
| 797-046-15 | MSO | Lupranate | A-480 | 0.90 | 1.92 | A | 42D | 55.00 | 86.55 | 211.77 | Flexible | Amber | Tough |
| 557-057-15 | CO | Lupranate | DBTDL | 1.09 | 0.03 | B | A69 | 4.00 | 121.70 | 225.70 | Flexible | Amber | Tough |
| 790-093-1 | CMSO | IPDI | A-480 | 0.99 | 2.94 | B | A51 | -9.00 | 128.50 | 219.70 | Flexible | Dark Yellow | Tough |
| 798-049-1 | MSO | TDI | DBTDL | 1.00 | 1.20 | B | A34 | -22.00 | 158.00 | 224.50 | Flexible | Dark Yellow | Semi-Tough |
| 788-055-15 | MHSO | HDI | DBTDL | 1.01 | 0.16 | B | D55 | 62.00 | 121.10 | 456.30 | Hard | Water White | Tough |
| 788-072-1 | MHSO | Lupranate | BDMA | 1.09 | 0.01 | B | 82D | 35.65 | 76.73 | 100.18 | Hard | Amber | Tough |
| 798-030-1 | CMSO | IPDI | DBTDL | 1.05 | 1.25 | B | A49 | -11.00 | 149.90 | 235.50 | Flexible | Dark Yellow | Tough |

FIG. 1AA

Table 2 – Polythiourethane Composition Properties

| Sample ID | Thiol Ester | Isocyante | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 790-053-15 | MSO | HMDI | A-480 | 0.79 | 3.03 | A | A75 | 7.00 | 126.70 | 229.90 | Flexible | Light Yellow | Semi-Tough |
| 791-025-15 | CO | IPDI | A-480 | 1.15 | 2.83 | A | A40 | -8.00 | 117.90 | 236.50 | Hard | Light Yellow | Tough |
| 790-086-15 | CMSO | IPDI | BDMA | 0.94 | 1.33 | B | A51 | -9.00 | 146.80 | 234.50 | Flexible | Light Yellow | Tough |
| 557-084-15 | MHSO | HDI | A-480 | 0.63 | 0.04 | B | 74D | 57.28 | 120.16 | 247.60 | | Water White | Tough |
| 421-060-1 | MHSO | HDI | BDMA | 0.87 | 0.02 | B | D56 | 61.00 | 148.20 | 358.90 | Hard | Water White | Tough |
| 778-039-15 | MSO | Lupranate | BDMA | 0.89 | 0.26 | B | D49 | 31.00 | 130.00 | 259.90 | | Light Yellow | |
| 756-010-1 | MSO | TDI | DBTDL | 1.00 | 0.42 | B | 26D | 29.64 | 124.05 | 228.93 | Flexible | Light Yellow | |
| 557-022-15 | CO | HMDI | DABCO | 1.08 | 0.00 | A | A58 | -3.00 | 99.80 | 222.30 | Flexible | Light Yellow | Tough |
| 790-089-15 | CMSO | IPDI | A-480 | 1.05 | 1.21 | B | 47A | 10.15 | 113.89 | 230.94 | | | |
| 779-032-1 | CMSO | TDI | BDMA | 0.89 | 0.36 | B | 55A | -29.10 | 95.06 | 207.22 | | | |
| 778-097-15 | MSO | TDI | BDMA | 0.94 | 0.29 | B | 31D | 35.07 | 140.37 | 226.76 | | Light Yellow | |
| 756-099-1 | MSO | Lupranate | A-480 | 0.94 | 2.90 | A | A77 | -4.00 | 145.90 | 212.30 | | Light Yellow | |
| 791-041-1 | CO | HMDI | BDMA | 1.15 | 0.79 | B | 58A | 12.36 | 74.67 | 241.89 | Flexible | Light Yellow | Tough |
| 812-011-1 | MCaO | Lupranate | DBTDL | 1.02 | 0.10 | B | 79D | 88.27 | 100.41 | 189.55 | Hard | Amber | Tough |
| 791-058-15 | CO | IPDI | DABCO | 1.15 | 0.00 | A | A50 | -15.00 | 78.23 | 224.40 | Flexible | Light Yellow | Tough |
| 779-022-1 | CMSO | Lupranate | A-480 | 0.99 | 2.84 | A | A67 | -22.00 | 138.30 | 209.60 | Flexible | Light Yellow | |
| 791-072-15 | MHSO | TDI | BDMA | 0.88 | 0.01 | B | D72 | 56.00 | 113.40 | 220.90 | Hard | Water White | Tough |
| 797-033-1 | MSO | Lupranate | A-480 | 0.76 | 7.70 | B | 63D | 49.68 | 122.27 | 264.44 | Hard | Amber | Tough |
| 778-073-15 | MSO | IPDI | A-480 | 0.95 | 0.92 | A | A53 | -10.00 | 101.80 | 177.40 | Flexible | Light Yellow | |
| 791-020-1 | CO | HMDI | DBTDL | 1.15 | 0.44 | C | 62A | 8.97 | 90.71 | 237.61 | Flexible | Light Yellow | |
| 778-086-15 | MSO | IPDI | DABCO | 1.00 | 0.01 | A | A58 | -4.00 | 123.40 | 198.10 | Flexible | Light Yellow | |
| 778-074-15 | MSO | IPDI | A-480 | 1.00 | 1.88 | A | 58A | -3.25 | 116.84 | 218.45 | | Light Yellow | |
| 755-021-15 | MSO | Lupranate | DABCO | 0.95 | 0.00 | A | A83 | 15.00 | 111.60 | 227.50 | | Amber | |
| 779-016-1 | CMSO | TDI | A-480 | 1.01 | 2.83 | A | A36 | -17.00 | 124.00 | 212.30 | Flexible | Light Yellow | |

FIG. 1AB

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 779-075-15 | MSO | TDI | BDMA | 0.89 | 0.01 | B | A50 | -29.00 | 62.23 | 184.10 | | | |
| 779-065-15 | MSO | Lupranate | BDMA | 1.00 | 0.14 | B | A82 | 11.00 | 121.40 | 221.90 | | | |
| 798-022-15 | CMSO | HMDI | A-480 | 1.03 | 1.98 | B | A41 | -9.00 | 120.30 | 230.40 | | | |
| 791-003-15 | MHSO | IPDI | DBTDL | 0.88 | 0.10 | B | 72D | 79.19 | 111.34 | 233.73 | Hard | Water White | Tough |
| 557-013-15 | CO | Lupranate | DABCO | 1.09 | 0.00 | A | A76 | -2.00 | 61.73 | 283.80 | Flexible | Amber | Tough |
| 756-012-1 | MSO | TDI | DBTDL | 0.90 | 0.84 | B | A83 | 1.00 | 138.10 | 214.10 | | Light Yellow | |
| 812-010-15 | MCaO | Lupranate | DBTDL | 0.94 | 0.12 | B | 80D | 100.41 | 94.70 | 186.28 | Hard | Amber | Tough |
| 421-082-15 | MHSO | IPDI | A-480 | 0.92 | 0.09 | A | D50 | 70.00 | 116.00 | 237.60 | Hard | Water White | Tough |
| 419-009-1 | MSO | IPDI | A-480 | 0.91 | 1.96 | A | A59 | -3.00 | 128.80 | 220.50 | Flexible | Light Yellow | Semi-Tough |
| 421-078-15 | MHSO | IPDI | A-480 | 0.97 | 0.03 | A | 79D | 60.47 | 100.66 | 268.54 | Hard | Water White | Tough |
| 797-030-15 | MSO | Lupranate | A-480 | 0.77 | 5.98 | B | 64D | 48.97 | 138.60 | 281.65 | Hard | Amber | Tough |
| 798-099-15 | MSO | Lupranate | DBTDL | 0.84 | 5.21 | B | 56D | 54.01 | 119.32 | 243.70 | Hard | Dark Yellow | Tough |
| 788-030-1 | MHSO | HDI | DBTDL | 0.93 | 0.09 | B | 78D | 52.70 | 107.74 | 453.26 | Hard | Water White | Tough |
| 790-069-1 | MSO | Lupranate | BDMA | 1.13 | 0.26 | A | 75A | -18.88 | 121.01 | 192.97 | | | |
| 790-099-1 | CMSO | TDI | DBTDL | 0.98 | 0.42 | B | A52 | -18.00 | 134.40 | 235.60 | | | |
| 421-050-15 | MHSO | HMDI | BDMA | 0.92 | 0.00 | B | 72D | 57.20 | 108.53 | 229.20 | Hard | Water White | Tough |
| 779-036-15 | CMSO | TDI | BDMA | 0.95 | 1.15 | B | A54 | -18.00 | 125.00 | 223.30 | Flexible | | |
| 790-022-1 | CMSO | TDI | DBTDL | 0.85 | 1.21 | B | A71 | -10.00 | 133.60 | 223.70 | Flexible | Dark Yellow | Tough |
| 788-020-15 | MHSO | HDI | A-480 | 1.03 | 0.05 | B | 76D | 51.30 | 109.40 | 201.70 | Hard | Water White | Tough |
| 788-060-1 | MHSO | HMDI | BDMA | 1.09 | 0.02 | C | D55 | 60.00 | 97.78 | 418.40 | Hard | Water White | Tough |
| 797-019-1 | MSO | IPDI | DBTDL | 0.89 | 0.79 | B | 41A | -25.56 | 113.49 | 254.03 | Flexible | Light Yellow | Semi-Tough |
| 779-074-1 | MSO | IPDI | DBTDL | 1.00 | 1.22 | B | A54 | -7.00 | 131.10 | 219.30 | | | |
| 756-054-1 | CMSO | HDI | A-480 | 0.99 | 2.96 | B | A33 | -24.00 | 142.10 | 239.80 | Flexible | Light Yellow | |
| 779-011-15 | MSO | Lupranate | DBTDL | 0.95 | 0.45 | B | 52D | 42.47 | 83.24 | 226.86 | Flexible | Light Yellow | |

FIG. 1AC

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 419-007-15 | MSO | IPDI | A-480 | 0.91 | 1.01 | A | 53A | -5.47 | 173.27 | 237.35 | Flexible | Light Yellow | Semi-Tough |
| 732-077-1 | MSO | Lupranate | A-480 | 0.67 | 1.10 | A | A85 | -1.00 | 153.50 | 204.60 | Flexible | Dark Yellow | Tough |
| 733-010-15 | MSO | TDI | DBTDL | 0.93 | 1.20 | B | A35 | -21.00 | 177.30 | 226.30 | Flexible | Light Yellow | Semi-Tough |
| 797-019-15 | MSO | IPDI | DBTDL | 1.00 | 0.82 | B | 33A | -22.72 | 186.59 | 289.51 | Flexible | Light Yellow | Tough |
| 790-078-1 | MSO | IPDI | BDMA | 0.83 | 1.20 | B | A64 | 0.00 | 141.90 | 229.40 | Flexible | Light Yellow | Tough |
| 797-043-1 | MSO | Lupranate | DBTDL | 0.95 | 1.25 | B | 38D | 45.14 | 129.30 | 214.35 | Flexible | Amber | Tough |
| 797-035-1 | MSO | Lupranate | A-480 | 0.66 | 7.20 | B | 73D | 49.65 | 129.79 | 332.74 | Hard | Amber | Tough |
| 798-010-15 | CMSO | Lupranate | DBTDL | 1.04 | 0.37 | B | A68 | -10.00 | 104.70 | 160.60 | | | |
| 756-039-1 | CMSO | HMDI | A-480 | 1.01 | 1.85 | B | 35A | 0.73 | 103.04 | 264.09 | | | |
| 797-028-15 | MSO | TDI | DBTDL | 1.00 | 0.39 | B | 36A | -24.34 | 183.40 | 261.93 | Flexible | Light Yellow | Semi-Tough |
| 421-052-15 | MHSO | HMDI | BDMA | 0.87 | 0.01 | B | 63D | 54.80 | 104.68 | 601.86 | Hard | Water White | Tough |
| 798-081-15 | CMSO | TDI | DBTDL | 0.90 | 0.82 | A | 68A | -25.59 | 214.35 | 0.00 | Flexible | Dark Yellow | Tough |
| 755-088-15 | MSO | Lupranate | A-480 | 0.90 | 1.97 | A | 55D | 52.48 | 117.12 | 452.98 | | Light Yellow | |
| 788-085-1 | MHSO | IPDI | DABCO | 1.09 | 0.00 | A | D66 | 71.00 | 110.50 | 377.40 | Hard | Water White | Tough |
| 798-050-15 | MSO | TDI | BDMA | 0.95 | 0.39 | A | A36 | -18.00 | 151.60 | 245.00 | Flexible | Light Yellow | Semi-Tough |
| 791-037-1 | CO | Lupranate | BDMA | 1.10 | 0.80 | B | 75A | -2.57 | 121.68 | 220.36 | Flexible | Amber | Tough |
| 798-073-1 | MSO | TDI | DBTDL | 0.99 | 1.39 | A | A73 | -1.00 | 152.00 | 239.90 | Flexible | Amber | Tough |
| 755-085-15 | MSO | HDI | DABCO | 1.00 | 0.00 | B | A51 | -14.00 | 98.30 | 228.60 | Flexible | Light Yellow | |
| 756-008-15 | MSO | HMDI | DBTDL | 1.00 | 1.31 | B | A70 | 12.00 | 137.40 | 234.40 | Flexible | Light Yellow | |
| 778-098-15 | MSO | TDI | BDMA | 0.95 | 0.24 | B | A78 | 0.00 | 124.60 | 218.00 | | Light Yellow | |
| 791-072-15 | MHSO | TDI | BDMA | 0.88 | 0.01 | B | D72 | 56.00 | 113.80 | 215.90 | Hard | Water White | Tough |
| 791-072-15 | MHSO | TDI | BDMA | 0.88 | 0.01 | B | D72 | 54.00 | 112.70 | 218.80 | Hard | Water White | Tough |
| 798-024-15 | CMSO | HMDI | DBTDL | 1.05 | 0.40 | B | 47A | 15.02 | 185.73 | 285.04 | | | |
| 812-042-1 | MSO | HMDI | DBTDL | 0.92 | 0.81 | B | 21D | -9.00 | 120.17 | 197.78 | Flexible | Light Yellow | Tough |

FIG. 1AD

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 791-005-15 | MHSO | HMDI | DBTDL | 0.92 | 0.06 | C | 76D | 59.37 | 105.21 | 357.15 | Hard | Water White | Tough |
| 790-085-15 | CMSO | IPDI | BDMA | 1.05 | 0.94 | B | 53A | -23.10 | 92.82 | 214.53 | | | |
| 812-040-15 | MSO | Lupranate | A-480 | 0.91 | 1.97 | A | 48D | 53.07 | 123.50 | 218.56 | Hard | Amber | Tough |
| 798-070-1 | MSO | TDI | DBTDL | 0.90 | 0.74 | B | 24D | 35.91 | 156.89 | 232.77 | Flexible | Amber | Tough |
| 788-078-15 | MHSO | IPDI | A-480 | 1.15 | 0.07 | A | D64 | 71.00 | 117.90 | 390.00 | Hard | Water White | Tough |
| 421-013-1 | MHSO | TDI | DBTDL | 0.97 | 0.09 | B | 78D | 54.81 | 101.49 | 158.21 | Hard | Water White | Tough |
| 755-069-1 | MSO | HMDI | A-480 | 0.91 | 0.97 | A | 24D | 35.27 | 147.70 | 255.42 | Flexible | Light Yellow | |
| 755-086-15 | MSO | Lupranate | A-480 | 0.99 | 1.02 | A | 45D | 52.46 | 149.39 | 243.19 | | Light Yellow | |
| 779-015-1 | CMSO | TDI | A-480 | 1.00 | 2.00 | A | A38 | -18.00 | 110.50 | 207.60 | Flexible | Light Yellow | |
| 788-047-15 | MHSO | HMDI | A-480 | 1.01 | 0.04 | A | 78D | 60.11 | 73.69 | 217.53 | Hard | Water White | Tough |
| 797-044-1 | MSO | Lupranate | DBTDL | 1.05 | 1.25 | B | 29D | 37.69 | 132.86 | 217.45 | Flexible | Amber | Tough |
| 755-016-1 | MSO | Lupranate | A-480 | 0.86 | 1.94 | A | 47D | 54.36 | 121.89 | 259.58 | | Amber | |
| 778-071-1 | MSO | HDI | A-480 | 0.95 | 2.85 | A | A48 | -15.00 | 77.26 | 213.00 | | Light Yellow | |
| 557-004-15 | CO | TDI | A-480 | 1.10 | 2.93 | A | A48 | -9.00 | 86.73 | 224.30 | Flexible | Light Yellow | Tough |
| 788-015-15 | MHSO | HMDI | DBTDL | 1.61 | 0.11 | B | D65 | 61.00 | 127.20 | 404.20 | Hard | Water White | Tough |
| 779-035-15 | CMSO | TDI | BDMA | 1.05 | 0.76 | B | A36 | -19.00 | 112.80 | 214.60 | | | |
| 788-043-1 | MHSO | Lupranate | DBTDL | 1.07 | 0.11 | B | D71 | 55.00 | 88.00 | 141.40 | Hard | Amber | Tough |
| 791-060-15 | CO | Lupranate | DABCO | 1.16 | 0.00 | A | A62 | -12.00 | 106.00 | 233.10 | Flexible | Amber | Tough |
| 790-080-15 | CMSO | TDI | A-480 | 1.04 | 1.98 | B | A50 | -19.00 | 135.30 | 221.70 | | | |
| 421-080-15 | MHSO | IPDI | A-480 | 0.96 | 0.05 | A | D51 | 60.00 | 114.60 | 274.80 | Hard | Water White | Tough |
| 755-096-1 | MSO | Lupranate | DBTDL | 1.00 | 0.42 | B | 48D | 47.96 | 123.78 | 238.44 | | Light Yellow | |
| 778-012-1 | MSO | HMDI | DBTDL | 0.93 | 0.84 | B | 48A | -4.00 | 155.40 | 277.75 | | Light Yellow | |
| 791-072-15 | MHSO | TDI | BDMA | 0.88 | 0.01 | B | D72 | 56.00 | 113.40 | 220.90 | Hard | Water White | Tough |
| 798-003-1 | CMSO | TDI | DBTDL | 0.98 | 1.28 | B | A60 | -10.00 | 143.20 | 236.80 | Flexible | Dark Yellow | Tough |

FIG. 1AE

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 755-087-1 | MSO | Lupranate | A-480 | 0.90 | 1.06 | A | A83 | 20.00 | 118.50 | 269.40 | | Light Yellow | |
| 790-080-1 | CMSO | TDI | A-480 | 1.00 | 2.07 | B | 55A | -22.25 | 108.98 | 216.42 | | | |
| 788-052-1 | MHSO | HDI | A-480 | 1.01 | 0.05 | A | A87 | 59.00 | 135.80 | 374.20 | Hard | Water White | Tough |
| 732-076-15 | MSO | Lupranate | A-480 | 0.83 | 1.01 | A | 81A | 46.88 | 183.70 | 252.82 | | | |
| 797-016-15 | MSO | IPDI | DBTDL | 1.01 | 0.39 | B | A18 | -24.00 | 92.93 | 187.50 | Flexible | Light Yellow | Semi-Tough |
| 733-017-15 | MSO | Lupranate | DBTDL | 0.66 | 0.44 | A | A88 | -10.00 | 133.60 | 227.80 | | | |
| 557-085-15 | MHSO | HMDI | A-480 | 0.86 | 0.04 | B | 68D | 38.35 | 97.72 | 269.73 | Hard | Water White | Tough |
| 755-042-15 | MSO | HMDI | DBTDL | 0.96 | 0.86 | B | 63A | -12.30 | 148.54 | 270.37 | | Light Yellow | |
| 779-027-15 | CMSO | IPDI | A-480 | 0.95 | 2.87 | A | A36 | -20.00 | 102.60 | 212.60 | Flexible | | |
| 798-065-1 | MSO | TDI | A-480 | 0.90 | 1.95 | A | 81A | 30.65 | 146.24 | 234.79 | Flexible | Light Yellow | Tough |
| 557-037-15 | CO | TDI | DBTDL | 1.10 | 0.24 | B | A56 | -8.00 | 89.83 | 220.60 | Flexible | Light Yellow | Tough |
| 779-068-1 | MSO | TDI | A-480 | 1.00 | 1.94 | A | A41 | -15.00 | 91.68 | 188.50 | | | |
| 756-024-1 | CMSO | Lupranate | A-480 | 1.01 | 1.15 | A | 16D | 31.82 | 185.46 | 242.82 | Flexible | Light Yellow | |
| 557-083-1 | MHSO | HMDI | A-480 | 0.96 | 0.02 | B | 75D | 58.39 | 106.65 | 257.44 | Hard | Water White | Tough |
| 779-076-1 | MSO | TDI | BDMA | 0.95 | 0.01 | B | 26D | 13.97 | 144.73 | 226.62 | | | |
| 779-100-1 | MSO | TDI | BDMA | 0.62 | 0.27 | B | A87 | 50.00 | 148.90 | 239.60 | | No | |
| 812-022-15 | MCaO | HMDI | DBTDL | 1.02 | 0.10 | B | 60A | 9.71 | 110.33 | 276.70 | Flexible | Water White | Tough |
| 755-030-15 | MSO | TDI | DBTDL | 0.96 | 1.15 | B | A71 | -4.00 | 119.80 | 214.30 | | Light Yellow | |
| 557-018-1 | CO | Lupranate | A-480 | 1.08 | 2.88 | A | A70 | -10.00 | 99.40 | 201.60 | Flexible | Amber | Tough |
| 756-048-1 | CMSO | HMDI | DBTDL | 1.01 | 0.87 | B | 45A | 16.57 | 136.11 | 248.71 | | | |
| 798-005-15 | CMSO | TDI | BDMA | 1.04 | 0.39 | B | 55A | 4.14 | 151.81 | 239.21 | | | |
| 790-070-15 | CMSO | IPDI | DBTDL | 0.80 | 0.87 | B | 66A | 25.89 | 156.97 | 256.06 | | | |
| 732-067-1 | MSO | TDI | A-480 | 0.92 | 1.11 | A | 43A | -21.34 | 170.87 | 278.66 | | | |
| 798-023-1 | CMSO | HMDI | A-480 | 1.01 | 2.83 | B | A55 | -6.00 | 135.60 | 230.50 | Flexible | Light Yellow | Tough |

FIG. 1AF

Table 2 – Polythiourethane Composition Properties

| Sample ID | Thiol Ester | Isocyanate | Catalyst | XH:NCO Equivalent Ratio | Catalyst (wt %) | Cure Profile | Shore Hardness | Glass Transition Temp (°C) | CTE1 (ppm) | CTE2 (ppm) | Polymer Stiffness | Polymer Color | Polymer Toughness |
|---|---|---|---|---|---|---|---|---|---|---|---|---|---|
| 812-011-1 | MCaO | Lupranate | DBTDL | 1.02 | 0.10 | B | 79D | 62.60 | 93.68 | 268.62 | Hard | Amber | Tough |
| 756-007-1 | MSO | HMDI | DBTDL | 0.99 | 0.82 | B | 65A | 14.50 | 171.76 | 228.39 | | | |
| 797-011-15 | MSO | IPDI | A-480 | 1.05 | 1.03 | A | 26A | -25.26 | 94.72 | 277.40 | Flexible | Light Yellow | Semi-Tough |
| 790-083-15 | CMSO | IPDI | BDMA | 1.05 | 0.41 | B | A44 | -19.00 | 140.40 | 221.20 | | | |
| 798-073-15 | MSO | TDI | DBTDL | 1.05 | 1.15 | B | 69A | 19.26 | 161.23 | 248.97 | Flexible | Amber | Tough |
| 421-075-1 | MHSO | Lupranate | DABCO | 0.81 | 0.00 | A | D68 | 59.00 | 88.47 | 161.60 | Hard | Amber | Tough |
| 778-076-15 | MSO | IPDI | A-480 | 0.95 | 2.85 | A | A77 | 12.00 | 132.70 | 224.10 | | Light Yellow | |
| 732-077-15 | MSO | Lupranate | A-480 | 0.93 | 1.98 | A | 70A | 46.70 | 161.56 | 273.49 | | | |
| 755-060-15 | MSO | TDI | A-480 | 1.00 | 1.91 | A | 76A | 25.12 | 88.89 | 215.20 | | Light Yellow | |
| 790-049-15 | MSO | HMDI | A-480 | 0.87 | 1.04 | B | 62A | 22.28 | 114.36 | 255.59 | | | |
| 755-061-1 | MSO | TDI | A-480 | 0.90 | 1.94 | A | 35D | 42.98 | 160.55 | 238.36 | | Light Yellow | |
| 788-064-1 | MHSO | HDI | BDMA | 1.14 | 0.02 | B | D65 | 62.00 | 127.30 | 380.10 | Hard | Water White | Tough |
| 421-005-1 | MHSO | Lupranate | DABCO | 0.87 | 0.00 | A | D72 | 46.00 | 83.74 | 154.50 | Hard | Amber | Tough |
| 732-074-15 | MSO | TDI | DABCO | 0.93 | 0.05 | A | A31 | -24.00 | 31.18 | 153.40 | Flexible | Light Yellow | Tough |
| 779-029-1 | CMSO | TDI | DBTDL | 1.00 | 0.37 | B | A43 | -26.00 | 91.42 | 219.80 | | | |
| 421-047-1 | MHSO | TDI | BDMA | 0.96 | 0.01 | B | 80D | 47.84 | 100.71 | 168.46 | Hard | Water White | Tough |
| 733-007-15 | MSO | TDI | DBTDL | 0.92 | 0.37 | B | 48A | 4.56 | 172.37 | 272.25 | | | |
| 779-100-1 | MSO | TDI | BDMA | 0.62 | 0.27 | B | A87 | 50.00 | 148.90 | 239.60 | | No | |
| 733-083-15 | CMSO | Lupranate | DBTDL | 0.65 | 0.81 | B | D56 | 65.00 | 173.90 | 360.30 | Flexible | Dark Yellow | Tough |
| 557-042-1 | CO | HDI | A-480 | 1.12 | 2.79 | A | A42 | -30.00 | 131.30 | 255.30 | Flexible | Light Yellow | Tough |
| 779-035-1 | CMSO | TDI | BDMA | 1.00 | 0.78 | B | 53A | -27.17 | 104.67 | 212.30 | | | |
| 791-027-15 | MSO/MHSO | TDI | A-480 | 0.94 | 0.04 | C | 39D | 56.71 | 141.60 | 198.53 | Flexible | Light Yellow | |

POLYTHIOURETHANE COMPOSITIONS AND PROCESSES FOR MAKING AND USING SAME

CROSS REFERENCE TO RELATED APPLICATIONS

This application is a continuation-in-part patent application that claims the benefit of four patent applications having U.S. Ser. Nos. 11/060,675; 11/060,696 (now U.S. Pat. No. 7,557,236); Ser. No. 11/059,792 (now U.S. Pat. No. 7,781,484); and Ser. No. 11/059,647 (now U.S. Pat. No. 7,713,326), all of which were filed on Feb. 17, 2005 and claim priority to provisional patent applications having U.S. Ser. No. 60/545,260 filed on Feb. 17, 2004; U.S. Ser. No. 60/561,614 filed on Apr. 13, 2004; U.S. Ser. No. 60/561,685 filed on Apr. 13, 2004; and U.S. Ser. No. 60/561,855 filed on Apr. 13, 2004, all of which hereby are incorporated by reference in their entirety.

BACKGROUND OF THE INVENTION

1. Field of the Invention

The invention relates to polythiourethane compositions generally made from a reaction of thiol ester compositions and an isocyanate. The invention also relates to the processes for preparing such compositions and uses for the compositions.

2. Description of Related Art

The chemical industry strives to make products, such as polymers, fertilizers, coatings, foams, and fuels, with less expensive feedstocks that are in abundant supply. As the fossil fuels slowly deplete over time, alternative sources are always being sought as replacements for fuels. Additionally, the chemical industry continuously strives to produce products and use feedstocks that are environmentally friendly in order to reduce potential hazards and risks related to safety and environmental issues.

SUMMARY OF THE INVENTION

The present invention provides a novel polymer composition that is produced by reacting a thiol ester composition with an isocyanate composition. In embodiments, the thiol ester composition can be a hydroxy thiol ester (hydroxy thiol ester composition); alternatively, a crosslinked thiol ester (crosslinked thiol ester composition); alternatively, a mercaptanized unsaturated ester (mercaptanized unsaturated ester composition); alternatively, a mercaptanized epoxidized ester (mercaptanized epoxidized ester composition); or alternatively, a crosslinked mercaptanized unsaturated ester (crosslinked mercaptanized unsaturated ester composition). The isocyanate compositions described herein can be used to prepare the polymer composition.

In addition to the polymers, methods of making the polymers are also provided as embodiments of the present invention. In an embodiment, the thiol ester composition is contacted with the isocyanate composition to form a mixture. The mixture is then heated to produce the polymer. In some embodiments, a catalyst is used to produce the polymer. In some embodiments, the polymer of the present invention has a glass transition temperature ranging between −100° C. to 250° C.

BRIEF DESCRIPTION OF THE DRAWINGS

FIGS. 1A-1AG is a table that contains physical property data for numerous polythiourethane compositions prepared in accordance with embodiments of the present invention.

DETAILED DESCRIPTION OF THE INVENTION

In this specification "natural" refers to materials obtained, by any method, from naturally occurring fruits, nuts, vegetables, plants and animals. As an example, natural source oil refers to source oils extracted, and optionally purified, from naturally occurring fruits, nuts, vegetables, plants and animals. Additionally, unsaturated natural source oil refers to unsaturated source oils extracted, and optionally purified, from naturally occurring fruits, nuts, vegetables, plants, and animals. As another example, the unsaturated natural source oil can be derived from genetically modified nuts, vegetables, plant, and animal sources. As yet another example, the unsaturated natural source oil comprises a triglyceride derived from genetically modified nuts, vegetables, plant, and animal sources.

In this specification, "natural source raw material" refers to materials obtained by extraction, chemical breakdown, or chemical processing of "natural" materials. A non-limiting example includes natural source oils that can be extracted from naturally occurring fruits, nuts, vegetables, plants and animals. As another non-limiting example, glycerol and carboxylic acids or carboxylic acid esters, saturated or unsaturated, can be produced and isolated by the chemical processing of triglycerides extracted from naturally occurring fruits, nuts, vegetables, plants, and animals.

In this specification "synthetic" refers to materials produced from chemical building blocks not directly derived from natural sources. For example, synthetic unsaturated ester oil can be produced by the reaction of synthetic ethylene glycol and a synthetic carboxylic acid, i.e. acrylic acid or propionic acid. Other types of synthetic materials will be apparent to those of skill in the art and are to be considered within the scope of the present invention.

Regardless of the definitions of natural and synthetic, the materials described herein can be produced from a combination of natural and synthetic materials, "semi-synthetic". As a non-limiting example, the unsaturated ester oils described in this specification can be obtained or produced from a combination of synthetic and natural source raw materials. For example, the unsaturated ester oil can be produced by the reaction of synthetic ethylene glycol and oleic acid isolated from a natural source oil. Alternatively, the unsaturated ester oil can be produced from the reaction of glycerol isolated from natural source oils and a synthetic carboxylic acid, i.e. acrylic acid. Alternatively, the unsaturated ester oil can be produced from glycerol and oleic acid isolated from natural source oils.

In this specification, "thiol ester composition" refers to an ester composition that includes "thiol ester molecules." The thiol ester molecule has at least one thiol group and at least one ester group within the thiol ester molecule.

In this specification, "hydroxy thiol ester composition" refers to an ester composition that includes "hydroxy thiol ester molecules." The hydroxy thiol ester molecule has at least one thiol group, at least one ester group, and at least one hydroxy or alcohol group within the hydroxy thiol ester molecule. Alternatively, the alcohol group and the thiol group can be combined in the same group, which is referred to as an "α-hydroxy thiol group."

In this specification, "unsaturated ester composition" refers to an ester composition that includes unsaturated ester molecules. The unsaturated ester molecules have at least one ester group and at least one carbon-carbon double bond within the unsaturated ester molecule.

In this specification, "epoxidized unsaturated ester composition" refers to an ester composition that has been produced by epoxidizing an unsaturated ester composition.

In this specification, "polythiourethane" refers to a urethane composition that includes more than one of the following structure:

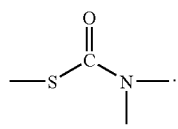

The presence of the thiourethane group can be determined by methods known to those skilled in the art (for example infrared spectroscopy, Raman spectroscopy, and/or NMR).

Polythiourethane Compositions

In an aspect, the polymer of the present invention can be described as a reaction product of a thiol ester composition and an isocyanate composition. In embodiments, the polymer composition can be called a polythiourethane. Generally, the polythiourethane of the present invention comprises multiple thiourethane groups having structure G2:

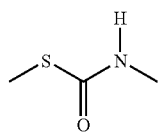

where the undesignated valencies represent the remainder of the structure of the polymer including additional groups having structure G2. The presence of the thiourethane group G2 can be determined using techniques known to those skilled in the art (for example Infrared spectroscopy, Raman spectroscopy, and or $^{13}$C NMR).

The polythiourethane of the present invention can be described as having a repeating unit D2:

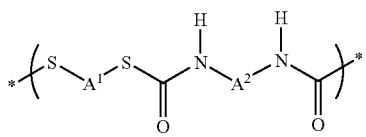

where the undesignated valencies represent the remainder of the structure of the polymer including additional repeating units D2. In embodiments, the backbone of the polythiourethane having repeating unit D2 is linear; or alternatively, the backbone of the polythiourethane having repeating unit D2 is crosslinked. When the backbone of the polythiourethane having repeating unit D2 is crosslinked, $A^1$ and/or $A^2$ further comprise additional repeating units D2. The repeating unit D2 of the polythiourethane is comprised of two different units: U1 and U2.

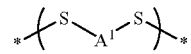

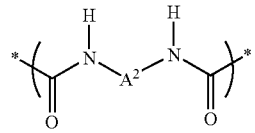

Generally, unit U1 of the polythiourethane of the present invention is derived from a thiol ester of the thiol ester composition and unit U2 of the polythiourethane of the present invention is derived from an isocyanate of the isocyanate composition. Thus, $A^1$ represents the remainder of the thiol ester molecule (including ester groups, any other groups present in the thiol ester molecule, and optionally additional repeating units D2), and $A^2$ represents the remainder of the isocyanate molecule (including any other groups present in the isocyanate molecule and optionally additional repeating units D2). Because units U1 and U2 are derived from two different materials, the structures of these units are independent of each other. Therefore, the polythiourethanes having the repeating unit D2 can be comprised of any combination of units U1 and U2. Thus, the polythiourethane having the repeating unit D2 can be described as the reaction product of a thiol ester composition and an isocyanate composition where unit U1 can be derived from any thiol ester described herein and unit U2 can be derived from any isocyanate described herein.

The polythiourethane of the present invention can alternatively be described as a reaction product of a thiol ester composition and an isocyanate composition. The thiol ester composition and the isocyanate are independent elements of the polythiourethane. Therefore, the polythiourethane can be described as a polythiourethane product of any combination of the thiol ester composition element described herein and the isocyanate composition element described herein. In aspects, the polymer can be linear. In other aspects, the polymer can be crosslinked. When the polymer composition is crosslinked, either the thiol ester composition comprises thiol ester molecules having greater than 2 thiol groups per thiol ester molecule or the isocyanate composition comprises isocyanate molecules having at least 2 isocyanate groups per isocyanate molecule. Alternatively, when the polymer is crosslinked the thiol ester composition comprises thiol ester molecules having greater than 2 thiol groups per thiol ester molecule and the isocyanate composition comprises isocyanate molecules having at least 2 isocyanate groups per isocyanate molecule.

Generally, the thiol ester composition comprises thiol ester molecules having at least 2 thiol groups and the isocyanate composition comprises isocyanate molecules having at least 2 isocyanate groups. Additional embodiments regarding the number or average number of thiol groups present in the thiol ester molecules of the thiol ester composition are described herein and are generally applicable to the description of the polythiourethane as a reaction product of a thiol ester composition and an isocyanate composition. Additional embodiments regarding the number or average number of isocyanate groups present in the isocyanate molecules of the isocyanate composition are described herein and are generally application to the description of the polythiourethane as a reaction product of a thiol ester composition and an isocyanate composition.

In embodiments, the thiol ester composition utilized to produce the polythiourethane composition can comprise a hydroxy thiol ester (hydroxy thiol ester composition); alternatively, a crosslinked thiol ester (crosslinked thiol ester composition); alternatively, a mercaptanized unsaturated ester (mercaptanized unsaturated ester composition); alternatively, a mercaptanized epoxidized ester (mercaptanized epoxidized ester composition); or alternatively, a crosslinked mercaptanized unsaturated ester (crosslinked mercaptanized unsaturated ester composition). In non-limiting embodiments, the thiol ester composition can comprise a mercaptanized natural source oil; alternatively, mercaptanized epoxidized natural source oil; alternatively, crosslinked mercaptanized natural source oil; or alternatively, crosslinked mercaptanized epoxidized natural source oil. In further non-limiting embodiments, the thiol ester composition comprises mercaptanized soybean oil; alternatively, a mercaptanized castor oil; alternatively, a mercaptanized epoxidized soybean oil; or alternatively, a crosslinked mercaptanized soybean oil. Other thiol esters are described herein and can generally be utilized in the thiol ester compositions to describe the polythiourethane composition that is a reaction product of a thiol ester composition and an isocyanate composition. Additionally, other aspects of the thiol ester materials (e.g. average number of thiol groups per thiol ester molecule, thiol sulfur content etc. . . . ) are described herein and can be utilized to further describe the thiol esters of the thiol ester compositions. Besides the thiol ester compositions described herein, other suitable thiol ester compositions will be apparent to those persons having ordinary skill in the art, can be used, and are to be considered within the scope of the present invention.

Generally the isocyanate composition can comprise, singly or in any combination, any isocyanate described herein. In embodiments, the isocyanate composition can comprise aliphatic isocyanates, cycloaliphatic isocyanates, aromatic isocyanates, or mixtures thereof. In some embodiments, the isocyanate composition can comprise an aliphatic isocyanate; alternatively, a cycloaliphatic isocyanate; or alternatively, an aromatic isocyanate composition. Particular isocyanates having at least two isocyanate groups are described herein and can generally be utilized in the isocyanate compositions describing the polythiourethane as a reaction product of a thiol ester composition and an isocyanate composition. Additionally, other aspects of the isocyanate materials (e.g. number or average number of isocyanate groups per isocyanate molecule, etc. . . . ) are described herein and can be utilized to further describe the isocyanate composition.

Generally, the thiol ester composition and the isocyanate composition are independent elements of the polythiourethane described as the reaction product of a thiol ester composition and an isocyanate composition. Therefore, the polythiourethane composition can be described as the reaction product of any combination of the thiol ester composition described herein and the isocyanate composition described herein. In embodiments, the polythiourethane can be described as the reaction product of a thiol ester composition with isocyanate composition comprising an isocyanate having at least two isocyanate groups. In embodiments, the polythiourethane can be described as the reaction product of a thiol ester composition and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition and an isocyanate composition comprising an aliphatic isocyanate having at least two isocyanate groups; alternatively, a cycloaliphatic isocyanate having at least two isocyanate group; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition and an isocyanate composition.

In embodiments, the polythiourethane can be described as the reaction product of a hydroxy thiol ester composition and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a hydroxy thiol ester composition and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a hydroxy thiol ester composition and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a hydroxy thiol ester composition and an isocyanate composition.

In embodiments, the polythiourethane can be described as the reaction product of a crosslinked thiol ester composition and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a crosslinked thiol ester composition and isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a crosslinked thiol ester composition and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a crosslinked thiol ester composition and an isocyanate composition.

In embodiments, the polythiourethane can be described as the reaction product of a thiol ester composition comprising a mercaptanized unsaturated ester and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a mercaptanized unsaturated ester and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a mercaptanized unsaturated ester and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a mercaptanized unsaturated ester and an isocyanate composition.

In embodiments, the polythiourethane can be described as the reaction product of a thiol ester composition comprising a mercaptanized epoxidized ester and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a mercaptanized epoxidized ester and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a mercaptanized epoxidized ester and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a mercaptanized epoxidized ester and an isocyanate composition.

In embodiments, the polythiourethane can be described as the reaction product of a thiol ester composition comprising a crosslinked mercaptanized unsaturated ester and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a crosslinked mercaptanized unsaturated ester and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a crosslinked mercaptanized unsaturated ester and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a crosslinked mercaptanized unsaturated ester and an isocyanate composition.

In embodiments, the polythiourethane can be described as the reaction product of a thiol ester composition comprising mercaptanized natural source oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a mercaptanized natural source oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a mercaptanized natural source oil and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a mercaptanized natural source oil and an isocyanate composition.

In embodiments, the polythiourethane can be described as the reaction product of a thiol ester composition comprising a mercaptanized epoxidized natural source oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a mercaptanized epoxidized natural source oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a mercaptanized epoxidized natural source oil and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a mercaptanized epoxidized natural source oil and an isocyanate composition.

In embodiments, the polythiourethane can be described as the reaction product of a thiol ester composition comprising a crosslinked mercaptanized natural source oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a crosslinked mercaptanized natural source oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a crosslinked mercaptanized natural source oil and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a crosslinked mercaptanized natural source oil and an isocyanate composition.

In embodiments, the polythiourethane can be described as the reaction product of a thiol ester composition comprising a mercaptanized soybean oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a mercaptanized soybean oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a mercaptanized soybean oil and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a mercaptanized soybean oil and an isocyanate composition.

In embodiments, the polythiourethane can be described as the reaction product of a thiol ester composition comprising a mercaptanized castor oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a mercaptanized castor oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a mercaptanized castor oil and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a mercaptanized castor oil and an isocyanate composition.

In embodiments, the polythiourethane can be described as the reaction product of a thiol ester composition comprising a mercaptanized epoxidized soybean oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a mercaptanized epoxidized soybean oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a mercaptanized epoxidized soybean oil and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a mercaptanized epoxidized soybean oil and an isocyanate composition.

In embodiments, the polythiourethane can be described as the reaction product of a thiol ester composition comprising a crosslinked mercaptanized soybean oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be described as the reaction product of a thiol ester composition comprising a crosslinked mercaptanized soybean oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a crosslinked mercaptanized soybean oil and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition comprising a crosslinked mercaptanized soybean oil and an isocyanate composition.

In embodiments, the polythiourethanes of the present invention can be described as a product produced by any process described herein capable of producing the polythiourethane composition and can be further described as being produced using any embodiments of the processes described herein.

In embodiments, the polythiourethane of the present invention can be further described by its properties. In some embodiments, the polythiourethane described as the reaction product of a thiol ester composition and an isocyanate composition can have a glass transition temperature ranging from −100° C. to 250° C. In other embodiments, the polythiourethane of the present invention has a glass transition temperature ranging from −50° C. to 150° C.; or alternatively, ranging from −50° C. to 100° C.

In embodiments, the reaction product of a thiol ester composition comprising a mercaptanized natural source oil and an isocyanate composition comprising an isocyanate having at least two isocyanate groups can have a glass transition temperature ranging from −50° C. to 100° C. In some embodiments, the reaction product of a thiol ester composition comprising a mercaptanized soybean oil and an isocyanate composition comprising an aliphatic isocyanate having at least two isocyanate groups can have a glass transition temperature ranging from −50° C. to 0° C.; alternatively, ranging from 0° C. and 50° C.; or alternatively, ranging from 50° C. to 100° C. In an aspect, the isocyanate composition comprising an aliphatic isocyanate having at least two isocyanate groups comprises hexamethylene diisocyanate.

In embodiments, the reaction product of a thiol ester composition comprising a mercaptanized soybean oil and an isocyanate composition comprising a cycloaliphatic isocyanate having at least two isocyanate groups can have a glass transition temperature ranging from −50° C. to 100° C. In some embodiments, the reaction product of a thiol ester composition comprising a mercaptanized soybean oil and an isocyanate composition comprising a cycloaliphatic isocyanate having at least two isocyanate groups can have a glass transition temperature ranging from ranging from −50° C. to 80° C.; or alternatively, ranging from −30° C. to 60° C. In an aspect, the isocyanate composition comprising a cycloaliphatic isocyanate having at least two isocyanate groups comprises 4,4'-dicyclohexylmethane diisocyanate, isophorone diisocyanate, or mixtures thereof; alternatively, 4,4'-dicyclohexylmethane diisocyanate; or alternatively, isophorone diisocyanate.

In embodiments, the reaction product of a thiol ester composition comprising a mercaptanized soybean oil and an isocyanate composition comprising an aromatic isocyanate having at least two isocyanate groups can have a glass transition temperature ranging from −50° C. to 100° C. In some embodiments, the reaction product of a thiol ester composition comprising a mercaptanized soybean oil and an isocyanate composition comprising an aromatic isocyanate having at least two isocyanate groups can have a glass transition temperature ranging from −30° C. to 90° C.; alternatively, ranging from −30° C. to 20° C.; or alternatively, ranging from 20° C. to 90° C. In an aspect, the isocyanate composition comprising an aromatic isocyanate having at least two isocyanate groups can comprise 2,4-tolylene diisocyanate, polymeric 4,4'-diphenylmethane diisocyanate, or mixtures thereof; alternatively, 2,4-tolylene diisocyanate; or alternatively, polymeric 4,4'-diphenylmethane diisocyanate.

In embodiments, the reaction product of a thiol ester composition comprising a mercaptanized epoxidized source oil and an isocyanate composition comprising an isocyanate having at least two isocyanate groups can have a glass transition temperature ranging from −50° C. to 150° C.; alternatively, ranging from 0° C. to 150° C.; or alternatively, ranging from 30° C. to 120° C. In some embodiments, the reaction product of a thiol ester composition comprising a mercaptanized epoxidized soybean oil and an isocyanate composition comprising an aliphatic isocyanate having at least two isocyanate groups can have a glass transition temperature ranging from 0° C. to 100° C.; alternatively, ranging from 20° C. to 90° C.; or alternatively, ranging from 30° C. to 80° C. In an aspect, the isocyanate composition comprising an aliphatic isocyanate having at least two isocyanate groups comprises hexamethylene diisocyanate.

In embodiments, the reaction product of a thiol ester composition comprising a mercaptanized epoxidized soybean oil and an isocyanate composition comprising a cycloaliphatic isocyanate having at least two isocyanate groups can have a glass transition temperature ranging from −50° C. to 150° C. In some embodiments, the reaction product of a thiol ester composition comprising a mercaptanized epoxidized soybean oil and an isocyanate composition comprising a cycloaliphatic isocyanate having at least two isocyanate groups can have a glass transition temperature ranging from 0° C. to 120° C.; alternatively, ranging from 20° C. to 100° C.; or alternatively, ranging from 30° C. to 90° C. In an aspect, the isocyanate composition comprising a cycloaliphatic isocyanate having at least two isocyanate groups comprises 4,4'-dicyclohexylmethane diisocyanate, isophorone diisocyanate, or mixtures thereof; alternatively, 4,4'-dicyclohexylmethane diisocyanate; or alternatively, isophorone diisocyanate.

In embodiments, the reaction product of a thiol ester composition comprising a mercaptanized epoxidized soybean oil and an isocyanate composition comprising an aromatic isocyanate having at least two isocyanate groups can have a glass transition temperature ranging from −50° C. to 150° C. In some embodiments, the reaction product of a thiol ester composition comprising a mercaptanized epoxidized soybean oil and an isocyanate composition comprising an aromatic isocyanate having at least two isocyanate groups can have a glass transition temperature ranging from 0° C. to 140° C.; alternatively, ranging from 20° C. to 130° C.; alternatively, ranging from 30° C. to 70° C.; alternatively, ranging from 70° C. to 100° C.; or alternatively, ranging from 100° C. to 130° C. In an aspect, the isocyanate composition comprising an aromatic isocyanate having at least two isocyanate groups can comprise 2,4-tolylene diisocyanate, polymeric 4,4'-diphenylmethane diisocyanate, or mixtures thereof; alternatively, 2,4-tolylene diisocyanate; or alternatively, polymeric 4,4'-diphenylmethane diisocyanate.

In embodiments, the reaction product of a thiol ester composition comprising a crosslinked mercaptanized natural source oil and an isocyanate composition comprising an isocyanate having at least two isocyanate groups can have a glass transition temperature ranging from −50° C. to 100° C. In some embodiments, the reaction product of a thiol ester composition comprising a crosslinked mercaptanized soybean oil and an isocyanate composition comprising an aliphatic isocyanate having at least two isocyanate groups can have a glass transition temperature ranging from −50° C. to 100° C.; alternatively, ranging from −50° C. to 50° C.; alternatively, ranging from −50° C. to 0° C. or alternatively, ranging from 0° C. to 50° C. In an aspect, the isocyanate composition comprising an aliphatic isocyanate having at least two isocyanate groups comprises hexamethylene diisocyanate.

In embodiments, the reaction product of a thiol ester composition comprising a crosslinked mercaptanized soybean oil and an isocyanate composition comprising a cycloaliphatic isocyanate having at least two isocyanate groups can have a glass transition temperature ranging from −50° C. to 100° C. In some embodiments, the reaction product of a thiol ester composition comprising a crosslinked mercaptanized soybean oil and an isocyanate composition comprising a cycloaliphatic isocyanate having at least two isocyanate groups can have a glass transition temperature ranging from ranging from −40° C. to 80° C.; alternatively, ranging from −30° C. to 60° C.; alternatively, ranging from −30° C. to 0° C.; alternatively, ranging from 0° C. to 30° C.; or alternatively, ranging from 30° C. to 60° C. In an aspect, the isocyanate composition comprising a cycloaliphatic isocyanate having at least two isocyanate groups comprises 4,4'-dicyclohexylmethane diisocyanate, isophorone diisocyanate, or mixtures thereof; alternatively, 4,4'-dicyclohexylmethane diisocyanate; or alternatively, isophorone diisocyanate.

In embodiments, the reaction product of a thiol ester composition comprising a crosslinked mercaptanized soybean oil and an isocyanate composition comprising an aromatic isocyanate having at least two isocyanate groups can have a glass transition temperature ranging from −50° C. to 120° C. In some embodiments, the reaction product of a thiol ester composition comprising a crosslinked mercaptanized soybean oil and an isocyanate composition comprising an aromatic isocyanate having at least two isocyanate groups can have a glass transition temperature ranging from −40° C. to 100° C.; alternatively, ranging from −30° C. to 0° C.; alternatively, ranging from 0° C. to 60° C.; or alternatively, ranging from 60° C. to 100° C. In an aspect, the isocyanate composition comprising an aromatic isocyanate having at least two isocyanate groups can comprise 2,4-tolylene diisocyanate, polymeric 4,4'-diphenylmethane diisocyanate, or mixtures thereof; alternatively, 2,4-tolylene diisocyanate; or alternatively, polymeric 4,4'-diphenylmethane diisocyanate.

In an aspect the polythiourethanes of the present invention can have other desirable properties. For example, the polythiourethanes of the present invention can have desirable Young's modulus and elongations at break, which can be measured using ASTM D638-03. In embodiments, the polythiourethanes can have a Young's modulus greater than 0.1 MPa; or alternatively, ranging from 0.1 MPa to 7,000 MPa. In some embodiments, the polythiourethanes have a Young's modulus ranging from 2 to 6 Mpa; alternatively, from 6 MPa to 60 MPa; alternatively, 60 MPa to 600 MPa; or alternatively, from 600 MPa to 4,500 MPa. In an aspect, the polythiourethanes can have an elongation at break less than 100 percent; or alternatively, greater than 100 percent. In embodiments, the polythiourethanes can have an elongation at break less than 10 percent; or alternatively, ranging from 10 percent to 100 percent. In embodiments, the polythiourethanes can have any combination of the Young's modulus described herein and the elongation at break as described herein.

Process of Making the Polythiourethane Polymer Composition

In an aspect, a method of making the polythiourethane composition of the present invention comprises contacting a thiol ester composition and an isocyanate composition. In an embodiment of the present invention, the method of producing the polythiourethane composition comprises contacting the thiol ester composition and the isocyanate composition to produce a mixture and curing the mixture to produce the polythiourethane polymer.

Generally, the thiol ester composition utilized to form the mixture can be any thiol ester composition described herein. In embodiments, the thiol ester composition can comprise the hydroxy thiol ester (hydroxy thiol ester composition); alternatively, the crosslinked thiol ester (crosslinked thiol ester composition); alternatively, the mercaptanized unsaturated ester (mercaptanized unsaturated ester composition); alternatively, the mercaptanized epoxidized ester (mercaptanized epoxidized ester composition); or alternatively, the crosslinked mercaptanized unsaturated ester (crosslinked mercaptanized unsaturated ester composition). In non-limiting embodiments, the thiol ester composition can comprise a mercaptanized natural source oil; alternatively, a mercaptanized epoxidized natural source oil; alternatively, a crosslinked mercaptanized natural source oil; or alternatively, a crosslinked mercaptanized epoxidized natural source oil. In further non-limiting embodiments, the thiol ester composition can comprise a mercaptanized soybean oil; alternatively, a mercaptanized castor oil; alternatively, a mercaptanized epoxidized soybean oil; or alternatively, a crosslinked mercaptanized soybean oil. Other thiol ester compositions are described herein and can generally be utilized to form the mixture comprising the thiol ester composition and the isocyanate composition. Additionally, other aspects of the thiol ester materials (e.g. average number of thiol groups per thiol ester molecule, thiol sulfur content etc. . . . ) are described herein and can be utilized to further describe the thiol ester compositions. Besides the thiol ester compositions described herein, other suitable thiol ester compositions will be apparent to those persons having ordinary skill in the art, can be used, and are to be considered within the scope of the present invention.

Generally, the isocyanate composition utilized to form the mixture can comprise, singly or in any combination, any isocyanate described herein. In an embodiment, the isocyanate composition can comprise aliphatic isocyanates, cycloaliphatic isocyanates, aromatic isocyanates, or mixtures thereof In some embodiments, the isocyanate composition can comprise an aliphatic isocyanate; alternatively, a cycloaliphatic isocyanate; or alternatively, an aromatic isocyanate composition. Other isocyanate compositions are described herein and can generally be utilized to form the mixture comprising the thiol ester composition and the isocyanate composition. Additionally, other aspects of the isocyanate materials (e.g. number or average number of isocyanate groups per isocyanate molecule etc. . . . ) are described herein and can be utilized to further describe the isocyanate compositions.

Generally, the thiol ester composition and the isocyanate ester composition are independent elements of the mixture comprising a thiol ester composition and an isocyanate composition. Therefore, the mixture comprising a thiol ester composition and an isocyanate composition can comprise any thiol ester composition described herein and any isocyanate composition described herein. In embodiments, the mixture can comprise a thiol ester composition and an isocyanate composition comprising an isocyanate having at least two isocyanate groups. In embodiments, the mixture can comprise a thiol ester composition and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the mixture can comprise a thiol ester composition and an isocyanate composition comprising an aliphatic isocyanate having at least two isocyanate groups; alternatively, a cycloaliphatic isocyanate having at least two isocyanate group; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition and an isocyanate composition. Additionally, other aspects of the isocyanate materials (e.g. number or average number of isocyanate groups per isocyanate molecule, etc. . . . ) are described herein and can be utilized to further describe the isocyanate composition utilized in describing the polythiourethane as a reaction product of a thiol ester composition and an isocyanate composition.

In embodiments, the polythiourethane can be produced by forming a mixture comprising a hydroxy thiol ester composition and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a hydroxy thiol ester composition and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions utilized in forming the mixture comprising the hydroxy thiol ester composition and the isocyanate composition. Additionally, other aspects of the isocyanate materials (e.g. number or average number of isocyanate groups per isocyanate molecule, etc. . . . ) are described herein and can be utilized to further describe the isocyanate composition utilized in forming the mixture comprising the hydroxy thiol ester composition and the isocyanate composition.

In embodiments, the polythiourethane can be produced by forming a mixture comprising a crosslinked thiol ester composition and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a crosslinked thiol ester composition and isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the crosslinked thiol ester composition and the isocyanate composition. Additionally, other aspects of the isocyanate materials (e.g. number or average number of isocyanate groups per isocyanate molecule, etc. . . . ) are described herein and can be utilized to further describe the isocyanate composition utilized in forming the mixture comprising the crosslinked thiol ester composition and the isocyanate composition.

In embodiments, the polythiourethane can be produced by forming a mixture comprising a thiol ester composition comprising a mercaptanized unsaturated ester and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a mercaptanized unsaturated ester and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a mercaptanized unsaturated ester and the isocyanate composition. Additionally, other aspects of the isocyanate materials (e.g. number or average number of isocyanate groups per isocyanate molecule, etc. . . . ) are described herein and can be utilized to further describe the isocyanate composition utilized in forming the mixture comprising the thiol ester composition comprising a mercaptanized unsaturated ester and the isocyanate composition.

In embodiments, the polythiourethane can be produced by forming a mixture comprising a thiol ester composition comprising a mercaptanized epoxidized ester and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a mercaptanized epoxidized ester and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a mercaptanized epoxidized ester and the isocyanate composition. Additionally, other aspects of the isocyanate materials (e.g. number or average number of isocyanate groups per isocyanate molecule, etc. . . . ) are described herein and can be utilized to further describe the isocyanate composition utilized in forming the mixture comprising the thiol ester composition comprising a mercaptanized epoxidized ester and the isocyanate composition.

In embodiments, the polythiourethane can be produced by forming a mixture comprising a thiol ester composition comprising a crosslinked mercaptanized unsaturated ester and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a crosslinked mercaptanized unsaturated ester and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a crosslinked mercaptanized unsaturated ester and the isocyanate composition. Additionally, other aspects of the isocyanate materials (e.g. number or average number of isocyanate groups per isocyanate molecule, etc. . . . ) are described herein and can be utilized to further describe the isocyanate composition utilized in forming the mixture comprising the thiol ester composition comprising a crosslinked mercaptanized unsaturated ester and the isocyanate composition.

In embodiments, the polythiourethane can be produced by forming a mixture comprising a thiol ester composition comprising mercaptanized natural source oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a mercaptanized natural source oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a mercaptanized natural source oil and the isocyanate composition. Additionally, other aspects of the isocyanate materials (e.g. number or average number of isocyanate groups per isocyanate molecule, etc....) are described herein and can be utilized to further describe the isocyanate composition utilized in forming the mixture comprising the thiol ester composition comprising a mercaptanized natural source oil and the isocyanate composition.

In embodiments, the polythiourethane can be produced by forming a mixture comprising a thiol ester composition comprising a mercaptanized epoxidized natural source oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a mercaptanized epoxidized natural source oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a mercaptanized epoxidized natural source oil and the isocyanate composition. Additionally, other aspects of the isocyanate materials (e.g. number or average number of isocyanate groups per isocyanate molecule, etc....) are described herein and can be utilized to further describe the isocyanate composition utilized in forming the mixture comprising the thiol ester composition comprising a mercaptanized epoxidized natural source oil and the isocyanate composition.

In embodiments, the polythiourethane can be produced by forming a mixture comprising a thiol ester composition comprising a crosslinked mercaptanized natural source oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a crosslinked mercaptanized natural source oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in the isocyanate compositions describing the polythiourethane as a reaction product of a thiol ester composition comprising a crosslinked mercaptanized natural source oil and an isocyanate composition. Additionally, other aspects of the isocyanate materials (e.g. number or average number of isocyanate groups per isocyanate molecule, etc....) are described herein and can be utilized to further describe the isocyanate composition utilized in describing the polythiourethane as a reaction product of a thiol ester composition comprising a crosslinked mercaptanized natural source oil and an isocyanate composition.

In embodiments, the polythiourethane can be produced by forming a mixture comprising a thiol ester composition comprising a mercaptanized soybean oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a mercaptanized soybean oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a mercaptanized soybean oil and the isocyanate composition. Additionally, other aspects of the isocyanate materials (e.g. number or average number of isocyanate groups per isocyanate molecule, etc....) are described herein and can be utilized to further describe the isocyanate composition utilized in forming the mixture comprising the thiol ester composition comprising a mercaptanized soybean oil and the isocyanate composition.

In embodiments, the polythiourethane can be produced by forming a mixture comprising a thiol ester composition comprising a mercaptanized castor oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a mercaptanized castor oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a mercaptanized castor oil and the isocyanate composition. Additionally, other aspects of the isocyanate materials (e.g. number or average number of isocyanate groups per isocyanate molecule, etc....) are described herein and can be utilized to further describe the isocyanate composition utilized in forming the mixture comprising the thiol ester composition comprising a mercaptanized castor oil and the isocyanate composition.

In embodiments, the polythiourethane can be produced by forming a mixture comprising a thiol ester composition comprising a mercaptanized epoxidized soybean oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a mercaptanized epoxidized soybean oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a mercaptanized epoxidized soybean oil and the isocyanate composition. Additionally, other aspects of the isocyanate materials (e.g. number or average number of isocyanate groups per isocyanate molecule, etc. . . . ) are described herein and can be utilized to further describe the isocyanate composition utilized in forming the mixture comprising the thiol ester composition comprising a mercaptanized epoxidized soybean oil and the isocyanate composition.

In embodiments, the polythiourethane can be produced by forming a mixture comprising a thiol ester composition comprising a crosslinked mercaptanized soybean oil and an isocyanate composition comprising an aliphatic isocyanate having at least two isocyanate groups, a cycloaliphatic isocyanate having at least two isocyanate groups, an aromatic isocyanate having at least two isocyanate groups, or mixtures thereof. In some embodiments, the polythiourethane can be produced by forming a mixture comprising a thiol ester composition comprising a crosslinked mercaptanized soybean oil and an isocyanate composition comprising an aliphatic isocyanate having at least two isocyanate groups; alternatively, a cycloaliphatic isocyanate having at least two isocyanate groups; or alternatively, an aromatic isocyanate having at least two isocyanate groups. Particular aliphatic, cycloaliphatic, and aromatic isocyanates having at least two isocyanate groups are described herein and can generally be utilized in forming the mixture comprising the thiol ester composition comprising a crosslinked mercaptanized soybean oil and the isocyanate composition. Additionally, other aspects of the isocyanate materials (e.g. number or average number of isocyanate groups per isocyanate molecule, etc. . . . ) are described herein and can be utilized to further describe the isocyanate composition utilized in forming the mixture comprising the thiol ester composition comprising a crosslinked mercaptanized soybean oil and the isocyanate composition.

Generally, the thiol ester composition and the isocyanate composition can be combined in any functional group equivalent ratio that can produce a polythiourethane. The functional group equivalent ratio relates the ratio of the number of functional groups in the thiol ester composition capable of reacting with an isocyanate of the isocyanate composition to form a thiourethane group to the number of isocyanate groups in the isocyanate composition. Generally, the functional group equivalent ratio is provided by the term "XH:NCO equivalent ratio" where XH represents the equivalents of thiol groups and the alcohol groups present in the thiol ester composition and NCO represent the equivalents of isocyanate groups present in the isocyanate composition. One skilled in the art will recognize which thiol ester composition comprises only thiol groups and which thiol ester composition comprises thiol groups and alcohol groups. In embodiments, the functional group equivalent ratio (XH:NCO) can be at least 0.5. In some embodiments, the XH:NCO equivalent ratio can range from 0.50 to 1.3; or alternatively, from 0.75 to 1.3. In some embodiments, the XH:NCO equivalent ratio can range from 0.75 to 0.95; alternatively, from 0.95 to 1.1; or alternatively, from 1.1 to 1.3.

In an aspect, the method of making the polythiourethane polymer further comprises curing the mixture at a temperature ranging from 0° C. to 120° C. In embodiments; the mixture is cured at a temperature ranging from 10° C. to 30° C.; alternatively, ranging from 50° C. to 80° C.; alternatively, at ambient temperature (room temperature); alternatively, at 65° C.; or alternatively, at 120° C. In some embodiments, the mixture was cured at ambient temperature for a time ranging from one to 8 hours; alternatively, the mixture can be cured at 65° C. for a time ranging from 10 to 18 hours; or alternatively, the mixture can be cured at 120° C. for 3 hours. In other embodiments, the mixture can be cured at about ambient temperature for a time ranging from one to 8 hours and then cured at 65° C. for a time ranging from 10 to 18 hours; alternatively, the mixture can be cured at 65° C. for a time ranging from 10 to 18 hours and then cured at 95° C. for 24 hours; or alternatively, the mixture can be cured at 120° C. for 3 hours and then cured at 95° C. for 24 hours.

In an aspect, the mixture further comprises a catalyst. In embodiments, the catalyst can be contacted with the mixture comprising the thiol ester composition and the isocyanate composition. In other embodiments, the catalyst can be combined with the thiol ester composition prior to contacting the thiol ester composition with the isocyanate composition; or alternatively, combined with isocyanate composition prior to contacting the isocyanate composition with the thiol ester composition.

In embodiments, the catalyst can be selected from the group consisting of a tertiary amine, an organo-tin compound, an amine initiated polypropylene glycol, and combinations thereof. In some embodiments the catalyst can be an amine. In other embodiments, the catalyst can be a tin compound. In some embodiments, the catalyst is a primary amine; alternatively, a secondary amine; or alternatively, a tertiary amine. In other embodiments the catalyst can be aliphatic amine; or alternatively, an aromatic amine. In other embodiments, the catalyst can be a polyetheramine; alternatively, a polyalkylene amine; or alternatively, a tertiary amine polyol (e.g. Jeffol® A-480). In yet other embodiments, the amine catalyst can be a polyamine comprising at least two amine groups. In some amine catalyst embodiment, the catalyst can be 1,8-diazabicyclo[5,4,0]undec–7-ene [DBU -CAS# 6674-22-2]; alternatively, 1,4-diazabicyclo[2.2.2]octane [DABCO-CAS# 280-57-9]); or alternatively, triethylamine. In a tin compound catalyst embodiment, the tin compound can be dibutyl tin dilaurate.

Generally, the catalyst is utilized when the mixture comprising the thiol ester composition and the isocyanate does not cure under the desired conditions. In embodiments, the catalyst can comprise less than 10 weight percent of the mixture. In other embodiments, the catalyst comprises from 0.01% to 9.0% by weight of the mixture; alternatively, from 0.1% to 7.0% by weight of the mixture; or alternatively, from 0.5% to 3.0% by weight of the mixture.

In aspects, the polythiourethane product produced by the process described herein can be further described by the properties of the polythiourethane products described herein.

FEEDSTOCKS

Thiol Ester Composition

The thiol ester composition used as a feedstock to produce the polymers described herein can be described using a number of different methods. Functionally, the thiol ester can be described by the type of functional groups present in the thiol ester. In this functional description, the thiol ester composition minimally contains molecules having at least one ester group and at least one thiol group. In other embodiments, the thiol ester composition can include thiol esters with and without additional groups, such as hydroxy groups, and/or polysulfide linkages —$S_x$— wherein x is an integer greater than 1. When the thiol ester contains the hydroxy group, the thiol ester is referred to as a hydroxy thiol ester. When the thiol ester has a polysulfide linkages —$S_x$— wherein x is an integer greater than 1, the thiol ester can be referred to as a crosslinked thiol ester. When the thiol ester has a hydroxy group and a polysulfide group —$S_x$— wherein x is an integer greater than 1, the thiol ester can be referred to as crosslinked hydroxy thiol ester.

Alternatively, the thiol ester can be described using a name that indicates the method by which it was formed. For example, a thiol ester referred to as a mercaptanized unsaturated ester refers to a thiol ester produced by reacting hydrogen sulfide with an unsaturated ester. The mercaptanized unsaturated ester can be further described utilizing the functional descriptors of the thiol esters present in the mercaptanized unsaturated ester. For example, in two non-limiting examples, a mercaptanized soybean oil can be further described by a combination of the number of ester groups and the number of thiol groups among others thiol ester aspects present in the mercaptanized soybean oil, while a mercaptanized castor oil can be further described by a combination of the number of ester groups, number of thiol groups, the number of hydroxy groups, among other thiol ester aspects present in the mercaptanized castor oil.

In an aspect, the thiol ester composition of the present invention can be produced by reacting any unsaturated ester with hydrogen sulfide, as described in U.S. patent application Ser. Nos. 11/060,675; 11/060,696; 11/059,792; and 11/059,647 (hereinafter "the '675 Applications"), the disclosure of which is incorporated by reference in its entirety. When the thiol ester composition is produced by reacting an unsaturated ester with hydrogen sulfide, the material produced can be referred to as the mercaptanized unsaturated ester. Because the unsaturated esters can contain multiple carbon-carbon double bonds per unsaturated ester molecule, carbon-carbon double bond reactivity and statistical probability dictate that each thiol ester molecule of the feedstock thiol ester composition produced from the unsaturated ester composition will not have the same number of thiol groups, number of unreacted carbon-carbon double bonds, number of cyclic sulfides, molar ratio of carbon-carbon double bonds to thiol groups, molar ratio of cyclic sulfides to thiol groups, and/or other quantities of functional groups and molar ratios disclosed herein as the unsaturated ester. Additionally, the unsaturated esters can also comprise a mixture of individual unsaturated esters having a different number of carbon-carbon double bonds and/or ester groups. Thus, many of these properties will be described as an average number of the groups per thiol ester molecule within the thiol ester composition or average ratio per thiol ester molecule within the thiol ester composition. In other embodiments, it is desired to control the thiol sulfur content present in the thiol ester. Because it is difficult to ensure that the hydrogen sulfide reacts with every carbon-carbon double bond within the unsaturated ester, certain molecules of thiol ester can have more or less thiol groups than other molecules. Thus, the weight percent of thiol groups is stated as an average across all thiol ester molecules of the thiol ester composition.

When the thiol ester is cross-linked, the thiol ester is referred to as a cross-linked thiol ester or a cross-linked hydroxy thiol ester, depending upon the compositions used to produce the cross-linked thiol ester. Each of these types of thiol ester compositions are described herein. Hydroxy thiol esters, cross-linked hydroxy thiol esters, mercaptanized unsaturated esters, mercaptanized epoxidized esters, cross-linked mercaptanized unsaturated esters, and cross-linked mercaptanized epoxidized esters are all considered to be thiol ester compositions. Many of the same attributes that are used to describe the thiol ester compositions, such as the molar ratios and other independent descriptive elements described herein, are equally applicable to many of the different types of thiol ester compositions described herein.

Generally, the thiol ester compositions can be described as comprising one or more separate or discreet functional groups of the thiol ester molecule and/or thiol ester composition. These independent functional groups can include: the number of (or average number of) ester groups per thiol ester molecule, the number of (or average number of) thiol groups per thiol ester molecule, the number of (or average number of) unreacted carbon-carbon double bonds per thiol ester molecule, the average thiol sulfur content of the thiol ester composition, the percentage (or average percentage) of sulfide linkages per thiol ester molecule, and the percentage (or average percentage) of cyclic sulfide groups per thiol ester molecule. Additionally, the thiol ester compositions can be described using individual or a combination of ratios including the ratio of double bonds to thiol groups, the ratio of cyclic sulfides to mercaptan groups, and the like. As separate elements, these functional groups of the thiol composition will be described separately.

Minimally, the thiol ester contains thiol ester molecules having at least one ester group and one thiol group per thiol ester molecule. In embodiments, the thiol ester can be prepared from unsaturated esters. Therefore, in some embodiments, the thiol ester can contain the same number of ester groups as the unsaturated esters from which they are prepared, as described herein. In an embodiment, the thiol ester molecules can have an average of at least 1.5 ester groups per thiol ester molecule. Alternatively, the thiol ester molecules can have an average of at least 2 ester groups per thiol ester molecule; alternatively, an average of at least 2.5 ester groups per thiol ester molecule; or alternatively, an average of at least 3 ester groups per thiol ester molecule. In other embodiments, the thiol esters can have an average of from 1.5 to 8 ester groups per thiol ester molecule; alternatively, an average of from 2 to 7 ester groups per thiol ester molecule; alternatively, an average of from 2.5 to 5 ester groups per thiol ester molecule; or alternatively, an average of from 3 to 4 ester groups per thiol ester molecule. In yet other embodiments, the thiol ester can comprise an average of about 3 ester groups per thiol ester molecule or alternatively, an average of about 4 ester groups per thiol ester molecule.

Minimally, the thiol ester comprises one or an average of at least one thiol group per thiol ester molecule. In an embodiment, the thiol ester molecules can have an average of at least 1.5 thiol groups per thiol ester molecule; alternatively, an average of at least 2 thiol groups per thiol ester molecule; alternatively, an average of at least 2.5 thiol groups per thiol ester molecule; or alternatively, an average of at least 3 thiol groups per thiol ester molecule. In other embodiments, the thiol ester molecules can have an average of from 1.5 to 9 thiol groups per thiol ester molecule; alternatively, an average of from 3 to 8 thiol groups per thiol ester molecule; alternatively, an average of from 2 to 4 thiol groups per thiol ester molecule; or alternatively, an average of from 4 to 8 thiol groups per thiol ester molecule.

In an aspect, the thiol ester can be described using the number of thiol groups present in the thiol ester. For example, a thiol ester referred to as a trimercaptan thiol ester can be a thiol ester containing an average of between 2.5 to 3.5 thiol groups per thiol ester molecule. Alternatively, the trimercaptan thiol ester can contain an average of between 2.75 to 3.25 thiol groups per thiol ester molecule. As another example, a thiol ester referred to as a dimercaptan thiol ester can be a thiol ester containing an average of between 1.5 to 2.5 thiol groups per thiol ester molecule; or alternatively, between 1.75 and 2.25 thiol groups per thiol ester molecule.

In other embodiments, the thiol ester can be further described by the average amount of thiol sulfur present in the thiol ester. In an embodiment, the thiol ester molecules have an average of at least 5 weight percent thiol sulfur per thiol ester molecule; alternatively, an average of at least 10 weight percent thiol sulfur per thiol ester molecule; or alternatively, an average of greater than 15 weight percent thiol sulfur per thiol ester molecule. In an embodiment, the thiol ester molecules have an average of from 5 to 25 weight percent thiol sulfur per thiol ester molecule; alternatively, an average of from 5 to 20 weight percent thiol sulfur per thiol ester molecule; alternatively, an average of from 6 to 15 weight percent thiol sulfur per thiol ester molecule; or alternatively, an average of from 8 to 10 weight percent thiol sulfur per thiol ester molecule.

Generally, the location of the thiol group of the thiol ester is not particularly important and will be dictated by the method used to produce the thiol ester. In embodiments wherein the thiol ester is produced by contacting an unsaturated ester with hydrogen sulfide (a mercaptanized unsaturated ester), the position of the thiol group will be dictated by the position of the carbon-carbon double bond. When the carbon-carbon double bond is an internal carbon-carbon double bond, the method of producing the thiol ester will result in a secondary thiol group. However, when the double bond is located at a terminal position it is possible to choose reaction conditions to produce a thiol ester comprising either a primary thiol group or a secondary thiol group.

Some methods of producing the thiol ester composition can additionally create sulfur containing functional groups other than a thiol group; For example, in some thiol ester production methods, an introduced thiol group can react with a carbon-carbon double bond within the same unsaturated ester to produce a sulfide linkage. When the reaction is with a double bond of a second unsaturated ester, a simple sulfide linkage is produced. However, in some instances, the second carbon-carbon double bond is located in the same unsaturated ester molecule. When the thiol group reacts with a second carbon-carbon double bond within the same unsaturated ester molecule, a sulfide linkage is produced. In some instances, the carbon-carbon double bond can be within a second ester group of the unsaturated ester molecule. While in other instances, the carbon-carbon double bond can be within the same ester group of the unsaturated ester molecule.

When the thiol group reacts with the carbon-carbon double bond in a second ester group of the same unsaturated ester molecule, the sulfide contains at least one ester group within a ring structure. In some embodiments when the thiol group reacts with the carbon-carbon double bond in a second ester group of the same unsaturated ester molecule, the sulfide contains two ester groups within a ring structure. Within this specification, the first type of sulfide containing an ester group within the ring structure is referred to as a simple sulfide. When the thiol group reacts with the carbon-carbon double bond within the same ester group, the sulfide does not contain an ester group within the ring structure. Within this specification, this second type of sulfide is referred to as a cyclic sulfide. In the cyclic sulfide case, the sulfide linkage produces a cyclic sulfide functionality within a single ester group of the thiol ester. The cyclic sulfide rings that can be produced include a tetrahydrothiopyran ring, a thietane ring, or a thiophane ring (tetrahydrothiophene ring).

In some embodiments, it is desirable to control the average amount of sulfur present as cyclic sulfide in the thiol ester. In an embodiment, the average amount of sulfur present as cyclic sulfide in the thiol ester molecules comprises less than 30 mole percent. Alternatively, the average amount of sulfur present as cyclic sulfide in the thiol esters can comprise less than 20 mole percent; alternatively, less than 10 mole percent; alternatively, less than 5 mole percent; or alternatively, less than 2 mole percent. In other embodiments, it is desirable to control the molar ratio of cyclic sulfides to thiol groups. In an embodiment, the average molar ratio of cyclic sulfide groups to thiol groups per thiol ester can be less than 1.5. Alternatively, the average molar ratio of cyclic sulfide groups to thiol groups per thiol ester can be less than 1; alternatively, less than 0.5; alternatively, less than 0.25; or alternatively, less than 0.1. In some embodiments, the ratio of cyclic sulfide groups to thiol groups per thiol ester can range from 0 to 1; or alternatively, the average molar ratio of cyclic sulfide groups to thiol groups per thiol ester can range between 0.05 and 1.

In some instances it is desirable to have carbon-carbon double bonds present in the thiol ester composition, while in other embodiments it can be desirable to minimize the number of carbon-carbon double bonds present in the thiol ester composition. The presence of carbon-carbon double bonds in the thiol ester can be stated as an average molar ratio of carbon-carbon double bonds to thiol-sulfur. In an embodiment, the average ratio of the remaining unreacted carbon-carbon double bond in the thiol ester composition to thiol sulfur can be less than 1.5 per thiol ester molecule. Alternatively, the average ratio of carbon-carbon double bond to thiol sulfur can be less than 1.2 per thiol ester molecule; alternatively, less than 1.0 per thiol ester molecule; alternatively, less than 0.75 per thiol ester molecule; alternatively, less than 0.5 per thiol ester molecule; alternatively, less than 0.2 per thiol ester molecule; or alternatively, less than 0.1 per thiol ester molecule.

In particular embodiments, the thiol ester is produced from unsaturated ester compositions (a mercaptanized unsaturated ester). Because the unsaturated ester has particular compositions having a certain number of ester groups present, the product thiol ester composition will have about the same number of ester groups per thiol ester molecule as the unsaturated ester. Other, independent thiol ester properties are described herein can be used to further describe the thiol ester composition.

In an aspect, the thiol ester can be referred to as a mercaptanized unsaturated ester. In these embodiments, the unsaturated ester described herein and/or the unsaturated ester functional descriptions described herein can be utilized to further indicate and/or further describe a particular mercaptanized ester. In a few non-limiting examples, the thiol ester produced by contacting a natural source oil with hydrogen sulfide can be referred to as mercaptanized natural source oil, the thiol ester produced by contacting a soybean oil with hydrogen sulfide can be referred to as mercaptanized soybean oil, and the thiol ester produced by contacting a castor oil with hydrogen sulfide can be referred to as mercaptanized castor oil. Additional properties of the unsaturated ester oils described herein can also be utilized to further describe the unsaturated ester oil and the mercaptanized ester oil.

In some embodiments, the thiol ester molecules are produced from unsaturated esters having an average of less than 25 weight percent of side chains having 3 contiguous methylene interrupted carbon-carbon double bonds, as described herein. In some embodiments, greater than 40 percent of the thiol ester molecule total side chains can include sulfur. In some embodiments, greater than 60 percent of the thiol ester molecule total side chains can include sulfur. In other embodiments, greater than 50, 70, or 80 percent of the thiol ester molecule total side chains can include sulfur.

In an embodiment, the thiol ester is a thiol containing natural source oil, as described herein. When the thiol ester is a thiol containing natural source oil, functional groups that are present in the thiol containing natural source oil can be described in a "per thiol ester molecule" basis or in a "per triglyceride" basis. The thiol containing natural source oil can have substantially the same properties as the thiol ester composition, such as the molar ratios and other independent descriptive elements described herein.

The average number of thiol groups per triglyceride in the thiol containing natural source oil is greater than about 1.5. In some embodiments, the average number of thiol groups per triglyceride can range from about 1.5 to about 9.

The mercaptanized unsaturated ester composition can also be described as a product produced by the process comprising contacting hydrogen sulfide and an unsaturated ester composition. In other words, the unsaturated ester composition is mercaptanized to form the mercaptanized unsaturated ester composition. The mercaptanized unsaturated ester composition can also be described using a molecular weight or an average molecular weight of the side chains. All of the attributes used to describe the thiol ester composition can be used to describe the mercaptanized unsaturated ester composition.

Hydroxy Thiol Ester Composition

In an aspect, the thiol ester composition used as a feedstock to produce the polymers described herein can be a hydroxy thiol ester. The hydroxy thiol ester can be described using a number of methods. Functionally, the hydroxy thiol ester can be described by the types of functional groups present in the hydroxy thiol ester. In this functional description, the hydroxy thiol ester composition minimally contains molecules having at least one ester group, at least one thiol group, and at least one hydroxy group. In other embodiments, the thiol ester composition can include thiol esters with and without additional groups, polysulfide linkages —$S_x$— wherein x is an integer greater than 1. When the thiol ester has a hydroxy group and a polysulfide group —$S_x$— wherein x is an integer greater than 1, the thiol ester can be referred to as crosslinked hydroxy thiol ester.

Alternatively, the hydroxy thiol ester can be described using a name that indicates the method by which it was formed. For example, a hydroxy thiol ester that is called a mercaptanized epoxidized ester refers to a hydroxy thiol ester produced by reacting hydrogen sulfide with an epoxidized unsaturated ester. The mercaptanized epoxidized ester can be further described utilizing the function descriptor of the hydroxy thiol ester present in the mercaptanized epoxidized ester. Compounds that fit the hydroxy thiol ester composition description do not always fit the mercaptanized epoxidized ester description. For example, while mercaptanized castor oil can be described using some of the hydroxy thiol ester definitions by virtue of having at least one ester group, at least one thiol group, and at least one hydroxy group. Mercaptanized castor oil, however, is not a mercaptanized epoxidized ester as it is produced by contacting castor oil with hydrogen sulfide. However, mercaptanized epoxidized castor oil is a mercaptanized epoxidized ester oil by virtue of its formation by contacting hydrogen sulfide with epoxidized castor oil.

The feedstock thiol ester compositions can also contain a hydroxy or alcohol group. When the thiol ester composition includes the hydroxy group, the thiol ester composition is referred to herein as the hydroxy thiol ester composition. The quantity or number of alcohol groups present in the hydroxy thiol ester composition can be independent of the quantity of other functional groups present in the hydroxy thiol ester composition (i.e. thiol groups, ester groups, sulfides, cyclic sulfides). Additionally, the weight percent of thiol sulfur and functional group ratios (i.e. molar ratio of cyclic sulfides to thiol groups, molar ratio of epoxide groups to thiol groups, molar ratio of epoxide groups to α-hydroxy thiol groups and other disclosed quantities of functional groups and their molar ratios to the thiol groups) are separate or discreet elements that can be used to describe the hydroxy thiol ester composition. The hydroxy thiol ester composition can be described using any combination of the hydroxy thiol ester composition separate functional groups or ratios described herein.

In an embodiment, the hydroxy thiol ester composition can be produced by reacting hydrogen sulfide with an epoxidized unsaturated ester composition as described in the '675 Applications. When the thiol ester composition is produced by reacting hydrogen sulfide with an epoxidized unsaturated ester, the material produced can be called a mercaptanized epoxidized ester. Because the epoxidized unsaturated ester can contain multiple epoxide groups, epoxide group reactivity and statistical probability dictate that not all hydroxy thiol ester molecules of the hydroxy thiol ester composition will have the same number of hydroxy groups, thiol groups, α-hydroxy thiol groups, sulfides, cyclic sulfides, molar ratio of cyclic sulfides to thiol groups, molar ratio of epoxide groups to thiol groups, molar ratio of epoxide groups to α-hydroxy thiol groups, weight percent thiol sulfur, and/or other disclosed quantities of functional groups and their molar ratios as the epoxidized unsaturated ester composition. Thus, many of these properties will be discussed as an average number or ratio per hydroxy thiol ester molecule. In other embodiments, it is desired to control the content of thiol sulfur present in the hydroxy thiol ester. Because it is difficult to ensure that the hydrogen sulfide reacts with every epoxide group within the epoxidized unsaturated ester, certain hydroxy thiol ester molecules can have more or less thiol groups than other molecules within the hydroxy thiol ester composition. Thus, the weight percent of thiol groups can be stated as an average weight percent across all hydroxy thiol ester molecules.

As an embodiment of the present invention, the hydroxy thiol ester composition includes hydroxy thiol ester molecules that have an average of at least 1 ester group and an average of at least 1 α-hydroxy thiol group per hydroxy thiol ester molecule. As an embodiment of the present invention, the hydroxy thiol ester composition includes hydroxy thiol ester molecules that have an average of at least 1.5 ester groups and an average of at least 1.5 α-hydroxy thiol groups per hydroxy thiol ester molecule.

Alternatively, in some embodiments, the hydroxy thiol ester comprises at least one ester, at least one thiol group, and at least one hydroxy group. Thus, in some embodiments, the hydroxy thiol ester composition includes hydroxy thiol ester molecules that have an average of at least 1.5 ester groups, an average of at least one thiol group, and an average of at least 1.5 hydroxy groups per hydroxy thiol molecule.

In embodiments the hydroxy thiol ester can be prepared from the epoxidized unsaturated ester or the unsaturated ester. Thus, the hydroxy thiol ester can contain the same number of ester groups as the epoxidized unsaturated ester or unsaturated ester. In an embodiment, the hydroxy thiol ester molecules have an average of at least 1.5 ester groups per hydroxy thiol ester molecule. Alternatively, the hydroxy thiol ester molecules have an average of at least 2 ester groups per hydroxy thiol ester molecule; alternatively, an average of at least 2.5 ester groups per hydroxy thiol ester molecule; or alternatively, an average of at least 3 ester groups per hydroxy thiol ester molecule. In other embodiments, the hydroxy thiol esters have an average of from 1.5 to 8 ester groups per hydroxy thiol ester molecule; alternatively, an average of from 2 to 7 ester groups per hydroxy thiol ester molecule; alternatively, an average of from 2.5 to 5 ester groups per hydroxy thiol ester molecule; or alternatively, an average of from 3 to 4 ester groups per hydroxy thiol ester molecule. In yet other embodiments, the α-hydroxy thiol ester comprises an average of 3 ester groups per hydroxy thiol ester molecule; or alternatively, an average of 4 ester groups per hydroxy thiol ester molecule.

In some embodiments, the hydroxy group and the thiol group are combined in the same group (e.g. when the hydroxy thiol ester is produced from the epoxidized unsaturated ester), the group can be referred to as an α-hydroxy thiol group. In other embodiments, the thiol group and the hydroxy or alcohol group are not in the same group. In this instance, the presence of the alcohol group is not dependent upon the formation of the thiol group. For example, as another embodiment of the present invention, the hydroxy thiol ester composition includes hydroxy thiol ester molecules. The hydroxy thiol ester molecules have an average of at least 1.5 ester groups, an average of at least 1.5 thiol groups, and an average of at least 1.5 alcohol groups per hydroxy thiol ester molecule.

Minimally, in some embodiments, the hydroxy thiol ester comprises at least one thiol group per hydroxy thiol ester molecule. In an embodiment, the hydroxy thiol ester molecules can have an average of at least 1.5 thiol groups per hydroxy thiol ester molecule; alternatively, an average of at least 2 thiol groups per hydroxy thiol ester molecule; alternatively, an average of at least 2.5 thiol groups per hydroxy thiol ester molecule; or alternatively, an average of at least 3 thiol groups per hydroxy thiol ester molecule. In other embodiments, the hydroxy thiol ester molecules can have an average of from 1.5 to 9 thiol groups per hydroxy thiol ester molecule; alternatively, an average of from 3 to 8 thiol groups per hydroxy thiol ester molecule; alternatively, an average of from 2 to 4 thiol groups per hydroxy thiol ester molecule; or alternatively, an average of from 4 to 8 thiol groups per hydroxy thiol ester.

Minimally, in some embodiments, the hydroxy thiol ester composition comprises an average of at least 1 hydroxy or alcohol group per hydroxy thiol ester molecule. In some embodiments, the hydroxy thiol ester composition can have an average of at least 1.5 hydroxy groups per hydroxy thiol ester molecule; alternatively, an average of at least 2 hydroxy groups per hydroxy thiol ester molecule; alternatively, an average of at least 2.5 hydroxy groups per hydroxy thiol ester molecule; or alternatively, an average of at least 3 hydroxy groups per hydroxy thiol ester molecule. In other embodiments, the thiol ester composition can have an average of from 1.5 to 9 hydroxy groups per hydroxy thiol ester molecule; alternatively, an average of from 3 to 8 hydroxy groups per hydroxy thiol ester molecule; alternatively, an average of from 2 to 4 hydroxy groups per hydroxy thiol ester molecule; or alternatively, an average of from 4 to 8 hydroxy groups per hydroxy thiol ester molecule.

In yet other embodiments, the number of hydroxy groups can be stated as an average molar ratio of hydroxy groups to thiol groups. Minimally, in some embodiments, the molar ratio of hydroxy groups to thiol groups can be at least 0.25. In some embodiments, the molar ratio of hydroxy groups to thiol groups can be at least 0.5; alternatively, at least 0.75; alternatively, at least 1.0; alternatively, at least 1.25; or alternatively, at least 1.5. In other embodiments, the molar ratio of hydroxy groups to thiol groups can range from 0.25 to 2.0; alternatively, from 0.5 to 1.5; or alternatively, from 0.75 to 1.25.

In embodiments where the hydroxy thiol esters are produced from an epoxidized unsaturated ester, the hydroxy thiol esters can be described as containing ester groups and α-hydroxy thiol groups. In this case, the hydroxy thiol esters that contain ester groups and α-hydroxy thiol groups can be referred to as mercaptanized epoxidized esters. The number of ester groups and the number of α-hydroxy thiol groups are independent elements and as such the hydroxy thiol esters can be described as having any combination of ester groups and α-hydroxy thiol groups described herein. Minimally, the hydroxy thiol ester can have an average of at least 1 α-hydroxy thiol group per hydroxy thiol ester molecule. In some embodiments, the hydroxy thiol ester composition can have an average of at least 1.5 α-hydroxy thiol groups per hydroxy thiol ester molecule; alternatively, an average of at least 2 α-hydroxy thiol groups per hydroxy thiol ester molecule; alternatively, an average of at least 2.5 α-hydroxy thiol groups per hydroxy thiol ester molecule; or alternatively, an average of at least 3 α-hydroxy thiol groups per hydroxy thiol ester molecule. In other embodiments, the hydroxy thiol ester composition can have an average of from 1.5 to 9 α-hydroxy thiol groups per hydroxy thiol ester molecule; alternatively, an average of from 3 to 8 α-hydroxy thiol groups per hydroxy thiol ester molecule; alternatively, an average of from 2 to 4 α-hydroxy thiol groups per hydroxy thiol ester molecule; or alternatively, an average of from 4 to 8 α-hydroxy thiol groups per hydroxy thiol ester molecule.

In an aspect, the hydroxy thiol ester can be described using the number of thiol groups or α-hydroxy thiol groups present in the hydroxy thiol ester. For example, a hydroxy thiol ester referred to as a trimercaptan hydroxy thiol ester can be a hydroxy thiol ester containing an average of between 2.5 to 3.5 thiol or α-hydroxy thiol groups per hydroxy thiol ester molecule. Alternatively, the trimercaptan hydroxy thiol ester can contain an average of between 2.75 to 3.25 thiol or α-hydroxy thiol groups per hydroxy thiol ester molecule. As another example, a hydroxy thiol ester referred to as a dimercaptan hydroxy thiol ester can be a hydroxy thiol ester containing an average of between 1.5 to 2.5 thiol or α-hydroxy thiol groups per hydroxy thiol ester molecule; or alternatively, between 1.75 and 2.25 thiol or α-hydroxy thiol groups per hydroxy thiol ester molecule.

In another aspect, the hydroxy thiol ester can be described using the number of alcohol, α-hydroxy thiol, or other functional groups present in the hydroxy thiol ester. For example, a hydroxy thiol ester referred to as a trifunctional hydroxy thiol ester can be a hydroxy thiol ester containing an average of between 2.5 to 3.5 alcohol, α-hydroxy thiol, or other functional groups per hydroxy thiol ester molecule. Alternatively, the trifunctional hydroxy thiol ester can contain an average of between 2.75 to 3.25 alcohol, α-hydroxy thiol, or other functional groups per hydroxy thiol ester molecule. As another example, a hydroxy thiol ester referred to as a difunctional hydroxy thiol ester can be a hydroxy thiol ester containing an average of between 1.5 to 2.5 alcohol, α-hydroxy thiol, or other functional groups per hydroxy thiol ester molecule; or alternatively, between 1.75 and 2.25 alcohol, α-hydroxy thiol, or other functional groups per hydroxy thiol ester molecule.

The hydroxy thiol esters can be produced by contacting an epoxidized ester derived from an unsaturated ester (i.e., epoxidized unsaturated ester) with hydrogen sulfide, as described herein. In some instances, it is desirable to have epoxide groups present in the hydroxy thiol ester composition. While in other embodiments, it can be desirable to minimize the number of epoxy groups present in the hydroxy thiol ester composition. Thus, the presence of residual epoxide groups can be another separate functional group used to describe the hydroxy thiol ester. The hydroxy thiol esters can include an average of greater than 0 to about 4 epoxide groups per triglyceride. The thiol composition can also include an average of greater than 1.5 to about 9 epoxide groups per triglyceride.

The presence of epoxide groups in the hydroxy thiol ester can be independently described as an average number of epoxide groups per hydroxy thiol ester, a molar ratio of epoxide groups to thiol groups, a molar ratio of epoxide groups to α-hydroxy thiol groups, or any combination thereof. In some embodiments, the hydroxy thiol ester molecules can have an average of less than 2 epoxide groups per hydroxy thiol ester molecule, i.e., the hydroxy thiol ester molecules have a molar ratio of epoxide groups to α-hydroxy thiol groups of less than 2. Alternatively, the hydroxy thiol ester can have an average of less than 1.5 epoxide groups per hydroxy thiol ester molecule; alternatively, an average of less than 1 epoxide group per hydroxy thiol ester molecule; alternatively, an average of less than 0.75 epoxide groups per hydroxy thiol ester molecule; or alternatively, an average of less than 0.5 epoxide groups per hydroxy thiol ester molecule. In other embodiments, the molar ratio of epoxide groups to thiol groups can average less than 1.5. Alternatively, the molar ratio of epoxide groups to thiol groups can average less than 1; alternatively, average less than 0.75; alternatively, average less than 0.5; alternatively, average less than 0.25; or alternatively, average less than 0.1. In yet other embodiments, the molar ratio of epoxide groups to α-hydroxy thiol groups can average less than 1.5. Alternatively, the molar ratio of epoxide groups to α-hydroxy thiol groups can average less than 1; alternatively, can average less than 0.75; alternatively, average less than 0.5; alternatively, average less than 0.25; or alternatively, average less than 0.1. In yet other embodiments, the hydroxy thiol ester composition is substantially free of epoxide groups.

In other embodiments, the hydroxy thiol ester can be described by the average amount of thiol sulfur present in the hydroxy thiol ester. In an embodiment, the hydroxy thiol ester molecules can have an average of at least 2.5 weight percent thiol sulfur per hydroxy thiol ester molecule; alternatively, an average of at least 5 weight percent thiol sulfur per hydroxy thiol ester molecule; alternatively, an average of at least 10 weight percent thiol sulfur per hydroxy thiol ester molecule; or alternatively, an average of greater than 15 weight percent thiol sulfur per hydroxy thiol ester molecule. In an embodiment, the hydroxy thiol ester molecules can have an average of from 5 to 25 weight percent thiol sulfur per hydroxy thiol ester molecule; alternatively, an average of from 5 to 20 weight percent thiol sulfur per hydroxy thiol ester molecule; alternatively, an average of from 6 to 15 weight percent thiol sulfur per hydroxy thiol ester molecule; or alternatively, an average of from 8 to 10 weight percent thiol sulfur per hydroxy thiol ester molecule.

In some embodiments, at least 20 percent of the total side chains include the α-hydroxy thiol group. In some embodiments, at least 40 percent of the total side chains include the α-hydroxy thiol group. In some embodiments, at least 60 percent of the total side chains include the α-hydroxy thiol group; or alternatively, at least 70 percent of the total side chains include the α-hydroxy thiol group. Yet in other embodiments, at least 80 percent of the total side chains include the α-hydroxy thiol group.

In some aspects, greater than 20 percent of the hydroxy thiol ester molecule total side chains contain sulfur. In some aspects, greater than 40 percent of the hydroxy thiol ester molecule total side chains contain sulfur. In some aspects, greater than 60 percent of the hydroxy thiol ester molecule total side chains contain sulfur; alternatively, greater than 70 percent of the total side chains contain sulfur; or alternatively, greater than 80 percent of the total side chains contain sulfur.

In particular embodiments, the epoxidized unsaturated ester used in the synthesis of the hydroxy thiol ester is produced from the epoxidized unsaturated ester composition that includes an epoxidized natural source oil. Because the natural source oils have particular compositions regarding the number of ester groups present, the hydroxy thiol ester will have about the same number of ester groups as the natural source oil. Other independent properties that are described herein can be used to further describe the hydroxy thiol ester.

In other embodiments, the epoxidized unsaturated ester used to produce the hydroxy thiol ester is produced from synthetic (or semi-synthetic) unsaturated ester oils. Because the synthetic ester oils can have particular compositions regarding the number of ester groups present, the hydroxy thiol ester would have about the same number of ester groups as the synthetic ester oil. Other independent properties of the unsaturated ester, whether the unsaturated ester includes natural source or synthetic oils, can be used to further describe the hydroxy thiol ester composition.

Examples of suitable hydroxy thiol esters include but are not limited to mercaptanized epoxidized vegetable oils, mercaptanized epoxidized soybean oil, and mercaptanized epoxidized castor oil. Other suitable mercaptanized epoxidized esters are described in the '675 Applications and are to be considered within the scope of the present invention.

Cross-linked Thiol Ester Compositions

In an aspect, the feedstock thiol ester compositions include a cross-linked thiol ester composition. Generally, the cross-linked thiol ester molecules are oligomers of thiol esters that are connected together by polysulfide linkages —$S_x$— wherein x is an integer greater than 1. As the cross-linked thiol ester is described as an oligomer of thiol esters, the thiol esters can be described as the monomer from which the cross-linked thiol esters are produced. In embodiments, the cross-linked thiol ester is produced from a mercaptanized unsaturated ester and can be called a cross-linked mercaptanized unsaturated ester. In other embodiments, the cross-linked thiol ester can be produced from a hydroxy thiol ester and can be called a crossed linked hydroxy thiol ester. In yet other embodiments, the crosslinked thiol ester can be produced from a mercaptanized epoxidized ester and can be called a cross-linked mercaptanized epoxidized thiol ester.

In an aspect, the cross-linked thiol ester composition comprises a thiol ester oligomer having at least two thiol ester monomers connected by a polysulfide linkage having a structure —$S_Q$—, wherein Q is an integer greater than 1. In an aspect, the polysulfide linkage can be the polysulfide linkage —$S_Q$—, wherein Q is 2, 3, 4, or mixtures thereof. In other embodiments, Q can be 2; alternatively, 3; or alternatively, 4.

In an aspect, the cross-linked thiol ester composition comprises a thiol ester oligomer having at least 3 thiol ester monomers connected by polysulfide linkages; alternatively, at least 5 thiol ester monomers connected by polysulfide linkages; alternatively, at least 7 thiol ester monomers connected by polysulfide linkages; or alternatively, at least 10 thiol ester monomers connected by polysulfide linkages. In yet other embodiments, the cross-linked thiol ester composition comprises a thiol ester oligomer having from 3 to 20 thiol ester monomers connected by polysulfide linkages; alternatively, from 5 to 15 thiol ester monomers connected by polysulfide linkages; or alternatively, from 7 to 12 thiol ester monomers connected by polysulfide linkages.

In an aspect, the cross-linked thiol ester composition comprises thiol ester monomers and thiol ester oligomers. In some embodiments, the cross-linked thiol ester composition has a combined thiol ester monomer and thiol ester oligomer average molecular weight greater than 2,000. In other embodiments, the cross-linked thiol ester composition has a combined thiol ester monomer and thiol ester oligomer average molecular weight greater than 5,000; or alternatively, greater than 10,000. In yet other embodiments, the cross-linked thiol ester composition has a combined thiol ester monomer and thiol ester oligomer average molecular weight ranging from 2,000 to 20,000; alternatively, from 3,000 to 15,000; or alternatively, from 7,500 to 12,500.

In an aspect, the thiol ester monomers and thiol ester oligomers have a total thiol sulfur content greater than 0.5. In other embodiments, the thiol ester monomers and thiol ester oligomers have a total thiol sulfur content greater than 1; alternatively, greater than 2; or alternatively, greater than 4. In yet other embodiments, the thiol ester monomers and the thiol ester oligomers have a total thiol sulfur content from 0.5 to 8; alternatively, from 4 to 8; or alternatively, 0.5 to 4.

In an aspect, the thiol ester monomers and thiol ester oligomers have a total sulfur content greater than 8. In some embodiments, the thiol ester monomers and thiol ester oligomers have a total sulfur content greater than 10; or alternatively, greater than 12. In yet other embodiments, the thiol ester monomers and thiol ester oligomers have a total sulfur content ranging from 8 to 15 weight percent; alternatively, from 9 to 14; or alternatively, from 10 to 13.

In an aspect the crosslinked thiol esters of the crosslinked thiol ester compositions can be described as being high crosslinked, mid crosslinked, or low crosslinked. Generally, the amount of crosslinking in the crosslinked thiol esters can be controlled by the amount of sulfur utilized in the production of the crosslinked thiol esters; i.e. the higher the quantity of sulfur utilized in the production of the crosslinked thiol ester, the greater the crosslinking in the crosslinked thiol ester composition. Because the elemental sulfur reacts with the thiol group of the thiol ester composition, the amount of crosslinking can be determined by measuring the residual thiol sulfur content of the remaining in the thiol ester composition.

In embodiments, a low crosslinked thiol ester composition can have an average of from 4.5 to 7.5 weight percent thiol sulfur; alternatively, from 5.0 to 7.0 weight percent thiol sulfur; or alternatively, from 5.5 to 6.5 weight percent thiol sulfur. In embodiments, a mid crosslinked thiol ester composition can have an average of from 2.5 to 3.5 weight percent thiol sulfur; or alternatively, from 2.25 to 2.75 weight percent thiol sulfur. In embodiments, a high crosslinked thiol ester composition can have an average of from 0.75 to 2.25 weight percent thiol sulfur; alternatively, from 1.0 to 2.0 weight percent thiol sulfur; or alternatively, from 1.25 to 1.75 weight percent thiol sulfur.

Unsaturated Esters

The unsaturated ester used as a feedstock to produce some of the thiol ester compositions described herein can be described using a number of different methods. One method of describing the unsaturated ester feedstock is by the number of ester groups and the number of carbon-carbon double bonds that comprise each unsaturated ester oil molecule. Suitable unsaturated esters used as a feedstock to produce the thiol ester compositions described herein minimally comprise at least 1 ester group and at least 1 carbon-carbon double bond. However, beyond this requirement, the number of ester groups and carbon-carbon double bonds comprising the unsaturated esters are independent elements and can be varied independently of each other. Thus, the unsaturated esters can have any combination of the number of ester groups and the number of carbon-carbon double bonds described separately herein. Suitable, unsaturated esters can also contain additional functional groups such as alcohol, aldehyde, ketone, epoxy, ether, aromatic groups, and combinations thereof. As an example, the unsaturated esters can also comprise hydroxy groups. An example of an unsaturated ester that contains hydroxy groups is castor oil. Other suitable unsaturated esters will be apparent to those of skill in the art and are to be considered within the scope of the present invention.

Minimally, the unsaturated ester comprises at least one ester group. In other embodiments, the unsaturated ester comprises at least 2 ester groups. Alternatively, the unsaturated ester comprises 3 ester groups. Alternatively, the unsaturated ester comprises 4 ester groups. Alternatively, the unsaturated ester includes from 2 to 8 ester groups. Alternatively, the unsaturated ester includes from 2 to 7 ester groups. Alternatively, the unsaturated ester includes from 3 to 5 ester groups. As another alternative, the unsaturated ester includes from 3 to 4 ester groups.

In other embodiments, the unsaturated ester comprises a mixture of unsaturated esters. In these situations, the number of ester groups is best described as an average number of ester groups per unsaturated ester molecule comprising the unsaturated ester composition. In some embodiments, the unsaturated esters have an average of at least 1.5 ester groups per unsaturated ester molecule; alternatively, an average of at least 2 ester groups per unsaturated ester molecule; alternatively, an average of at least 2.5 ester groups per unsaturated ester molecule; or alternatively, an average of at least 3 ester groups per unsaturated ester molecule. In other embodiments, the unsaturated esters have an average of from 1.5 to 8 ester groups per unsaturated ester molecule; alternatively, an average of from 2 to 7 ester groups per unsaturated ester molecule; alternatively, an average of from 2.5 to 5 ester groups per unsaturated ester molecule; or alternatively, an average of from 3 to 4 ester groups per unsaturated ester molecule. In another embodiment, the unsaturated esters have an average of about 3 ester groups per unsaturated ester molecule; or alternatively, an average of about 4 ester groups per unsaturated ester molecule.

Minimally, the unsaturated ester comprises at least one carbon-carbon double bond per unsaturated ester molecule. In an embodiment, the unsaturated ester comprises at least 2 carbon-carbon double bonds; alternatively, at least 3 carbon-carbon double bonds; or alternatively, at least 4 carbon-carbon double bonds. In other embodiments, the unsaturated ester comprises from 2 to 9 carbon-carbon double bonds; alternatively, from 2 to 4 carbon-carbon double bonds; alternatively, from 3 to 8 carbon-carbon double bonds; or alternatively, from 4 to 8 carbon-carbon double bonds.

In some embodiments, the unsaturated ester comprises a mixture of unsaturated esters. In this aspect, the number of carbon-carbon double bonds in the mixture of unsaturated ester is best described as an average number of carbon-carbon double bonds per unsaturated ester oil molecule. In some embodiments, the unsaturated esters have an average of at least 1.5 carbon-carbon double bonds per unsaturated ester molecule; alternatively, an average of at least 2 carbon-carbon double bonds per unsaturated ester molecule; alternatively, an average of at least 2.5 carbon-carbon double bonds per unsaturated ester molecule; or alternatively, an average of at least 3 carbon-carbon double bonds per unsaturated ester molecule. In other embodiments, the unsaturated esters have average of from 1.5 to 9 carbon-carbon double bonds per unsaturated ester molecule; alternatively, an average of from 3 to 8 carbon-carbon double bonds per unsaturated ester molecule; alternatively, an average of from 2 to 4 carbon-carbon double bonds per unsaturated ester molecule; or alternatively, an average of from 4 to 8 carbon-carbon double bonds per unsaturated ester molecule.

While the number (or average number) of ester groups and the number (or average number) double bonds are independent elements of the unsaturated esters, particular embodiments are mentioned for illustrative purposes. In an embodiment, the unsaturated ester molecules have an average of at least 1.5 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of at least 1.5 carbon-carbon double bonds per unsaturated ester molecule. Alternatively, the unsaturated ester molecules have an average of at least 3 ester groups per unsaturated ester molecule and have an average of from 1.5 to 9 carbon-carbon double bonds per unsaturated ester molecule. As another alternative, the unsaturated ester molecules have an average of from 2 to 8 ester groups per unsaturated ester molecule and have an average of from 1.5 to 9 carbon-carbon double bonds per unsaturated ester oil.

In addition to the number (or average number) of ester groups and the number (or average number) of carbon-carbon double bonds present in the unsaturated ester molecules, the disposition of the carbon-carbon double bonds in unsaturated ester molecules having 2 or more carbon-carbon double bonds can be a consideration. In some embodiments where the unsaturated ester molecules have 2 or more carbon-carbon double bonds, the carbon-carbon double bonds can be conjugated. In other embodiments, the carbon-carbon double bonds can be separated from each other by only one carbon atom. When two carbon-carbon double bonds are separated by a carbon atom having two hydrogen atoms attached to it, e.g. a methylene group, these carbon-carbon double bonds can be termed as methylene interrupted double bonds. In yet other embodiments, the carbon-carbon double bonds are isolated, e.g. the carbon-carbon double bonds are separated from each other by 2 or more carbon atoms. In further embodiments, the carbon-carbon double bonds can be conjugated with a carbonyl group.

In some aspects, the unsaturated ester can be described as an ester of a polyol and unsaturated carboxylic acids. Within this description, the unsaturated carboxylic acid portion of the unsaturated ester can be called a polyol side chain (or more simply a side chain). In some embodiments, the unsaturated ester comprises less than 30 percent of side chains comprising methylene interrupted double bonds. In other embodiments, embodiments the unsaturated ester comprises greater than 30 percent of the side chains comprise methylene interrupted double bonds. In yet other embodiments, the unsaturated ester comprises less than 25 percent of side chains having 3 contiguous methylene interrupted carbon-carbon double bonds. In further embodiments, the unsaturated ester comprises less than 25 percent linolenic side chains. In further embodiments, the unsaturated ester comprises greater than 25 percent of side chains having 3 contiguous methylene interrupted carbon-carbon double bonds. In further embodiments, the unsaturated ester comprises greater than 25 percent linolenic side chains. In additional embodiments, the unsaturated ester comprises at least 30 percent side chains having 2 contiguous methylene interrupted carbon-carbon double bonds and less than 25 percent of side chains having 3 contiguous methylene interrupted carbon-carbon double bonds.

Additional functional groups can also be present in the unsaturated ester. A non-limiting list of functional groups include a hydroxy group, an ether group, an aldehyde group, a ketone group, an amine group, a carboxylic acid group among others, and combinations thereof. In an aspect, the unsaturated ester can comprise hydroxy groups. In some embodiments, the unsaturated esters have an average of at least 1.5 hydroxy groups per unsaturated ester molecule; alternatively, an average of at least 2 hydroxy groups per unsaturated ester molecule; alternatively, an average of at least 2.5 hydroxy groups per unsaturated ester molecule; or alternatively, an average of at least 3 hydroxy groups per unsaturated ester molecule. In other embodiments, the unsaturated esters have an average of from 1.5 to 9 hydroxy groups per unsaturated ester molecule; alternatively, an average of from 3 to 8 hydroxy groups per unsaturated ester molecule; alternatively, an average of from 2 to 4 hydroxy groups per unsaturated ester molecule; or alternatively, an average of from 4 to 8 hydroxy groups per unsaturated ester molecule. In an embodiment, the unsaturated ester comprises at least 2 hydroxy groups; alternatively, at least 3 hydroxy groups; or alternatively, at least 4 hydroxy groups. In other embodiments, the unsaturated ester comprises from 2 to 9 hydroxy groups; alternatively, from 2 to 4 hydroxy groups; alternatively, from 3 to 8 hydroxy groups; or alternatively, from 4 to 8 hydroxy groups.

The unsaturated ester utilized to produce the thiol ester utilized in aspects of this invention can be any unsaturated ester having the number of ester groups and carbon-carbon double bonds per unsaturated ester described herein. The unsaturated ester can be derived from natural sources, synthetically produced from natural source raw materials, produced from synthetic raw materials, produced from a mixture of natural and synthetic materials, or a combination thereof.

Unsaturated Natural Source Oil

In an embodiment, the unsaturated ester is unsaturated natural source oil. The unsaturated natural source oil can be derived from naturally occurring nut, vegetable, plant, and animal sources. In an embodiment, the unsaturated ester comprises a triglyceride derived from naturally occurring nuts, vegetables, plant, and animal sources. In an embodiment, the unsaturated ester can be derived from genetically modified nuts, vegetables, plant, and animal sources. In an embodiment, the unsaturated ester oil comprises a triglyceride derived from genetically modified nuts, vegetables, plant, and animal sources.

In an aspect, the unsaturated natural source oil can be tallow, olive, peanut, castor bean, sunflower, sesame, poppy, seed, palm, almond seed, hazelnut, rapeseed, canola, soybean, corn, safflower, canola, cottonseed, camelina, flaxseed, or walnut oil. In some embodiment, the unsaturated natural source oil can be soybean, corn, castor bean, safflower, canola, cottonseed, camelina, flaxseed, or walnut oil. In further embodiments, the unsaturated natural source oil can be soybean oil; alternatively, corn oil; alternatively, castor bean oil; or alternatively, canola oil.

The unsaturated natural source oils are comprised of triglycerides that can be described as an ester of glycerol and an unsaturated carboxylic acid. Within this description, the unsaturated carboxylic acid portion of the triglyceride can be called a glycerol side chain (or more simply a side chain). In some embodiments, the triglyceride comprises less than 30 percent of side chains comprising methylene interrupted double bonds. In other embodiments, the triglyceride comprises greater than 30 percent of the side chains comprise methylene interrupted double bonds. In yet other embodiments, the triglyceride comprises less than 25 percent of side chains having 3 contiguous methylene interrupted carbon-carbon double bonds. In further embodiments, the triglyceride comprises less than 25 percent linolenic side chains. In further embodiments, the triglyceride comprises greater than 25 percent of side chains having 3 contiguous methylene interrupted carbon-carbon double bonds. In further embodiments, the triglyceride comprises greater than 25 percent linolenic side chains. In additional embodiments, the triglyceride comprises at least 30 percent side chains having 2 contiguous methylene interrupted carbon-carbon double bonds and less than 25 percent of side chains having 3 contiguous methylene interrupted carbon-carbon double bonds.

In another embodiment, the unsaturated natural ester oil comprises "natural" triglycerides derived from unsaturated natural source oils. In an embodiment, the unsaturated ester oil is synthetic. In an embodiment, the unsaturated ester oil comprises both synthetic and natural raw materials. In an embodiment, the unsaturated ester oil comprises synthetic triglycerides.

Synthetic Unsaturated Esters

Synthetic unsaturated esters used as feedstock for aspects of this invention can be produced using methods for producing an ester group known to those skilled in the art. The term "ester group" means a moiety formed from the reaction of a hydroxy group and a carboxylic acid or a carboxylic acid derivative. Typically, the esters can be produced by reacting an alcohol with a carboxylic acid, transesterification of carboxylic acid ester with an alcohol, reacting an alcohol with a carboxylic acid anhydride, or reacting an alcohol with a carboxylic acid halide. Any of these methods can be used to produce the synthetic unsaturated ester oils used as a feedstock in an aspect of this invention. The alcohol, unsaturated carboxylic acid, unsaturated carboxylic acid ester, unsaturated carboxylic acid anhydride raw materials for the production of the unsaturated ester oil can be derived from natural, synthetic, genetic, or any combination of natural, genetic, and synthetic sources.

The polyols and the unsaturated carboxylic acids, simple unsaturated carboxylic acid esters, or unsaturated carboxylic acid anhydrides used to produce the unsaturated esters used as a feedstock in various aspects of this invention are independent elements. That is, these elements can be varied independently of each other and thus, can be used in any combination to produce an unsaturated ester utilized a feedstock to produce the compositions described in this application or as a feedstock for the processes described in this application.

Synthetic Unsaturated Ester Oils—Polymer Component

The polyol used to produce the unsaturated ester oil can be any polyol or mixture of polyols capable of reacting with an unsaturated carboxylic acid, unsaturated simple carboxylic acid ester, carboxylic acid anhydride, or carboxylic acid halide under reaction conditions apparent to those skilled in the art.

The number of carbon atoms in the polyol can be varied. In one aspect, the polyol used to produce the unsaturated ester can comprise from 2 to 20 carbon atoms. In other embodiments, the polyol comprises from 2 to 10 carbon atoms; alternatively, from 2 to 7 carbon atoms; or alternatively, from 2 to 5 carbon atoms. In further embodiments, the polyol can be a mixture of polyols having an average of 2 to 20 carbon atoms; alternatively, an average of from 2 to 10 carbon atoms; alternatively, an average of 2 to 7 carbon atoms; or alternatively, an average of 2 to 5 carbon atoms.

In another aspect, the polyol used to produce the unsaturated ester can have any number of hydroxy groups needed to produce the unsaturated ester as described herein. In some embodiments, the polyol has 2 hydroxy groups; alternatively, 3 hydroxy groups; alternatively, 4 hydroxy groups; alternatively, 5 hydroxy groups; or alternatively, 6 hydroxy groups. In other embodiments, the polyol comprises at least 2 hydroxy groups; alternatively, at least 3 hydroxy groups; alternatively, at least 4 hydroxy groups; alternatively, at least 5 hydroxy groups; or alternatively, at least 6 hydroxy groups. In yet other embodiments, the polyol comprises from 2 to 8 hydroxy groups; alternatively, from 2 to 4 hydroxy groups; or alternatively, from 4 to 8 hydroxy groups.

In further aspects, the polyol used to produce the unsaturated ester is a mixture of polyols. In an embodiment, the mixture of polyols has an average of at least 1.5 hydroxy groups per polyol molecule. In other embodiments, the mixture of polyols has an average of at least 2 hydroxy groups per polyol molecule; alternatively, an average of at least 2.5 hydroxy groups per polyol molecule; alternatively, an average of at least 3.0 hydroxy groups per polyol molecule; or alternatively, an average of at least 4 hydroxy groups per polyol molecule. In yet another embodiments, the mixture of polyols has an average of 1.5 to 8 hydroxy groups per polyol molecule; alternatively, an average of 2 to 6 hydroxy groups per polyol molecule; alternatively, an average of 2.5 to 5 hydroxy groups per polyol molecule; alternatively, an average of 3 to 4 hydroxy groups per polyol molecule; alternatively, an average of 2.5 to 3.5 hydroxy groups per polyol molecule; or alternatively, an average of 2.5 to 4.5 hydroxy groups per polyol molecule.

In yet another aspect, the polyol or mixture of polyols used to produce the unsaturated thiol ester has a molecular weight or average molecular weight less than 500. In other embodiments, the polyol or mixture of polyols have a molecular weight or average molecular weight less than 300; alternatively, less than 200; alternatively, less than 150; or alternatively, less than 100.

In some embodiments, suitable polyols include 1,2-ethanediol, 1,3-propanediol, 1,4-butanediol, 1,5-pentanediol, 1,6-hexanediol, dimethylolpropane, neopentylpropane, 2-propyl–2-ethyl-1,3-propanediol, 1,2-propanediol, 1,3-butanediol, diethylene glycol, triethylene glycol, polyethylene glycol, dipropylene glycol, tripropylene glycol, polypropylene glycol, cyclohexanedimethanol, 1,3-dioxane-5,5-dimethanol, 1,4-xylylenedimethanol, 1-phenyl-1,2-ethanediol, trimethylolpropane, trimethylolethane, trimethylolbutane, glycerol, 1,2,5-hexanetriol, pentaerythritol, ditrimethylolpropane, diglycerol, ditrimethylolethane, 1,3,5-trihydroxybenzene, 1,4-xylylenedimethanol, 1-phenyl-1,2-ethanediol, or any combination thereof. In further embodiments, the polyol is glycerol, pentaerythritol, or mixtures thereof. In other embodiments, the polyol is glycerol; or alternatively, pentaerythritol.

Synthetic Unsaturated Ester—Carboxylic Acid or Carboxylic Acid Equivalent Component The carboxylic acid component of the unsaturated ester oil can be any carboxylic acid or mixture of carboxylic acids comprising a carbon-carbon double bond. As the carboxylic acid component will be combined with a polyol or polyol mixture comprising an average of greater than 1.5 hydroxy groups or any other number of hydroxy groups described herein, the carboxylic acid component can be any mixture comprising unsaturated carboxylic acids that produces an unsaturated ester oil meeting the feedstock requirement described herein. In some embodiments, the carboxylic acid component can be any mixture of saturated carboxylic acid and unsaturated carboxylic acid that produces an unsaturated ester oil meeting the feedstock requirement described herein. Thus, the carboxylic acid or carboxylic acid mixture used to produce the synthetic unsaturated ester oil can be described as having an average number of a specified element per carboxylic acid.

Independent elements of the carboxylic acid include the average number of carboxylic acid groups per carboxylic acid molecule, the average number of carbon atoms present in the carboxylic acid, and the average number of carbon-carbon double bonds per carboxylic acid. Additional independent elements include the position of the double bond in the carbon chain and the relative position of the double bonds with respect to each other when there are multiple double bonds.

Specific carboxylic acids used as a component of the carboxylic acid composition used to produce the unsaturated ester oil can have from 3 to 30 carbon atoms per carboxylic acid molecule. In some embodiments, the carboxylic acid is linear. In some embodiments, the carboxylic acid is branched. In some embodiments, the carboxylic acid is a mixture of linear and branched carboxylic acids. In some embodiments, the carboxylic acid can also comprise additional functional groups including alcohols, aldehydes, ketones, and epoxides, among others.

Suitable carboxylic acids that can be used as a component of unsaturated carboxylic acid composition can have from about 3 to about 30 carbon atoms; alternatively, 8 to 25 carbon atoms; or alternatively, from 12 to 20 carbon atoms. In other embodiments, the carboxylic acids comprising the unsaturated carboxylic acid composition comprise an average of 2 to 30 carbon atoms; alternatively, an average of 8 to 25 carbon atoms; or alternatively, an average of from 12 to 20 carbon atoms.

The carbon-carbon double bond can be located anywhere along the length of the carbon-carbon chain. In one embodiment, the double bond can be located at a terminal position. In another embodiment, the carbon-carbon double bond can be located at internal position. In yet another embodiment, the carboxylic acid or mixture of carboxylic acids can comprise both terminal and internal carbon-carbon double bonds. The double bond can also be described by indicating the number of substituents that are attached to the carbon-carbon double bond. In some embodiments, the carbon-carbon double bond can be mono-substituted, disubstituted, trisubstituted, tetra-substituted, or a mixture of unsaturated carboxylic acids that can have any combination of monosubstituted, disubstituted, trisubstituted and tetrasubstituted carbon-carbon double bonds.

Suitable unsaturated carboxylic acids include acrylic, agonandoic, agonandric, alchomoic, ambrettolic, angelic, asclepic, auricolic, avenoleic, axillarenic, brassidic, caproleic, cetelaidic, cetoleic, civetic, coriolic, coronaric, crepenynic, densipolic, dihomolinoleic, dihomotaxoleic, dimorphecolic, elaidic, ephedrenic, erucic, gadelaidic, gadoleic, gaidic, gondolo, gondoleic, gorlic, helenynolic, hydrosorbic, isoricinoleic, keteleeronic, labellenic, lauroleic, lesquerolic, linelaidic, linderic, linoleic, lumequic, malvalic, mangold's acid, margarolic, megatomic, mikusch's acid, mycolipenic, myristelaidic, nervoic, obtusilic, oleic, palmitelaidic, petroselaidic, petroselinic, phlomic, physeteric, phytenoic, pyrulic, ricinelaidic, rumenic, selacholeic, sorbic, stearolic, sterculic, sterculynic, stillingic, strophanthus, tariric, taxoleic, traumatic, tsuduic, tsuzuic, undecylenic, vaccenic, vernolic, ximenic, ximenynic, ximenynolic, and combinations thereof. In further embodiments, suitable unsaturated carboxylic acids include oleic, palmitoleic, ricinoleic, linoleic, and combination thereof. Other suitable unsaturated carboxylic acids will be apparent to those persons having ordinary skill in the art and are to be considered within the scope of the present invention.

In some embodiments, the unsaturated ester can be produced by transesterification of a simple ester of the carboxylic acid or mixture of carboxylic acids described herein with the polyol compositions described herein. In some embodiments, the simple ester is a methyl or ethyl ester of the carboxylic acid or mixture of carboxylic acids. In further embodiments, the simple carboxylic acid ester is a methyl ester of the carboxylic acids described herein.

Epoxidized Unsaturated Esters

In an aspect, epoxidized unsaturated esters are used as a feedstock to produce materials described herein and for the processes to produce the material described herein. Generally, the epoxidized unsaturated ester can be derived by epoxidizing any unsaturated ester described herein. The unsaturated ester oil can be derived from natural sources, synthetically produced from natural source raw materials, produced from synthetic raw materials, produced from a mixture of natural and synthetic materials, or a combination thereof Minimally, the epoxidized unsaturated ester comprises at least one epoxide group. In an embodiment the epoxidized unsaturated ester comprises at least 2 epoxide groups; alternatively, at least 3 epoxide groups; or alternatively, at least 4 epoxide groups. In other embodiments, the epoxidized unsaturated ester comprises from 2 to 9 epoxide groups; alternatively, from 2 to 4 epoxide groups; alternatively, from 3 to 8 epoxide groups; or alternatively, from 4 to 8 epoxide groups.

In some embodiments, the unsaturated ester comprises a mixture of epoxidized unsaturated esters. In this aspect, the number of epoxide groups in the epoxidized unsaturated ester can be described as an average number of epoxide groups per epoxidized unsaturated ester molecule. In some embodiments, the epoxidized unsaturated esters have an average of at least 1.5 epoxide groups per epoxidized unsaturated ester molecule; alternatively, an average of at least 2 epoxide groups per epoxidized unsaturated ester molecule; alternatively, an average of at least 2.5 epoxide groups per epoxidized unsaturated ester molecule; or alternatively, an average of at least 3 epoxide groups per epoxidized unsaturated ester molecule. In other embodiments, the epoxidized unsaturated esters have an average of from 1.5 to 9 epoxide groups per epoxidized unsaturated ester molecule; alternatively, an average of from 3 to 8 epoxide groups per epoxidized unsaturated ester molecule; alternatively, an average of from 2 to 4 epoxide groups per epoxidized unsaturated ester molecule; or alternatively, an average of from 4 to 8 epoxide groups per epoxidized unsaturated ester molecule.

In an aspect the epoxidized unsaturated ester can be an epoxidized unsaturated natural source oil. The unsaturated natural source oil can be derived from naturally occurring nut, vegetable, plant, and animal sources. In an embodiment, the unsaturated ester oil is derived from genetically modified nuts, vegetables, plant, and animal sources. In an embodiment, the unsaturated ester oil comprises a triglyceride derived from genetically modified nuts, vegetables, plant, and animal sources.

In an aspect, the epoxidized natural source oil can be tallow, olive, peanut, castor bean, sunflower, sesame, poppy, seed, palm, almond seed, hazelnut, rapeseed, canola, soybean, corn, safflower, canola, cottonseed, camelina, flaxseed, or walnut oil. In some embodiment, the epoxidized natural source oil can be soybean, corn, castor bean, safflower, canola, cottonseed, camelina, flaxseed, or walnut oil. In further embodiments, the epoxidized natural source oil can be soybean oil; alternatively, corn oil; alternatively, castor bean oil; or alternatively, canola oil.

Isocyanates

In an aspect, the polythiourethanes of the present invention can be produced by contacting the thiol ester composition with the isocyanate composition. Generally, the isocyanate composition comprises an isocyanate having at least one isocyanate group. In embodiments, the isocyanate composition is comprised of molecules having multiple isocyanate groups. In some embodiments, the isocyanate composition comprises a mixture of isocyanate molecules. When the isocyanate composition comprises a mixture of isocyanate molecules, the isocyanate molecules can have an average of at least 1.5 isocyanate groups per isocyanate molecule; alternatively, an average of at least 2 isocyanate groups per isocyanate molecule; alternatively, an average of at least 2.5 isocyanate groups per isocyanate molecule; or alternatively, an average of at least 3 isocyanate groups per isocyanate molecule. In embodiments, the isocyanate molecules can have an average of from 1.5 to 12 isocyanate groups per isocyanate molecule; alternatively, an average of from 1.5 to 9 isocyanate groups per isocyanate molecule; alternatively, an average of from 2 to 7 isocyanate groups per isocyanate molecule; alternatively, an average of from 2 to 5 isocyanate groups per isocyanate molecule; or alternatively, an average of from 2 to 4 isocyanate groups per isocyanate molecule. In embodiments, the isocyanate composition can comprise aliphatic isocyanates, cycloaliphatic isocyanates, aromatic isocyanates, or any combination thereof. In some embodiments, the isocyanate composition comprises aliphatic isocyanates; alternatively, cycloaliphatic isocyanates; or alternatively, aromatic isocyanates.

In embodiments, the aliphatic isocyanates of the isocyanate composition can comprise ethylene diisocyanate, 1,3-trimethylene diisocyanate, 1,4-tetramethylene diisocyanate, 1,6-hexamethylene diisocyanate, 1,7-heptamethylene isocyanate, 1,8-octamethylene diisocyanate, 1,9-nonamethylene diisocyanate, 1,10-decamethylene diisocyanate, 1,11-undecamethylene diisocyanate, 1,12-dodecamethylene diisocyanate, 2,2'-dimethylpentane diisocyanate, 2,2,4-trimethyl–1, 6-hexamethylene diisocyanate, 2,4,4-trimethylhexamethylene diisocyanate, 1,6,11-undecane triisocyanate, 1,3,6-hexamethylene triisocyanate, 1,8-diisocyanato4-(isocyanatomethyl)octane, 2,5,7-trimethyl-1,8-diisocyanato-5-(isocyanatomethyl)octane, or any combination thereof. In some embodiments, the aliphatic isocyanates of the isocyanate composition can comprise ethylene diisocyanate, 1,3-trimethylene diisocyanate, 1,4-tetramethylene diisocyanate, 1,6-hexamethylene diisocyanate, 1,12-dodecamethylene diisocyanate, 2,2,4-trimethyl-1,6-hexamethylene diisocyanate, 2,4,4-trimethylhexamethylene diisocyanate, 1,6,11-undecane triisocyanate, 1,3,6-hexamethylene triisocyanate, or any combination thereof. In other embodiments, the aliphatic isocyanates of the isocyanate composition can comprise 1,4-tetra-methylene diisocyanate, 1,6-hexamethylene, or any combination thereof. In yet other embodiments, the aliphatic isocyanate of the isocyanate composition comprises 1,6-hexa-methylene.

In embodiments, the cycloaliphatic isocyanates of the isocyanate composition can comprise 1-isocyanato-2-isocyanatomethyl cyclopentane, 1,3-cyclohexane diisocyanate, 1,4-cyclohexane diisocyanate, 2,4-methylcyclohexane diisocyanate, 2,6-methylcyclohexane diisocyanate, 1,2-dimethylcyclohexane diisocyanate, 1,4-dimethylcyclohexane diisocyanate, isophorone diiso-cyanate (IPDI), 1-isocyanato-1-methyl-4(3)-isocyanatomethyl cyclohexane, 1,3-bis-(isocyanato-methyl) cyclohexane, 1,4-bis(isocyanato-methyl) cyclohexane, 2,4'-dicyclohexylmethane diisocyanate, 4,4'-dicyclohexylmethane diisocyanate (hydrogenated MDI, HMDI), 2,2'-dimethyldicyclohexylmethane diisocyanate, 4,4'-bis(3-methylcyclohexyl)methane diisocyanate, or any combination thereof. In some embodiments, the cyclic aliphatic isocyanates of the isocyanate composition can comprise 1,3-cyclohexane diisocyanate, 1,4-cyclohexane diisocyanate, 2,4-methylcyclohexane diisocyanate, 2,6-methylcyclohexane diisocyanate, 1,2-dimethylcyclohexane diisocyanate, 1,4-dimethylcyclohexane diisocyanate, isophorone diisocyanate, 2,4'-dicyclohexylmethane diisocyanate, 4,4'-dicyclohexylmethane diisocyanate, or any combination thereof. In other embodiments, the cyclic aliphatic isocyanate of the isocyanate composition comprises 1,3-cyclohexane diisocyanate; alternatively, 1,4-cyclohexane diisocyanate; alternatively, 2,4-methylcyclohexane diisocyanate; alternatively, 2,6-methylcyclohexane diisocyanate; alternatively, isophorone diisocyanate; alternatively, 2,4'-dicyclohexylmethane diisocyanate; or alternatively, 4,4'-dicyclohexylmethane diisocyanate.

In embodiments, the aromatic isocyanates of the isocyanate composition can comprise 1,3-phenylene diisocyanate, 1,4-phenylene diisocyanate, 2,4-tolylene diisocyanate (TDI), 2,5-toluene diisocyanate 2,6-tolylene diisocyanate, tolylene-α,4-diisocyante, 1,3-xylylene diisocyanate, 1,4-xylylene diisocyanate, diethylphenylene diisocyanate, diisopropylphenylene diisocyanate, trimethylbenzene triisocyanate, α,α,α',α'-tetramethyl-1,3-xylylene diisocyanate, α,α,α',α'-tetramethyl-1,4-xylylene diisocyanate, mesitylene triisocyanate, benzene triisocyanate, 1,5-diisocyanato naphthalene, methylnaphthalene diisocyanate, bis(isocyanatomethyl) naphthalene, biphenyl diisocyanate, 2,4'-diphenylmethane diisocyanate, 4,4'-diphenylmethane diisocyanate (MDI), polymeric 4,4'-diphenylmethane diisocyanate (polymeric MDI, PMDI), 3,3'-dimethyl-diphenylmethane-4,4'-diisocyanate, bibenzyl-4,4'-diisocyanate, bis(isocyanatophenyl)ethylene, triphenylmethane triisocyanate, bis(isocyanatoethyl) benzene, bis-(isocyanatopropyl)benzene, bis-(isocyanatobutyl) benzene, naphthalene triisocyanate, diphenylmethane-2,4,4'-triisocyanate, 3-methyl-diphenylmethane-4,6,4'-triisocyanate, 4-methyldiphenyl-methane-3,5,2',4',6'-pentaisocyanate, tetra-hydronaphthylene diisocyanate, or any combination thereof. In some embodiments, the aromatic isocyanates of the isocyanate composition can comprise 1,3-phenylene diisocyanate, 1,4-phenylene diisocyanate, 2,4-tolylene diisocyanate, 2,6-tolylene diisocyanate, 1,3-xylylene diisocyanate, 1,4-xylylene diisocyanate, trimethylbenzene triisocyanate, benzene triisocyanate, biphenyl diisocyanate, 2,4'-diphenylmethane diisocyanate, 4,4'-diphenylmethane diisocyanate, polymeric 4,4'-diphenylmethane diisocyanate, 3,3'-dimethyl-diphenylmethane-4,4'-diisocyanate, bibenzyl-4,4'-diisocyanate, triphenylmethane triisocyanate, polymeric MDI, naphthalene triisocyanate, or any combination thereof In other embodiments, the aliphatic isocyanates of the isocyanate composition comprises 1,3-phenylene diisocyanate, 1,4-phenylene diisocyanate, 2,4-tolylene diisocyanate, 2,6-tolylene diisocyanate, 1,3-xylylene diisocyanate, 1,4-xylylene diisocyanate, 2,4'-diphenylmethane diisocyanate, 4,4'-diphenylmethane diisocyanate, polymeric 4,4'-diphenylmethane diisocyanate, 3,3'-dimethyl-diphenylmethane-4,4'-diisocyanate, polymeric 4,4'-diphenylmethane diisocyanate, or any combination thereof In yet other embodiments, the aliphatic isocyanates of the isocyanate composition comprises 2,4-tolylene diisocyanate; alternatively, 2,6-tolylene diisocyanate; alternatively, 2,4- and 2,6-tolylene diisocyanate; alternatively, 4,4'-diphenylmethane diisocyanate; alternatively, polymeric 4,4'-diphenylmethane diisocyanate; or alternatively, mixtures of 2,4'-diphenylmethane diisocyanate and 4,4'-diphenylmethane diisocyanate.

EXAMPLES

Mercaptanized Soybean Oil
Polythiourethane Compositions

TABLE 1

| R&T Feedstocks | Diisocyanates | Stoichiometry | Catalysts |
| --- | --- | --- | --- |
| MSO-trifunctional | Luprinate ® - PolyMDI | ≈0.9 | DABCO |
| MSO-difunctional | MDI | ≈1 | DBTDL |
| MSO-TBP treated | HMDI | ≈1.25 | Jeffol ® A-480 |
| MHSO - trimercaptan | TDI | | |
| MHSO - dimercaptan | HDI | | |
| CMSO - hi cross-link | IPDI | | |
| CMSO - med cross-link | | | |
| CMSO - low cross-link | | | |
| Castor Oil | | | |

Numerous polythiourethane compositions were prepared by reacting a thiol ester composition with a diisocyanate in the presence of a catalyst by using the processes described herein for preparing such polythiourethane compositions. The compositions were produced using the different variables of feedstocks, diisocyanates, stoichiometry, and catalysts shown in Table 1. Once every combination of variable was used, over 1200 compositions were produced. Each of the feedstocks were reacted with each of the diisocyanates at each of the stoichiometries with each of the catalysts listed to produce the 1200+ compositions.

In the polythiourethane compositions, the feedstock thiol ester compositions that were used included MSO (mercaptanized soybean oil), MHSO (mercaptohydroxy soybean oil), CMSO (cross-linked mercaptanized soybean oil), CO (castor oil), and MCO (mercaptanized caster oil). The diisocyanates that were used to produce these compositions included MDI (4,4'-methylenebis(phenyl) diisocyanate), HMDI (4,4'-methylenebis(cyclohexyl) diisocyanate, which is also known as hydrogenated MDI), TDI (tolylene 2,4-diisocyanate), HDI (1,6-diisocyanatohexane, which is also known as hexamethylene diisocyanate), Luprinate® M20S (which is an oligomerized form of MDI and is also referred to as polymeric MDI that is produced by BASF Corporation or polymethylenepolyphenylpolyisocyanate), and IPDI (1-isocyanato-3-isocyanatomethyl-3,5,5-trimethylcyclohexane or isophorone diisocyanate). The catalysts that were used included DABCO (diazabicyclooctane—di-tertiary amine), DBTDL (dibutyl tin dilaurate—organometallic catalyst), Jeffol® A-480 (which is a tertiary amine polyol produced by Huntsman Based Chemicals), and BDMA (benzyldimethylamine). The stoichiometry was based upon a thiol ester composition (MSO, MHSO, CMSO, MCaO) active hydrogen (thiol and hydroxyl group) to diisocyanate equivalent ratio. For example, caster oil was reacted with tolylene diisocyanate at a stoichiometric value of 1.25 while using Jeffol® A-480 as the catalyst. As another example, a thiol ester composition was reacted with methane diisocyanate at a stoichiometric value of 0.9 while using the DABCO catalyst.

Various physical properties were determined for randomly selected polythiourethane compositions of the 1200+ compositions, the results of which are included in Table 2 that is attached as FIGS. 1A-1AG. The curing profiles that were used are as follows: A=curing for 1-8 hours at room temperature, followed by curing at 65° C. overnight, and then curing at 95° C. for 8 hours; B=curing at 65° C. overnight, followed by curing at 95° C. for 24 hours; and C=curing at 120° C. for 3 hours, followed by curing at 95° C. for 24 hours. CTE 1 represents the coefficient of thermal expansion below the glass transition temperature. CTE 2 represents the coefficient of thermal expansion above the glass transition temperature.

The polythiourethane produced from the thiol containing esters, hydroxy thiol containing esters, and cross linked thiol containing ester were analyzed using ASTM E1545-95A and E228-95 to provide the glass transition temperatures and the coefficients of thermal expansion. Shore hardness of the polythiourethanes were determined using ASTM D2240-02A. The polythiourethane were also subject to a subjective analysis classifying the polythiourethanes as hard, flexible, rubbery, rigid, tough, brittle, and other characteristics.

Two groups of polythiourethane compositions were analyzed to obtain various mechanical and physical properties. The first group contained a group of fifteen randomly selected polythiourethane compositions that were selected from the 1200+ compositions listed in Table 2 (hereinafter "the first polythiourethane sample group"). The samples contained within the first polythiourethane sample group were cured using the A, B, or C cure profiles described herein. The second group contained a group of sixteen polythiourethane compositions that were produced from mercaptanized soybean oil and Luprinate® M20S using the Jeffol® A-480 catalyst and having different SH:NCO equivalent ratios (hereinafter "the second polythiourethane sample group"). The samples contained within the second polythiourethane sample group were cured at 65° C. overnight and then cured at 95° C. for 24 hours, which corresponds to cure profile B.

Thermomechanical analyzers (TMA) and dynamic mechanical analyzers (DMA) were used to analyze the first polythiourethane sample group. The results of the TMA and DMA for the first polythiourethane sample group are located in Table 3. XH is based upon the total SH and OH groups in the thiol ester. Mechanical properties were also obtained for the first polythiourethane sample group. The results of the mechanical property analysis are located in Table 4. Additional properties, such as the density and specific gravity, were also obtained for the first polythiourethane sample group. The results of the additional property analysis are located in Table 5.

The second polythiourethane sample group was analyzed using TMA and DMA. The TMA and DMA data results are located in Table 6. Additional mechanical properties were obtained for the second polythiourethane sample group, the results of which are located in Table 7. The ASTM D-570 Room Temperature Water Uptake test was performed on the second polythiourethane sample group. The results of this test are located in Table 8. Solvent swelling properties were analyzed for the second polythiourethane sample group, the results of which are located in Table 9.

APPLICATIONS

In addition to the uses described herein, embodiments of the present invention are useful in other numerous applications. For example, embodiments of the invention are useful in various polymer applications that include, but are not limited to, as polythiourethanes, foams, adhesives, epoxy hardening agents, polyacrylates and polymethacrylate templates for paints and polyester resins, printing ink binder polymers, alkyd resin cross-linkers, sulfur based paint template, radiation cured polymers, mining and drilling chemicals, specialty chain transfer agents, rubber modifiers, and the like. Because the feedstock materials are economical and readily available, it is believed that embodiments of the present would be useful in such applications and others.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 3

TMA AND DMA DATA OF FIRST POLYTHIOURETHANE SAMPLE GROUP

| Sample ID | Thiol Ester | Isocyanate | XH:NCO Equivalent Ratio | Catalyst | Cure Profile | TMA Tg (° C.) | E' Onset (° C.) | E" Peak (° C.) |
|---|---|---|---|---|---|---|---|---|
| 791-097-15 | MHSO | TDI | 0.88 | DBTDL | B | 40.17 | 94.70 | 96.70 |
| 791-098-15 | MHSO | TDI | 0.88 | BDMA | B | 125.23 | 112.10 | 115.50 |
| 791-099-1 | MHSO | LUP | 0.96 | DBTDL | B | 122.10 | 110.21 | 113.90 |
| 791-099-15 | MHSO | IPDI | 1.09 | BDMA | B | 68.56 | 55.87 | 64.00 |
| 791-100-1 | MHSO | IPDI | 0.87 | DBTDL | B | 61.09 | 54.03 | 59.50 |
| 791-100-15 | MHSO | Luprinate ® | 1.05 | A-480 | A | 123.40 | 105.43 | 108.25 |
| 797-072-15 | CMSO | HMDI | 0.89 | DBTDL | B | −13.05 | N/R | −25.00 |
| 797-073-1 | CMSO | TDI | 0.88 | DBTDL | B | −25.59 | −37.60 | −30.00 |
| 797-073-15 | CMSO | Luprinate ® | 1.00 | A-480 | A | −13.93 | −30.00 | −26.80 |
| 797-074-1 | CMSO | HMDI | 0.90 | A-480 | A | −11.71 | N/R | −35.50 |
| 812-052-1 | MSO | IPDI | 1.00 | A-480 | A | −3.15 | −22.30 | −17.00 |
| 812-052-15 | MSO | IPDI | 0.88 | A-480 | A | 3.60 | N/R | −12.70 |
| 812-053-1 | MSO | Luprinate ® | 0.96 | A-480 | A | 65.09 | −29.60 | −28.70 |
| 812-054-15 | MSO | HMDI | 0.92 | DBTDL | B | −9.00 | −29.40 | −28.60 |
| 812-055-1 | MSO | HMDI | 0.94 | DBTDL | B | −7.86 | −29.90 | −29.20 |

| Sample ID | tan δ Peak (° C.) | tan δ @ Peak | CTE 1 (ppm) | CTE 2 (ppm) | E" @ Peak (Pa) | Shore Hardness |
|---|---|---|---|---|---|---|
| 791-097-15 | 136.60 | 0.37 | 93.81 | 135.76 | 1.00E+08 | 80D |
| 791-098-15 | 138.00 | 0.40 | 88.86 | 122.93 | 9.80E+07 | 81D |
| 791-099-1 | 134.40 | 0.39 | 99.33 | 137.27 | 1.12E+08 | 83D |
| 791-099-15 | 88.20 | 0.68 | 97.95 | 191.15 | 1.44E+08 | 80D |
| 791-100-1 | 80.50 | 0.78 | 100.49 | 182.13 | 1.86E+08 | 78D |
| 791-100-15 | 136.60 | 0.38 | 85.72 | 122.71 | 1.10E+08 | 82D |
| 797-072-15 | 15.20 | 0.72 | 115.98 | 217.64 | 1.93E+08 | 60A |
| 797-073-1 | 22.50 | 0.85 | 214.35 |  | 1.81E+08 | 68A |
| 797-073-15 | 18.20 | 0.39 | 122.28 | 188.20 | 1.93E+08 | 71A (30D) |
| 797-074-1 | 15.50 | 0.96 | 129.44 | 264.85 | 2.79E+08 | 44A |
| 812-052-1 | 25.50 | 0.75 | 113.30 | 207.98 | 2.08E+08 | 75A |
| 812-052-15 | 38.50 | 1.16 | 100.49 | 213.08 | 2.07E+08 | 71A |
| 812-053-1 | 43.30 | 0.42 | 117.03 | 201.63 | 1.31E+08 | 87A (50D) |
| 812-054-15 | 26.90 | 0.64 | 120.17 | 197.78 | 2.02E+08 | 64A (21D) |
| 812-055-1 | 6.40 | 0.59 | 129.01 | 205.40 | 2.32E+08 | 80A |

TABLE 4

Mechanical Properties of First Polythiourethane Sample Group

| Sample ID | Thiol Ester | Isocyanate | XH:NCO Equivalent Ratio | Catalyst | Cure Profile | Young's Modulus (MPa) | Tensile Strength (MPa) | % Elongation | Energy to Break (MPa/m) |
|---|---|---|---|---|---|---|---|---|---|
| 791-097-15 | MHSO | TDI | 0.88 | DBTDL | B | 1864.5 | 52.4 | 7.9 | 3.2 |
| 791-098-15 | MHSO | TDI | 0.88 | BDMA | B | 1915.2 | 52.7 | 5.5 | 2.0 |
| 791-099-1 | MHSO | LUP | 0.96 | DBTDL | B | 1998.8 | 53.9 | 4.8 | 1.7 |
| 791-099-15 | MHSO | IPDI | 1.09 | BDMA | B | 1915.5 | 35.1 | 6.4 | 2.3 |
| 791-100-1 | MHSO | IPDI | 0.87 | DBTDL | B | 1984.0 | 35.7 | 2.5 | 0.5 |
| 791-100-15 | MHSO | Luprinate ® | 1.05 | A-480 | A | 2118.3 | 38.1 | 2.5 | 0.6 |
| 797-072-15 | CMSO | HMDI | 0.89 | DBTDL | B | 2.6 | 1.2 | 59.0 | 0.4 |
| 797-073-1 | CMSO | TDI | 0.88 | DBTDL | B | 3.5 | 0.9 | 30.7 | 0.1 |
| 797-073-15 | CMSO | Luprinate ® | 1.00 | A-480 | A | 9.6 | 1.9 | 26.5 | 0.3 |
| 797-074-1 | CMSO | HMDI | 0.90 | A-480 | A | 1.1 | 0.3 | 41.6 | 0.1 |
| 812-052-1 | MSO | IPDI | 1.00 | A-480 | A | 1.9 | 0.9 | 70.7 | 0.4 |
| 812-052-15 | MSO | IPDI | 0.88 | A-480 | A | 2.7 | 0.7 | 67.3 | 0.3 |
| 812-053-1 | MSO | Luprinate ® | 0.96 | A-480 | A | 65.2 | 8.2 | 34.5 | 1.8 |

TABLE 4-continued

Mechanical Properties of First Polythiourethane Sample Group

| Sample ID | Thiol Ester | Isocyanate | XH:NCO Equivalent Ratio | Catalyst | Cure Profile | Young's Modulus (MPa) | Tensile Strength (MPa) | % Elongation | Energy to Break (MPa/m) |
|---|---|---|---|---|---|---|---|---|---|
| 812-054-15 | MSO | HMDI | 0.92 | DBTDL | B | 3.5 | 2.2 | 60.9 | 0.8 |
| 812-055-1 | MSO | HMDI | 0.94 | DBTDL | B | 2.9 | 1.8 | 62.5 | 0.7 |

TABLE 5

Additional Properties of First Polythiourethane Sample Group

| Sample ID | Thiol Ester | Isocyanate | XH:NCO Equivalent Ratio | Catalyst | Cure Profile | Notched Izod Impact (J/m) | Notched Izod Impact (J/m$^2$) | Density (g/cc) | Specific Gravity | X KHz Dielectric Constant | X MHz Dielectric Constant |
|---|---|---|---|---|---|---|---|---|---|---|---|
| 791-097-15 | MHSO | TDI | 0.88 | DBTDL | B | 13.4 | 1316.0 | 1.1502 | 1.1530 | 3.788 | 3.614 |
| 791-098-15 | MHSO | TDI | 0.88 | BDMA | B | N/A | N/A | 1.1504 | 1.1531 | 3.833 | 3.660 |
| 791-099-1 | MHSO | LUP | 0.96 | DBTDL | B | 9.5 | 933.0 | 1.1556 | 1.1583 | 3.855 | 3.703 |
| 791-099-15 | MHSO | IPDI | 1.09 | BDMA | B | 8.6 | 843.0 | 1.0896 | 1.0922 | 3.721 | 3.527 |
| 791-100-1 | MHSO | IPDI | 0.87 | DBTDL | B | 10.4 | 1019.0 | 1.0923 | 1.0949 | 3.947 | 3.699 |
| 791-100-15 | MHSO | Luprinate ® | 1.05 | A-480 | A | 9.7 | 954.0 | 1.1543 | 1.1570 | 3.845 | 3.696 |
| 797-072-15 | CMSO | HMDI | 0.89 | DBTDL | B | N/A | N/A | 1.0255 | 1.0280 | 5.055 | 3.919 |
| 797-073-1 | CMSO | TDI | 0.88 | DBTDL | B | N/A | N/A | 1.0419 | 1.0444 | 5.285 | 4.066 |
| 797-073-15 | CMSO | Luprinate ® | 1.00 | A-480 | A | 35.7 | 3643.0 | 1.0568 | 1.0594 | 4.940 | 3.929 |
| 797-074-1 | CMSO | HMDI | 0.90 | A-480 | A | N/A | N/A | 1.0260 | 1.0284 | 4.432 | 3.471 |
| 812-052-1 | MSO | IPDI | 1.00 | A-480 | A | N/A | N/A | 1.0245 | 1.0269 | 3.426 | 2.756 |
| 812-052-15 | MSO | IPDI | 0.88 | A-480 | A | N/A | N/A | 1.0274 | 1.0299 | 3.735 | 2.899 |
| 812-053-1 | MSO | Luprinate ® | 0.96 | A-480 | A | 29.2 | 2969.0 | 1.0747 | 1.0773 | 3.422 | 3.048 |
| 812-054-15 | MSO | HMDI | 0.92 | DBTDL | B | N/A | N/A | 1.0332 | 1.0357 | 3.074 | 2.686 |
| 812-055-1 | MSO | HMDI | 0.94 | DBTDL | B | N/A | N/A | 1.0324 | 1.0349 | 3.760 | 3.148 |

TABLE 6

TMA and DMA Data for Second Polythiourethane Sample Group

| Sample ID | SH:NCO Equivalent Ratio | Wt. % Catalyst. | TMA Tg (° C.) | E' Onset (° C.) | E'' Peak (° C.) | tan δ Peak (° C.) | tan δ @ Peak | CTE 1 (ppm) | CTE 2 (ppm) | E'' @ Peak (Pa) | Shore Hardness |
|---|---|---|---|---|---|---|---|---|---|---|---|
| 788-100-1 | 0.91 | 5.0 | N/R | 25.73 | 12.16 | 63.21 | 0.38 | N/R | N/R | 7.50E+07 | 58D |
| 797-085-15 | 0.91 | 4.7 | N/R | 27.48 | 20.03 | 64.01 | 0.38 | N/R | N/R | 7.10E+07 | 57D |
| 797-086-1 | 0.83 | 4.9 | N/R | 37.62 | 7.92 | 37.92 | 0.39 | N/R | N/R | 8.03E+07 | 57D |
| 797-086-15 | 0.77 | 4.9 | N/R | 38.06 | 9.81 | 72.04 | 0.38 | N/R | N/R | 8.13E+07 | 63D |
| 797-087-1 | 0.91 | 8.0 | N/R | 38.93 | 13.70 | 73.01 | 0.37 | N/R | N/R | 7.65E+07 | 60D |
| 797-087-15 | 0.83 | 7.8 | N/R | 38.27 | 0.92 | 73.28 | 0.38 | N/R | N/R | 7.51E+07 | 60D |
| 797-088-1 | 0.77 | 7.6 | N/R | 42.41 | 56.90 | 76.10 | 0.40 | N/R | N/R | 6.24E+07 | 68D |
| 797-088-15 | 0.91 | 11.4 | N/R | 42.04 | 57.75 | 82.96 | 0.38 | N/R | N/R | 5.75E+07 | 58D |
| 797-089-1 | 0.83 | 11.0 | N/R | 40.53 | 60.17 | 84.28 | 0.39 | N/R | N/R | 6.35E+07 | 71D |
| 797-089-15 | 0.77 | 10.6 | N/R | 51.59 | 60.94 | 86.56 | 0.39 | N/R | N/R | 6.71E+07 | 65D |
| 797-090-15 | 0.95 | 5.3 | N/R | 9.41 | −1.59 | 56.05 | 0.33 | N/R | N/R | 7.61E+07 | 50D |
| 797-091-15 | 0.95 | 8.4 | N/R | 7.93 | 0.93 | 58.89 | 0.37 | N/R | N/R | 8.38E+07 | 55D |
| 797-092-15 | 0.95 | 9.5 | N/R | 14.10 | 10.12 | 62.76 | 0.33 | N/R | N/R | 6.78E+07 | 55D |
| 797-093-15 | 0.95 | 10.6 | N/R | 13.21 | 12.35 | 63.76 | 0.35 | N/R | N/R | 7.10E+07 | 53D |
| 797-094-15 | 0.95 | 20.9 | N/R | 25.19 | 16.37 | 64.08 | 0.35 | N/R | N/R | 7.13E+07 | 62D |
| 797-095-15 | 0.43 | 4.0 | N/R | 56.15 | 71.32 | 93.52 | 0.27 | N/R | N/R | 6.63E+07 | 70D |

TABLE 7

Selected Property Data for Second Polythiourethane Sample Group

| Sample ID | SH:NCO Equivalent Ratio | Wt. % Catalyst. | Young's Modulus (MPa) | Tensile Strength (MPa) | % Elongation | Energy to Break (MPa/m) | Unnotched Izod Impact (J/m) | Unnotched Izod Impact (J/m$^2$) |
|---|---|---|---|---|---|---|---|---|
| 788-100-1 | 0.91 | 5.0 | 296.6 | 9.5 | 9.27 | | 100.5 | 8027.0 |
| 797-085-15 | 0.91 | 4.7 | 404.0 | 12.6 | 12.34 | | 240.1 | 18570.0 |
| 797-086-1 | 0.83 | 4.9 | 567.4 | 15.9 | 10.20 | | 147.1 | 11402.0 |
| 797-086-15 | 0.77 | 4.9 | 624.4 | 17.3 | 10.45 | | 140.8 | 10902.0 |
| 797-087-1 | 0.91 | 8.0 | 715.5 | 18.8 | 8.37 | | 163.4 | 12643.0 |
| 797-087-15 | 0.83 | 7.8 | 750.4 | 20.0 | 7.65 | | 143.5 | 11111.0 |

TABLE 7-continued

Selected Property Data for Second Polythiourethane Sample Group

| Sample ID | SH:NCO Equivalent Ratio | Wt. % Catalyst. | Young's Modulus (MPa) | Tensile Strength (MPa) | % Elongation | Energy to Break (MPa/m) | Unnotched Izod Impact (J/m) | Unnotched Izod Impact (J/m$^2$) |
|---|---|---|---|---|---|---|---|---|
| 797-088-1  | 0.77 | 7.6  | 923.6  | 24.0 | 7.12  |  | 140.7 | 10771.0 |
| 797-088-15 | 0.91 | 11.4 | 844.0  | 22.5 | 8.10  |  | 140.8 | 10803.0 |
| 797-089-1  | 0.83 | 11.0 | 990.5  | 25.0 | 7.52  |  | 221.6 | 16954.0 |
| 797-089-15 | 0.77 | 10.6 | 1107.3 | 28.1 | 6.50  |  | 212.6 | 16294.0 |
| 797-090-15 | 0.95 | 5.3  | 128.2  | 6.7  | 17.75 |  | 317.9 | 24369.0 |
| 797-091-15 | 0.95 | 8.4  | 175.4  | 7.4  | 13.48 |  | 572.0 | 44372.0 |
| 797-092-15 | 0.95 | 9.5  | 197.9  | 8.8  | 15.96 |  | 444.3 | 34465.0 |
| 797-093-15 | 0.95 | 10.6 | 241.8  | 9.6  | 16.23 |  | 361.5 | 27948.0 |
| 797-094-15 | 0.95 | 20.9 | 347.2  | 13.1 | 12.30 |  | 395.2 | 30315.0 |
| 797-095-15 | 0.43 | 4.0  | 1347.1 | 30.1 | 3.10  |  | 102.4 | 7924.0  |

TABLE 8

ASTM D-570 Room Temperature Water Uptake for Second Polythiourethane Sample Group

| Sample ID | SH:NCO Equivalent Ratio | Wt. % Catalyst. | Initial wt. (g) | 24 hr wt. (g) | 24 hr % Gain | 48 hr wt. (g) | 48 hr % Gain | 1 week wt. (g) | 1 week % Gain |
|---|---|---|---|---|---|---|---|---|---|
| 788-100-1  | 0.91 | 5.0  | 0.546 | 0.550 | 0.733 | 0.552 | 1.099 | 0.559 | 2.381 |
| 797-085-15 | 0.91 | 4.7  | 0.573 | 0.574 | 0.175 | 0.574 | 0.175 | 0.575 | 0.349 |
| 797-086-1  | 0.83 | 4.9  | 0.658 | 0.659 | 0.152 | 0.660 | 0.304 | 0.660 | 0.304 |
| 797-086-15 | 0.77 | 4.9  | 0.625 | 0.625 | 0.000 | 0.626 | 0.160 | 0.627 | 0.320 |
| 797-087-1  | 0.91 | 8.0  | 0.662 | 0.662 | 0.000 | 0.662 | 0.000 | 0.664 | 0.302 |
| 797-087-15 | 0.83 | 7.8  | 0.540 | 0.540 | 0.000 | 0.541 | 0.185 | 0.542 | 0.370 |
| 797-088-1  | 0.77 | 7.6  | 0.594 | 0.594 | 0.000 | 0.595 | 0.168 | 0.596 | 0.337 |
| 797-088-15 | 0.91 | 11.4 | 0.623 | 0.623 | 0.000 | 0.624 | 0.161 | 0.626 | 0.482 |
| 797-089-1  | 0.83 | 11.0 | 0.736 | 0.737 | 0.136 | 0.737 | 0.136 | 0.739 | 0.408 |
| 797-089-15 | 0.77 | 10.6 | 0.691 | 0.691 | 0.000 | 0.692 | 0.145 | 0.694 | 0.434 |
| 797-090-15 | 0.95 | 5.3  | 0.821 | 0.823 | 0.244 | 0.823 | 0.244 | 0.824 | 0.365 |
| 797-091-15 | 0.95 | 8.4  | 0.666 | 0.667 | 0.150 | 0.668 | 0.300 | 0.668 | 0.300 |
| 797-092-15 | 0.95 | 9.5  | 0.817 | 0.819 | 0.245 | 0.819 | 0.245 | 0.820 | 0.367 |
| 797-093-15 | 0.95 | 10.6 | 0.425 | 0.426 | 0.235 | 0.426 | 0.235 | 0.427 | 0.471 |
| 797-094-15 | 0.95 | 20.9 | 0.738 | 0.739 | 0.136 | 0.739 | 0.136 | 0.741 | 0.407 |
| 797-095-15 | 0.43 | 4.0  | 0.669 | 0.669 | 0.000 | 0.669 | 0.000 | 0.671 | 0.299 |

TABLE 9

Solvent Swelling Properties for Second Polythiourethane Sample Group

| Sample ID | SH:NCO Equivalent Ratio | Wt. % Catalyst. | Sample Initial Volume (mL) | Sample Initial Weight (g) | Solvent | Sample wt. 24 Hours (g) | Sample wt. 48 Hours (g) | Sample wt. 72 Hours (g) | Sample Weight Change (%) | Sample Final Volume (mL) | Residue wt. (g) | Swell (volume %) | Extractables (wt. %) |
|---|---|---|---|---|---|---|---|---|---|---|---|---|---|
| 788-100-1  | 0.91 | 5.0  | 0.5511 | 0.5430 | DMF | 0.772 | 0.832 | 0.824 | 51.7 | 0.849 | 0.014 | 54.01 | 2.58 |
| 797-085-15 | 0.91 | 4.7  | 0.5811 | 0.5720 | DMF | 0.758 | 0.835 | 0.846 | 47.9 | 0.871 | 0.010 | 49.95 | 1.75 |
| 797-086-1  | 0.83 | 4.9  | 0.633  | 0.6200 | DMF | 0.795 | 0.875 | 0.912 | 47.1 | 0.942 | 0.011 | 48.87 | 1.77 |
| 797-086-15 | 0.77 | 4.9  | 0.6544 | 0.6460 | DMF | 0.798 | 0.866 | 0.929 | 43.8 | 0.954 | 0.008 | 45.81 | 1.24 |
| 797-087-1  | 0.91 | 8.0  | 0.6974 | 0.6800 | DMF | 0.854 | 0.930 | 0.983 | 44.6 | 1.018 | 0.007 | 46.02 | 1.03 |
| 797-087-15 | 0.83 | 7.8  | 0.5811 | 0.5740 | DMF | 0.727 | 0.770 | 0.828 | 44.3 | 0.850 | 0.007 | 46.30 | 1.22 |
| 797-088-1  | 0.77 | 7.6  | 0.5968 | 0.5900 | DMF | 0.743 | 0.821 | 0.880 | 49.2 | 0.904 | 0.006 | 51.48 | 1.02 |
| 797-088-15 | 0.91 | 11.4 | 0.6683 | 0.6670 | DMF | 0.826 | 0.907 | 0.969 | 45.3 | 0.988 | 0.007 | 47.87 | 1.05 |
| 797-089-1  | 0.83 | 11.0 | 0.7358 | 0.7230 | DMF | 0.869 | 0.936 | 0.992 | 37.2 | 1.021 | 0.006 | 38.73 | 0.83 |
| 797-089-15 | 0.77 | 10.6 | 0.7449 | 0.7300 | DMF | 0.853 | 0.916 | 0.969 | 32.7 | 0.998 | 0.007 | 33.99 | 0.96 |
| 797-090-15 | 0.95 | 5.3  | 0.8264 | 0.8100 | DMF | 1.063 | 1.198 | 1.223 | 51.0 | 1.264 | 0.015 | 52.94 | 1.85 |
| 797-091-15 | 0.95 | 8.4  | 0.7048 | 0.6880 | DMF | 0.939 | 1.063 | 1.065 | 54.8 | 1.104 | 0.012 | 56.66 | 1.74 |
| 797-092-15 | 0.95 | 9.5  | 0.7638 | 0.7310 | DMF | 0.966 | 1.072 | 1.118 | 52.9 | 1.174 | 0.011 | 53.67 | 1.50 |
| 797-093-15 | 0.95 | 10.6 | 0.5107 | 0.4750 | DMF | 0.718 | 0.745 | 0.742 | 56.2 | 0.794 | 0.010 | 55.38 | 2.11 |
| 797-094-15 | 0.95 | 20.9 | 0.8199 | 0.7220 | DMF | 0.930 | 1.024 | 1.077 | 49.2 | 1.196 | 0.014 | 45.87 | 1.94 |
| 797-095-15 | 0.43 | 4.0  | 0.6608 | 0.6730 | DMF | 0.762 | 0.796 | 0.828 | 23.0 | 0.825 | 0.002 | 24.85 | 0.30 |

What is claimed is:

1. A polythiourethane comprising:
a reaction product of
a thiol ester composition comprising:
1) thiol ester molecules prepared from an unsaturated natural source oil, the thiol ester molecules having an average molar ratio of cyclic sulfide groups to thiol groups per thiol ester molecule of between 0.05 and 1;
2) hydroxy thiol ester molecules prepared from an epoxidized unsaturated natural source oil; or
3) crosslinked thiol ester oligomers having at least three thiol ester monomers prepared from an unsaturated natural source oil or three hydroxy thiol ester monomers prepared from an epoxidized unsaturated natural source oil connected by polysulfide linkages having the structure —S$_Q$—, wherein Q is greater than 1; and
an isocyanate composition,
wherein the polythiourethane has multiple thiourethane groups having a structure

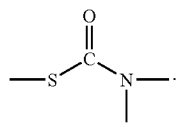

2. The polythiourethane of claim 1, wherein the thiol ester composition comprises:
the thiol ester molecules prepared from an unsaturated natural source oil,
the thiol esters molecules having
an average of from 1.5 to 8 ester groups per thiol ester molecule,
an average of from 1.5 to 9 thiol groups per thiol ester molecule, and
an average of at least 5 weight percent thiol sulfur per thiol ester molecule.

3. The polythiourethane of claim 1, wherein the thiol ester composition comprises:
the thiol ester molecules prepared from an unsaturated natural source oil, and
wherein the unsaturated source oil is soybean oil.

4. The polythiourethane of claim 1, wherein the thiol ester composition comprises:
the hydroxy thiol ester molecules prepared from an epoxidized unsaturated natural source oil,
the hydroxy thiol ester molecules having
an average of from 1.5 to 9 thiol groups per hydroxy thiol ester molecule,
an average of from 1.5 to 9 hydroxy groups per hydroxy thiol ester molecule,
an average of from 2 to 7 ester groups per hydroxy thiol ester molecule, and
an average of from 5 to 25 weight percent thiol sulfur per hydroxy thiol ester molecule.

5. The polythiourethane of claim 1, wherein the thiol ester composition comprises:
the hydroxy thiol ester molecules prepared from an epoxidized unsaturated natural source oil, and
wherein the epoxidized unsaturated natural source oil is epoxidized soybean oil.

6. A method of making a polythiourethane comprising the steps of:

a. contacting
i) a thiol ester composition comprising:
1) thiol ester molecules prepared from an unsaturated natural source oil, the thiol ester molecules having an average molar ratio of cyclic sulfide groups to thiol groups per thiol ester molecule of between 0.05 and 1;
2) hydroxy thiol ester molecules prepared from an epoxidized unsaturated natural source oil; or
3) crosslinked thiol ester oligomers having at least three thiol ester monomers prepared from an unsaturated natural source oil or three hydroxy thiol ester monomers prepared from an epoxidized unsaturated natural source oil connected by polysulfide linkages having the structure —S$_Q$—, wherein Q is greater than 1; and
ii) an isocyanate composition to form a mixture; and
b. curing the mixture to produce the polythiourethane.

7. The method of claim 6, wherein a catalyst is included in forming the mixture.

8. The method of claim 7, wherein the catalyst is selected from the group consisting of a tertiary amine, an organo-tin compound, an amine initiated polypropylene glycol, and combinations thereof.

9. The method of claim 6, wherein the thiol ester composition comprises:
the thiol ester molecules prepared from an unsaturated natural source oil,
the thiol esters molecules having
an average of from 1.5 to 8 ester groups per thiol ester molecule,
an average of from 1.5 to 9 thiol groups per thiol ester molecule, and
an average of at least 5 weight percent thiol sulfur per thiol ester molecule.

10. The method of claim 6, wherein the thiol ester composition comprises:
the thiol ester molecules prepared from an unsaturated natural source oil, and
wherein the unsaturated source oil is soybean oil.

11. The method of claim 6, wherein the thiol ester composition comprises:
the hydroxy thiol ester molecules prepared from an epoxidized unsaturated natural source oil,
the hydroxy thiol ester molecules having
an average of from 1.5 to 9 thiol groups per hydroxy thiol ester molecule,
an average of from 1.5 to 9 hydroxy groups per hydroxy thiol ester molecule,
an average of from 2 to 7 ester groups per hydroxy thiol ester molecule, and
an average of from 5 to 25 weight percent thiol sulfur per hydroxy thiol ester molecule.

12. The method of claim 6, wherein the thiol ester composition comprises:
the hydroxy thiol ester molecules prepared from an epoxidized unsaturated natural source oil, and
wherein the epoxidized unsaturated natural source oil is epoxidized soybean oil.

13. The method of claim 6, wherein a XH:NCO equivalent ratio ranges from 0.50 to 1.3, wherein XH of the thiol containing ester is a total of —SH groups or a total of —SH and —OH groups in the thiol containing ester molecules.

14. The polythiourethane of claim 1, wherein the thiol ester composition comprises:
the thiol ester molecules prepared from an unsaturated natural source oil, and wherein the unsaturated natural source oil is soybean oil, corn oil, castor bean oil, or canola oil.

15. The polythiourethane of claim 2, wherein the unsaturated natural source oil is soybean oil, corn oil, castor bean oil, or canola oil.

16. The polythiourethane of claim 2, wherein the unsaturated natural source oil is soybean oil.

17. The polythiourethane of claim 1, wherein the thiol ester composition comprises:
the thiol ester molecules prepared from an unsaturated natural source oil,
the thiol ester molecules having
an average of from 2.5 to 5 ester groups per thiol ester molecule,
an average of 2 to 4 thiol groups per thiol ester molecule, and
an average of from 6 to 15 weight percent thiol sulfur per thiol ester molecule.

18. The polythiourethane of claim 17, wherein the unsaturated natural source oil is soybean oil, corn oil, castor bean oil, or canola oil.

19. The polythiourethane of claim 17, wherein the unsaturated natural source oil is soybean oil.

20. The polythiourethane of claim 1, wherein the thiol ester composition comprises:
the hydroxy thiol ester molecules prepared from an epoxidized unsaturated natural source oil, and
wherein the epoxidized unsaturated natural source oil is epoxidized soybean oil, epoxidized corn oil, epoxidized castor bean oil, or epoxidized canola oil.

21. The polythiourethane of claim 4, wherein the epoxidized unsaturated natural source oil is epoxidized soybean oil, epoxidized corn oil, epoxidized castor bean oil, or epoxidized canola oil.

22. The polythiourethane of claim 4, wherein the epoxidized unsaturated natural source oil is epoxidized soybean oil.

23. The polythiourethane of claim 1, wherein the thiol ester composition comprises:
the hydroxy thiol ester molecules prepared from an epoxidized unsaturated natural source oil,
the hydroxy thiol ester molecules having
an average of from 2 to 5 thiol groups per hydroxy thiol ester molecule,
an average of from 2 to 5 hydroxy groups per hydroxy thiol ester molecule,
an average of from 2 to 4 ester groups per hydroxy thiol ester molecule, and
an average of from 6 to 15 weight percent thiol sulfur per hydroxy thiol ester molecule.

24. The polythiourethane of claim 23, wherein the epoxidized unsaturated natural source oil is epoxidized soybean oil, epoxidized corn oil, epoxidized castor bean oil, or epoxidized canola oil.

25. The polythiourethane of claim 23, wherein the epoxidized unsaturated natural source oil is epoxidized soybean oil.

26. The polythiourethane of claim 1, wherein the thiol ester composition comprises:
the crosslinked thiol ester oligomers having at least three thiol ester monomers prepared from an unsaturated natural source oil, and
wherein the unsaturated natural source oil is soybean oil, corn oil, castor bean oil, or canola oil.

27. The polythiourethane of claim 1, wherein the thiol ester composition comprises:
the crosslinked thiol ester oligomers having at least three thiol ester monomers prepared from an unsaturated natural source oil, and
wherein the unsaturated natural source oil is soybean oil.

28. The polythiourethane of claim 1, wherein the thiol ester composition comprises:
the crosslinked hydroxy thiol ester oligomers having at least three hydroxy thiol ester monomers prepared from an epoxidized unsaturated natural source oil, and
wherein the epoxidized unsaturated natural source oil is epoxidized soybean oil, epoxidized corn oil, epoxidized castor bean oil, or epoxidized canola oil.

29. The polythiourethane of claim 1, wherein the thiol ester composition comprises:
the crosslinked hydroxy thiol ester oligomers having at least three hydroxy thiol ester monomers prepared from an epoxidized unsaturated natural source oil and
wherein the epoxidized unsaturated natural source oil is epoxidized soybean oil.

30. The method of claim 6, wherein the thiol ester composition comprises:
the thiol ester molecules prepared from an unsaturated natural source oil, and
wherein the unsaturated natural source oil is soybean oil, corn oil, castor bean oil, or canola oil.

31. The method of claim 9, wherein the unsaturated natural source oil is soybean oil, corn oil, castor bean oil, or canola oil.

32. The method of claim 9, wherein the unsaturated natural source oil is soybean oil.

33. The method of claim 6, wherein the thiol ester composition comprises:
the thiol ester molecules prepared from an unsaturated natural source oil,
the thiol ester molecules having
an average of from 2.5 to 5 ester groups per thiol ester molecule,
an average of 2 to 4 thiol groups per thiol ester molecule, and
an average of from 6 to 15 weight percent thiol sulfur per thiol ester molecule.

34. The method of claim 33, wherein the unsaturated natural source oil is soybean oil, corn oil, castor bean oil, or canola oil.

35. The method of claim 33, wherein the unsaturated natural source oil is soybean oil.

36. The method of claim 6, wherein the thiol ester composition comprises:
the hydroxy thiol ester molecules prepared from an epoxidized unsaturated natural source oil, and
wherein the epoxidized unsaturated natural source oil is epoxidized soybean oil,
epoxidized corn oil, epoxidized castor bean oil, or epoxidized canola oil.

37. The method of claim 11, wherein the epoxidized unsaturated natural source oil is epoxidized soybean oil, epoxidized corn oil, epoxidized castor bean oil, or epoxidized canola oil.

38. The method of claim 11, wherein the epoxidized unsaturated natural source oil is epoxidized soybean oil.

39. The method of claim 6, wherein the thiol ester composition comprises:
the hydroxy thiol ester molecules prepared from an epoxidized unsaturated natural source oil,
the hydroxy thiol ester molecules having
an average of from 2 to 5 thiol groups per hydroxy thiol ester molecule, an average of from 2 to 5 hydroxy groups per hydroxy thiol ester molecule,
an average of from 2 to 4 ester groups per hydroxy thiol ester molecule, and
an average of from 6 to 15 weight percent thiol sulfur per hydroxy thiol ester molecule.

40. The method of claim 39, wherein the epoxidized unsaturated natural source oil is epoxidized soybean oil, epoxidized corn oil, epoxidized castor bean oil, or epoxidized canola oil.

41. The method of claim 39, wherein the epoxidized unsaturated natural source oil is epoxidized soybean oil.

42. The method of claim 6, wherein the thiol ester composition comprises:
the crosslinked thiol ester oligomers having at least three thiol ester monomers prepared from an unsaturated natural source oil, and
wherein the unsaturated natural source oil is soybean oil, corn oil, castor bean oil, or canola oil.

43. The method of claim 6, wherein the thiol ester composition comprises:
the crosslinked thiol ester oligomers having at least three thiol ester monomers prepared from an unsaturated natural source oil, and
wherein the unsaturated natural source oil is soybean oil.

44. The method of claim 6, wherein the thiol ester composition comprises:
the crosslinked hydroxy thiol ester oligomers having at least three hydroxy thiol ester monomers prepared from an epoxidized unsaturated natural source oil, and
wherein the epoxidized unsaturated natural source oil is epoxidized soybean oil, epoxidized corn oil, epoxidized castor bean oil, or epoxidized canola oil.

45. The method of claim 6, wherein the thiol ester composition comprises:
the crosslinked hydroxy thiol ester oligomers having at least three hydroxy thiol ester monomers prepared from an epoxidized unsaturated natural source oil, and
wherein the epoxidized unsaturated natural source oil is epoxidized soybean oil.

46. The polythiourethane of claim 2, wherein the thiol ester molecules have an average molar ratio of carbon-carbon double bonds to thiol sulfur of less than 1.5.

47. The polythiourethane of claim 2, wherein the thiol ester molecules have an average of from 6 to 15 weight percent thiol sulfur per thiol ester molecule.

48. The polythiourethane of claim 2, wherein the thiol ester molecules have an average of less than 30 mole percent total sulfur present as cyclic sulfides.

49. The polythiourethane of claim 2, wherein greater than 40 percent of thiol ester molecule total side chains contain sulfur.

50. The method of claim 9, wherein the thiol ester molecules have an average molar ratio of carbon-carbon double bonds to thiol sulfur of less than 1.5.

51. The method of claim 9, wherein the thiol ester molecules have an average of from 6 to 15 weight percent thiol sulfur per thiol ester molecule.

52. The method of claim 9, wherein the thiol ester molecules have an average of less than 30 mole percent total sulfur present as cyclic sulfides.

53. The method of claim 9, wherein greater than 40 percent of thiol ester molecule total side chains contain sulfur.

* * * * *

UNITED STATES PATENT AND TRADEMARK OFFICE
CERTIFICATE OF CORRECTION

PATENT NO.        : 8,003,748 B2                                Page 1 of 1
APPLICATION NO.   : 11/204728
DATED             : August 23, 2011
INVENTOR(S)       : Jim D. Byers et al.

It is certified that error appears in the above-identified patent and that said Letters Patent is hereby corrected as shown below:

Column 51, line 16:   "of 2 to 4" should be changed to --of from 2 to 4--
Column 52, line 38:   "of 2 to 4" should be changed to --of from 2 to 4--

Signed and Sealed this
Fourteenth Day of February, 2012

David J. Kappos
*Director of the United States Patent and Trademark Office*